United States Patent
Chasdai et al.

(10) Patent No.: US 12,069,069 B2
(45) Date of Patent: Aug. 20, 2024

(54) NETWORK DEVICES ASSISTED BY MACHINE LEARNING

(71) Applicant: Mellanox Technologies Ltd., Yokneam (IL)

(72) Inventors: Yair Chasdai, Tel Aviv (IL); David Daniel Pilnik, Rishon LeTsiyon (IL); Liran Daniel, Holon (IL); Gary Mataev, Haifa (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 301 days.

(21) Appl. No.: 17/347,353

(22) Filed: Jun. 14, 2021

(65) Prior Publication Data

US 2022/0400124 A1   Dec. 15, 2022

(51) Int. Cl.
*H04L 9/40* (2022.01)
*G06N 5/04* (2023.01)
*G06N 20/00* (2019.01)

(52) U.S. Cl.
CPC .......... *H04L 63/1416* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,135,739 B2* | 11/2018 | Raindel | H04L 63/04 |
| 10,182,017 B2* | 1/2019 | Mozes | H04L 63/0254 |
| 11,770,406 B2* | 9/2023 | Li | H04L 63/0227 726/22 |
| 2017/0279685 A1 | 9/2017 | Mota et al. | |
| 2018/0150741 A1* | 5/2018 | Levi | G06N 3/048 |
| 2019/0132344 A1* | 5/2019 | Lem | G06N 20/00 |
| 2019/0245873 A1* | 8/2019 | Wu | H04L 41/0681 |
| 2019/0289038 A1* | 9/2019 | Li | H04L 9/3215 |
| 2020/0159568 A1* | 5/2020 | Goyal | G06F 9/4843 |
| 2021/0006574 A1* | 1/2021 | Venter | G06N 5/025 |
| 2021/0067525 A1* | 3/2021 | Lee | H04L 63/1466 |
| 2021/0099517 A1* | 4/2021 | Friedrich | H04L 67/1031 |
| 2021/0110310 A1* | 4/2021 | Guim | G06F 16/27 |
| 2021/0117360 A1* | 4/2021 | Kutch | G06F 13/4027 |
| 2021/0117697 A1* | 4/2021 | Guim Bernat | G08G 1/0133 |
| 2021/0319098 A1* | 10/2021 | Pogorelik | G06N 5/04 |

(Continued)

FOREIGN PATENT DOCUMENTS

EP   3313114 A1   4/2018

OTHER PUBLICATIONS

Ahmad Atmali, Detecting Out-of-Band Malware with NVIDIA BlueFieldDPU; Jan. 14, 2021 (Year: 2021).*

(Continued)

*Primary Examiner* — James R Turchen
(74) *Attorney, Agent, or Firm* — Davis Wright Tremaine LLP

(57) ABSTRACT

Devices and methods to identify malicious usage of a network device. In at least one embodiment, a network device comprises circuitry for performing a networking function and collecting telemetry data indicative of the performance of the networking function. The network device obtains an inference of a network traffic pattern using a machine learning model, and responds to the inference.

25 Claims, 52 Drawing Sheets

(56) References Cited

U.S. PATENT DOCUMENTS

2022/0351061 A1* 11/2022 Baldwin ............... G06N 5/046
2023/0245534 A1* 8/2023 Jayabalan .......... G06Q 20/1085

OTHER PUBLICATIONS

How Can DPU Servers Improve Data Centers? May 12, 2021 (Year: 2021).*
DPU for Convolutional Neural Network v3.0; DPU IP Product Guide; Xilinx; PG338 (v3.0) Aug. 13, 2019 (Year: 2019).*
Xavier BM, Guimarães RS, Comarela G, Martinello M. Programmable switches for in-networking classification. InIEEE Infocom 2021—IEEE Conference on Computer Communications May 10, 2021 (pp. 1-10). IEEE. (Year: 2021).*
IEEE, "IEEE Standard 754-2008 (Revision of IEEE Standard 754-1985): IEEE Standard for Floating-Point Arithmetic," Aug. 29, 2008, 70 pages.
IEEE, "IEEE Standard for 802.3," IEEE Standard for Ethernetn, IEEE Computer Society, Dec. 28, 2012, 634 pages.
Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.
Wikipedia, "IEEE 802.5," Wikepedia The Free Encyclopedia, https://en.wikipedia.org/wiki/Token_Ring, Jan. 14, 2020, 12 pages.
Extended European Search Report for Application No. 22179036.3, mailed Nov. 8, 2022, 8 pages.
Krishnan et al., "Varman: Multi-plane Security Framework for Software Defind Networks," Computer Communications, 2019, 25 pages.
Office Action for European Application No. 22179036.3, mailed Jun. 26, 2024, 5 pages.

* cited by examiner

800 → 　　　↙ 802　　　↙ 804

| max latency | count |
|---|---|
| 16 ms | 3456 |
| 32 ms | 5543 |

⋮

| 8 sec | 65 |

FIG. 8

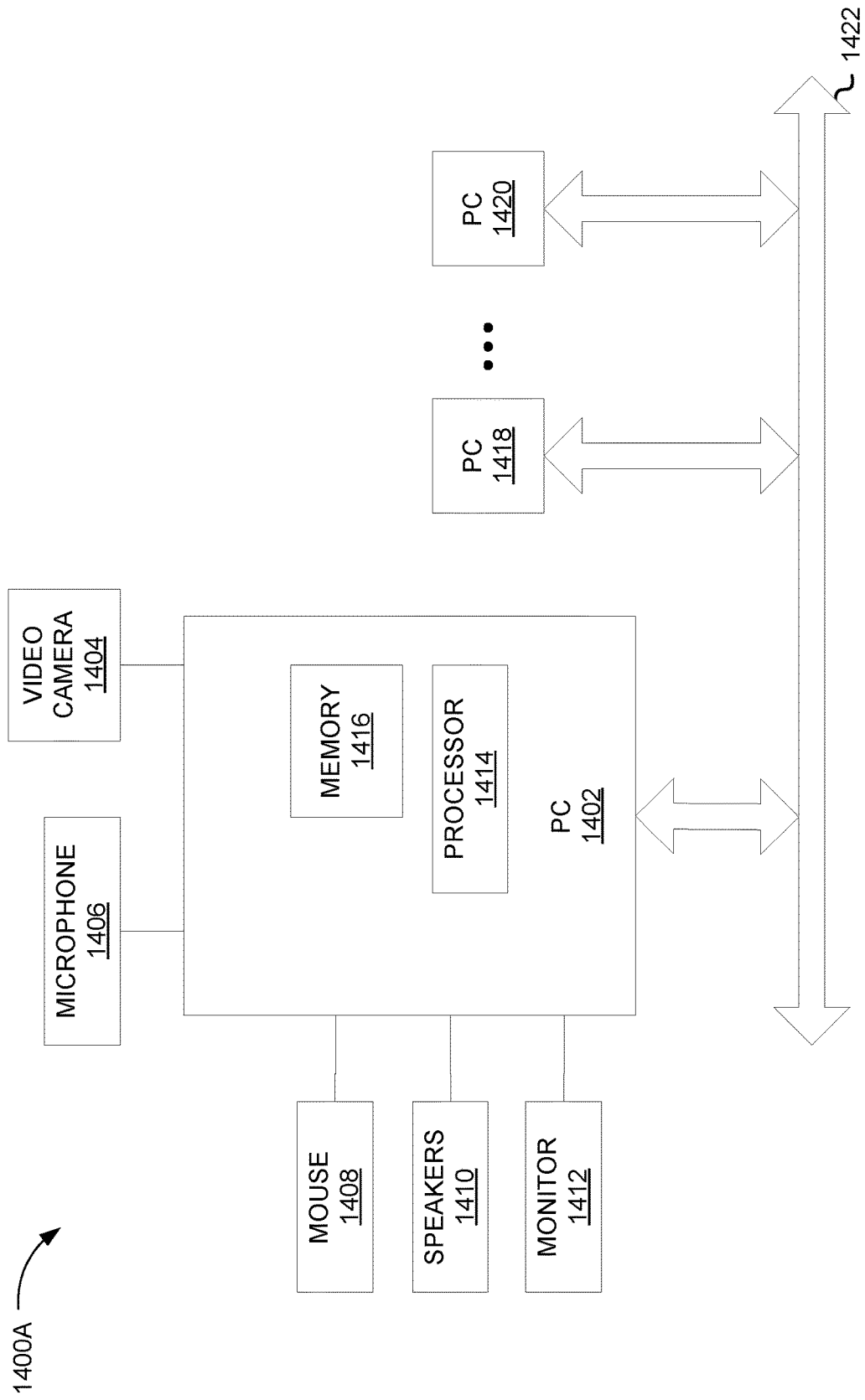

1

NETWORK DEVICES ASSISTED BY MACHINE LEARNING

FIELD

At least one embodiment pertains to a network device using machine learning to detect and respond to anomalies.

BACKGROUND

Network security, which involves protecting a communications network and the devices that connect to it from a variety of threats, remains a challenging problem. There are many different types of possible attacks, including but not limited to distributed denial of service attacks, man-in-the-middle attacks, unauthorized accesses, and so forth. The strategies and tactics employed by malicious actors continues to evolve. Existing techniques for protecting network communications can be improved.

BRIEF DESCRIPTION OF THE DRAWINGS

FIG. 8 illustrates an additional example of telemetry data, in accordance with at least one embodiment;

FIG. 14A illustrates a networked computer system, in accordance with at least one embodiment;

DETAILED DESCRIPTION

Figure 1:
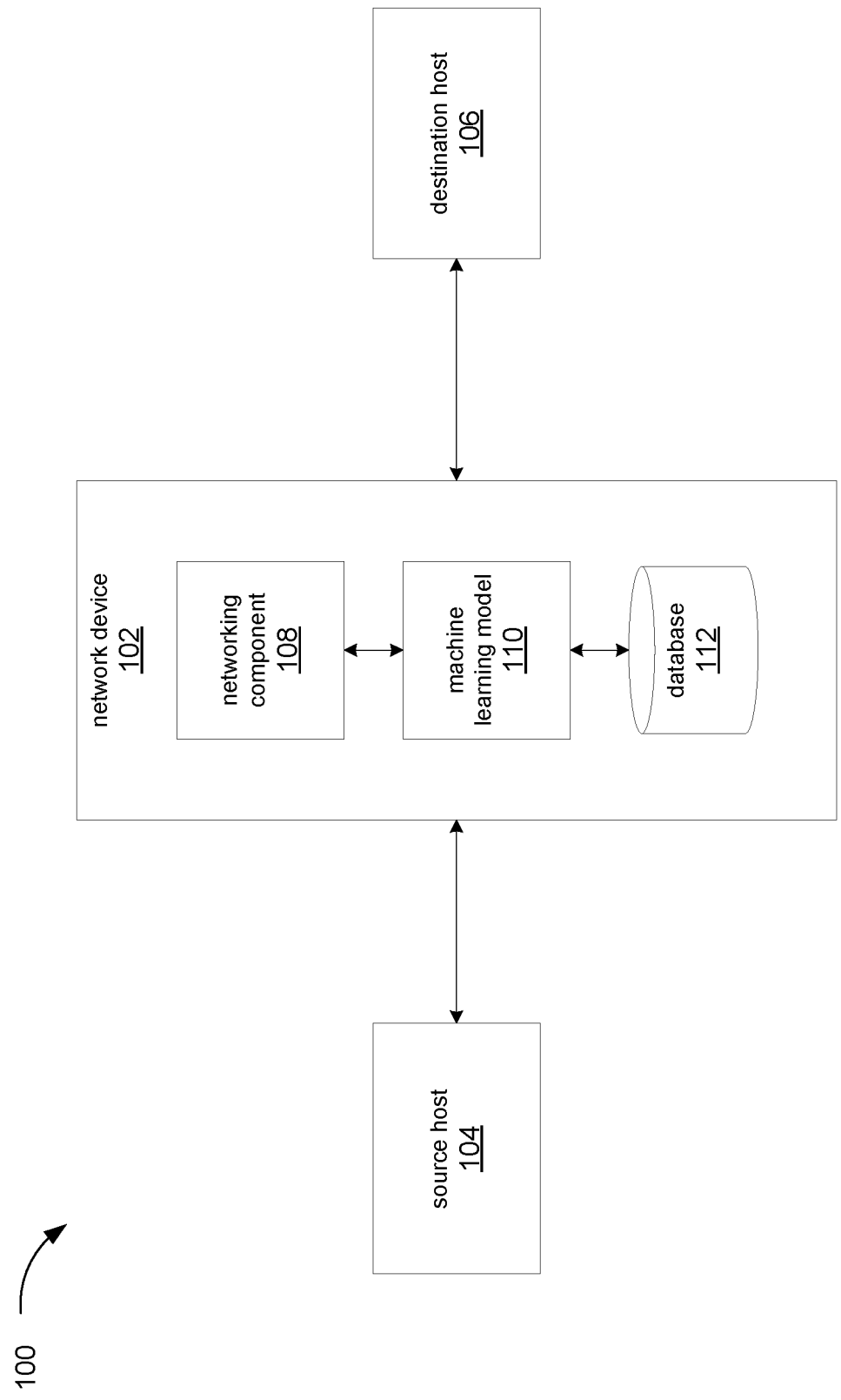
FIG. 1 illustrates a network device with networking operations assisted by a machine learning model, in accordance with at least one embodiment.

In the following description, numerous specific details are set forth to provide a more thorough understanding of at least one embodiment. However, it will be apparent to one skilled in the art that the inventive concepts may be practiced without one or more of these specific details.

In an example, a network device includes circuitry that performs various network communications functions and, in association with the performance of those functions, collects telemetry data that is then used, by the network device, to identify and limit malicious, unauthorized, or otherwise undesired usage of the network device. In this example, the network device infers such undesired usage by analyzing the telemetry data using a machine learning model. Further, the telemetry data may be associated with lower layers of the open systems interconnect ("OSI") model, in order to allow the network device to rapidly identify and react to undesired usage across a spectrum of different scenarios. In some cases, this identification and reaction may be performed at or near real-time speed.

The network device may, in some embodiments, comprise integrated circuitry for performing networking functions and collecting telemetry data concerning the operation of the network device. For example, the network device may include an application-specific integrated circuit ("ASIC") that both performs one or more of the networking device's primary functions and collects telemetry data pertaining to those function. The telemetry data can include a variety of device-specific metrics, such as latency histograms, counters or received or transmitted packets, or power-usage indicators. In some embodiments, by collecting and responding to this data using the same integrated circuits used to perform the device's networking functions, the network device is able to respond more rapidly to undesired usage. In other cases, this approach enables the network device to precisely identify information associated with undesired usage. This can potentially include identifying a particular packet associated with undesired usage.

The network device may further comprise processors or other circuitry that obtain telemetry data and use a machine learning model infer whether a network traffic pattern is undesired. The network device uses telemetry data and a machine learning model to obtain an inference of a network traffic pattern and respond to the inference if the pattern is believed to be associated with some form of undesired usage. This analysis may, in embodiments, be performed rapidly with respect to the receipt of data associated with a potentially undesired network traffic pattern, due at least in part to integration of the network device's networking, telemetry data collection, and inference functions into the network device.

A network traffic pattern, in embodiments, comprises one or more attempts to utilize a network device. For example, in at least one embodiment, a network traffic pattern comprises one or more data packets transmitted to or through a network device. An inference of a network pattern, in embodiments, comprises an estimation of a characteristic of the pattern, such as the pattern being part of an attempt to utilize the device in an unauthorized or harmful manner.

After obtaining the inference, the network device may respond to the inference in one or more of a variety of ways. Examples of such responses could include, but are not necessarily limited to, adjusting the operation of the network device. For example, network device may limit or prevent processing of data originating from a source associated with the inferred network traffic pattern or prevent the source from otherwise interfering with the device's operation.

In some cases, modifications to the network device's operation are applied automatically by the network device itself. In other cases, embodiments, and configurations, the network device obtains authorization prior to adjusting its operation. The network device may, for example, generate and transmit information about the proposed change to another device, and then receive, from that device, authorization to apply the proposed change.

In another example, a network device trains a machine learning model to identify a network traffic pattern associated with undesired usage, using data collected by the network device. For example, the network device may receive units of network data and determine that certain of these units are associated with a network traffic pattern that appears anomalous or is subsequently determined to be malicious. The machine learning model may be trained, retrained, or refined using these units of network data, or related telemetry data collected by the device, to detect future instances of malicious, unauthorized, or otherwise undesirable usage of the device.

FIG. 1 illustrates a network device with networking operations assisted by a machine learning model, in accordance with at least one embodiment. In an example 100, a network device 102 includes a machine learning model 110 that identifies potentially undesired usage of network device 102.

A network device 102 can include any device that performs a networking function, such as the functions performed by hubs, repeaters, switches, routers, bridges, gateways, modems, or network interfaces. Examples of network devices can include, but are not limited to, access points, routers, WiFi access points, WiFi routers, switches, hubs, bridges, modems, data processing units ("DPUs"), Smart-NICs, and active cables.

In at least one embodiment, network device 102 operates on one or more layers of the open systems interconnection ("OSI") model. For example, network device 102 may, in some cases, corresponds to a hub that connects computing devices operating at level one of the OSI model. In another embodiment, network device 102 is a bridge or switch processes traffic at OSI layer two. In still another embodiment, network device 102 is a router that operates at OSI layer three. In some embodiments, network device 102 operates at multiple OSI levels.

In at least one embodiment, operation of network device 102 at a layer of the OSI model comprises performing networking functions related to that layer and collecting telemetry data pertinent to the performance of those functions. This telemetry data can comprise metrics, log data, or other information that describes events, states, or operations associated with the device 102 and the performance of a relevant function. Note that in at least some cases and embodiments, a device that operates on a particular layer of the OSI model may be able to collect telemetry data relevant to its operation on that layer more efficiently compared to devices that operate on other layers.

In at least one embodiment, the network device collects and processes telemetry data collected on-the-fly by the network device. For example, such data may be collected by an application-specific integrated circuit ("ASIC") that also performs the device's networking function. The telemetry data can, using this technique, be rapidly read from the device's registers or other internal memory. Examples of telemetry data can include, but are not limited to, latency histograms, receive counters, send counters, metrics associated with encapsulation or de-encapsulation, queue occupancy, queue length, and power-level usage indicators. Note that in some cases, such as attempts to utilize a device to perform crypto-currency mining, malicious or other undesired usage patterns may result in increased power consumption by the device.

In at least one embodiment, network device 102 comprises a networking component 108, a machine learning model 110, and a database 112. The networking component 106 further comprises circuitry and other computing facilities, such as processors, memory, and processor-executable instructions, used to perform one or more network-related functions of the network device 102, such as sending or receiving data. This networking function may comprise sending or receiving data between a source host 104 and a destination host 106. A source host 104 may be a device, such as a computing device, that transmits data over a network. Similarly, a destination host 106 may be a device, such as a computing device, that receives data sent over the network.

In at least one embodiment, a machine learning model 110 comprises circuitry and other computing facilities, such as processors, memory, and processor-executable instructions, for analyzing network traffic and identifying undesired data or network traffic patterns. A machine learning model 110 can implement one or more of a variety of machine learning methods, techniques, and algorithms. These can include, but are not limited to, supervised learning, unsupervised learning, deep learning, and reinforcement learning. Embodiments of a machine learning model 110 may, for example, implement algorithms for regression, clustering, instance-based algorithms, regularization algorithms, artificial neural networks, convolutional neural networks, recurrent neural networks, long short-term memory networks, decision-trees, deep belief networks, gradient boosting, XGBoost, support vector machines, Bayesian techniques, random forests, and so forth. It will be appreciated that these examples are intended to be illustrative, and as such should not be construed in a manner which would limit potential embodiments to only those that incorporate the specific examples provided.

The machine learning model 110 is trained to identify undesired usage of network device 102. Such usage can include use of network device 102 in a manner which causes or facilitates harm, such as harm to the operation of a computer or computer network, harmful disclosure of information, harmful transmission of data, and so on. In at least one embodiment, machine learning model 110 is trained to identify harmful usage of network device 102 using a dataset of examples. These examples can include network telemetry, network data packets, series of network data packets, or other information. In at least one embodiment, these examples are labelled to indicate whether or not a particular example is associated with undesired data or traffic patterns. Various techniques may be used, as appropriate to the machine learning model, to use labelled or unlabeled data to train the model.

In at least one embodiment, a database 112 is included in network device 102. The database 112 may maintain information related to machine learning model 110. For example, database 112 may maintain datasets, as just described, that are used to train, retrain, or refine training of a machine learning model 110. For example, in at least one embodiment, a set of example data patterns, indicative of malicious, unauthorized, or otherwise undesired network traffic patterns, is maintained in database 112. This data may be updated or supplemented from time-to-time as new attack patterns are discovered. The network device 102 may therefore include circuitry, processor-executable instructions, or other computing facilities for receiving updated data and storing the data in database 112.

In at least one embodiment, network device 102 includes circuitry, processor-executable instructions, or other computing facilities for conducting training, retraining, or refinement of machine learning model 102 using such updated data from database 112. For example, after a new attack pattern is discovered, database 112 may be updated in response to a request from an external source, such as a command from a device that performs an administrative function. After the update, the network device 102 initiates a training procedure, using the data stored in the database 112, to train, retrain, or refine training of machine learning model 110. The machine learning model 110 may then have improved capabilities to detect network patterns that reflect characteristics that may be similar to those of the new attack pattern, or those that reflect characteristics similar to other, previously known patterns associated with undesired usage of a network.

In at least one embodiment, database 112 is omitted from network device 102. In some embodiments, an external database is used, and training samples are transmitted to network device 102 and used by the network device 102 to train, retrain, or refine training of machine learning model 110. In other embodiments, training, retraining, or refinement of machine learning model 110 is performed externally, and a machine learning model 110 is updated to reflect the new training. For example, in at least one embodiment, a set of weights or other parameters, such as the weights or parameters used in an artificial neural network, are transmitted to network device 102 and used to update corresponding weights or parameters in machine learning model 110.

In at least one embodiment, network device 102 operates on one or more selected layers of the OSI model, collects data pertinent to networking operations performed on those one or more selected layers, and analyzes the data using a machine learning model 110 to identify a suspicious or unauthorized network traffic pattern. For example, a machine learning model 110 might infer, based on analyzing data from the OSI layers, that an observed network traffic pattern appears to be a denial-of-service ("DoS") attack, or other malicious use of network device 102. The network device 102 can then initiate a response to the detected network traffic pattern. By performing to analysis on network device, data pertinent to a particular OSI layer might be analyzed, and an undesired use of network device 102 detected, more quickly or more efficiently than might be the case if the analysis were performed remotely. This approach may also, in some embodiments, convey an advantage by permitting analysis of data at a particular OSI layer to be analyzed without requiring transmission of that data to another device, or otherwise facilitating more rapid analysis of and response to the data.

Figure 2:
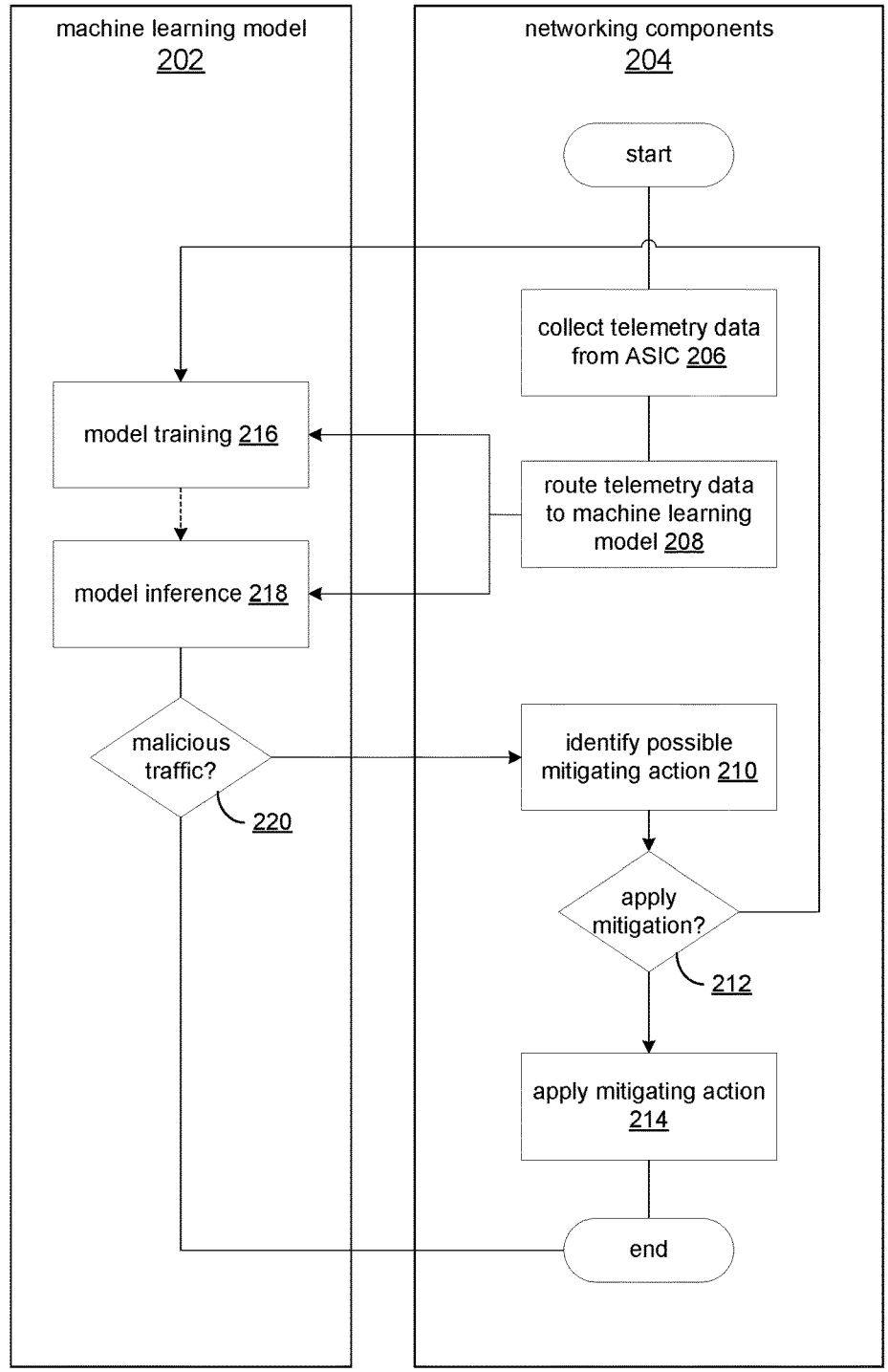
FIG. 2 illustrates a procedure for assisting networking operations by a machine learning model, in accordance with at least one embodiment.

FIG. 2 illustrates a procedure for assisting networking operations by a machine learning model, in accordance with at least one embodiment. In an example 200, a network device, which may be similar to the network device 102 depicted in FIG. 1, comprises networking software 204 and a machine learning model 202. The networking software 204 may include processor-executable instructions that are stored on a memory in a networking device, and executed by one or more processors or other computing facilities of the networking device, or using one or more processors or circuitry of a networking device, such as an application-specific integrated circuit ("ASIC"). These instructions, when performed by, or using, these computing facilities, cause the network device to perform various functions, including those related to the functions of the networking device, and to the specific operations described in relation to FIG. 2.

In the example 200, a procedure for assisting networking operations using a machine learning model begins, at 206, by collecting telemetry data associated with networking operations performed by the network device. In at least one embodiment, telemetry data is collected by an ASIC or other circuitry that contributes to the performance of the device's networking functions.

This telemetry data is then, in at least one embodiment, routed at 208 to a machine learning model. In at least one embodiment, the telemetry data is used to perform training of the machine learning model 202. This may can include retraining or refinement of a trained model, or training of a new or additional machine learning model 202.

In at least one embodiment, telemetry data collected at 206 is used to perform, at 218, inference or other analysis consistent with the type of model used, to identify potentially undesired traffic patterns. At 220, if undesired traffic is detected, instructions in the networking software 204 are executed by processors of the networking device to determine, at 210, what mitigating action could be performed to prevent the traffic from interfering with the operation of the device. For example, in at least one embodiment, the machine learning model 202 identifies an undesired usage of the device, and may further be used to identify characteristics of the usage, such as the network ports associated with the undesired usage. Other components of the switch, such as the networking software 204, may then determine what mitigating action could be taken in response to this information.

Note that in some embodiments, the functions attributed to the networking software 204, in relation to determining a mitigating action, may instead by performed by the machine learning model 202. For example, in at least one embodiment, output of a machine learning model 202 comprises information describing, or instructions for performing, a potential mitigating action. In still other embodiments, the determination of a mitigating action is made using techniques other than machine learning.

At 212, a determination is made regarding whether or not a mitigating action is to be performed. In at least one embodiment, this process is conducted in association with input from an administrative process or administrative user, or using guidance provided by various administrative rules, configuration settings, and so forth.

After a determination is made, information about the determination is fed, in at least one embodiment, back to model training 216. This can include information indicating whether or not a network traffic pattern (or other data or condition) that was classified as undesired by the machine learning model 202 is confirmed as undesired, or confirmed as not being undesired. This information can then be used in model training 216 to refine the model's understanding of potentially malicious or otherwise undesired network traffic patterns, and approve the model's ability to recognize and distinguish undesired behavior from and behavior that conforms to an intended usage of the device.

At 214, if a mitigating action is authorized, it is applied. Examples of potential mitigating actions can include, but are not necessarily limited to, sending a notification describing the inference, restricting usage of the network device, shutting down the network device, slowing the network device, applying restrictive measures to traffic associated with a network traffic pattern, and so on. It will be appreciated that these examples are intended to be illustrative rather than limiting.

Figure 3:
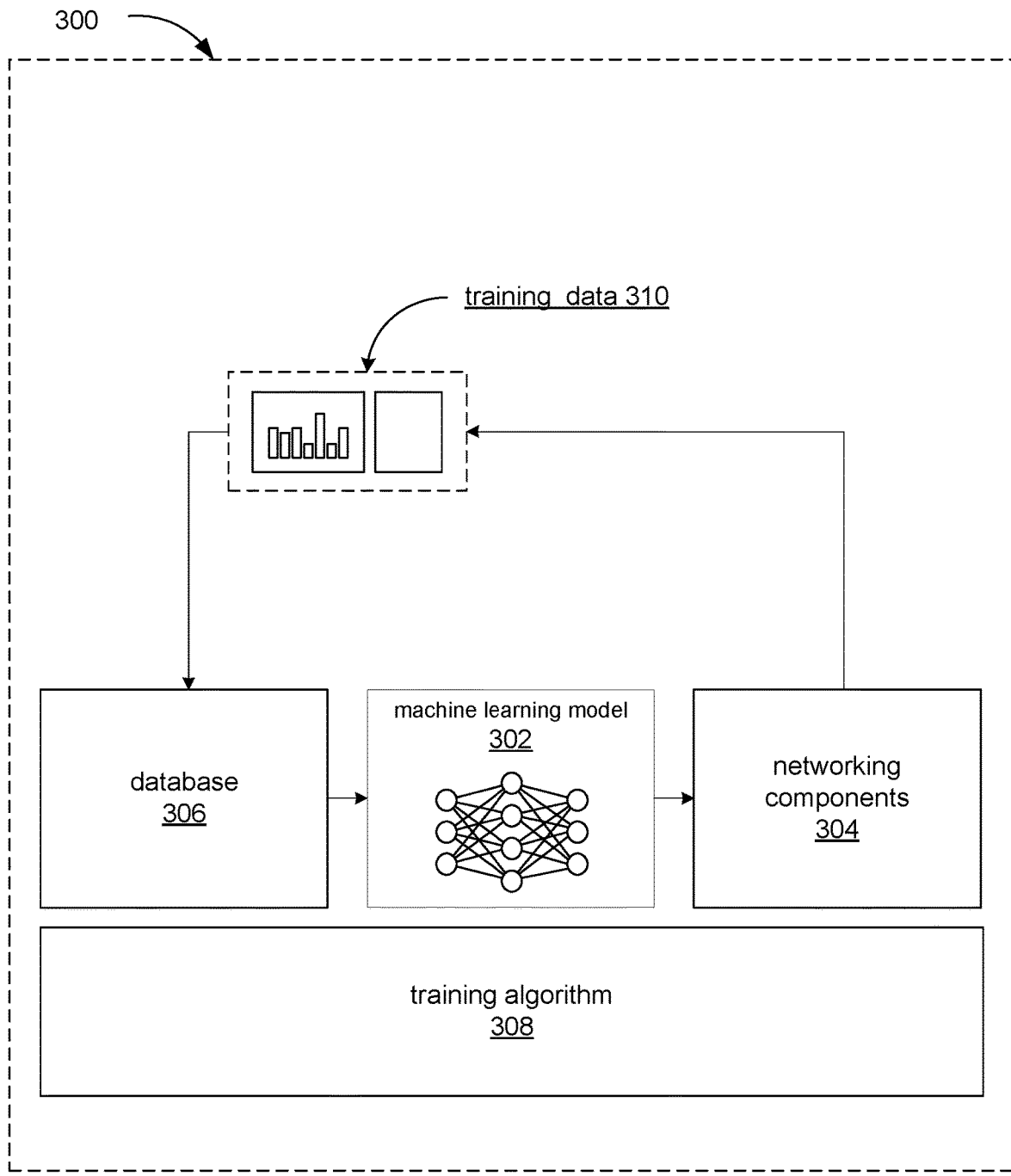
FIG. 3 illustrates training a machine learning model to assist networking operations, in accordance with at least one embodiment.

FIG. 3 illustrates training a machine learning model to assist networking operations, in accordance with at least one embodiment. In FIG. 3, a networking device 300 comprises networking components 304, a machine learning model 302, and a database 306. These may correspond to the networking device, networking components, machine learning model, and database depicted in FIG. 1 or FIG. 2. In at least one embodiment, the machine learning model 302 assists networking operations by performing inferences to identify potentially network traffic patterns associated with undesired usage.

In at least one embodiment, the networking device 300 comprises software, circuitry, or other computing facilities to implement a training algorithm 308 that is applied to machine learning model 302. A variety of training algorithms may be employed. These could, for example, include supervised learning techniques such as support-vectors, linear regression, decision trees, neural networks, and so forth. Unsupervised techniques may also be used. These could include clustering, unsupervised anomaly detection, expectation-maximization, probabilistic methods, and so forth.

In at least one embodiment, example data is collected and stored in database 306, and used by training algorithm 308 to train, retrain, or refine the training of machine learning model 302. This data can include labeled data, unlabeled data, and combinations thereof. In at least one embodiment, the data includes data that is pre-loaded into the network device. In other cases, the data includes data that is collected by the device during its operation.

In at least one embodiment, as depicted in FIG. 3, the networking components 304 collect training data 310 and store the training data in database 306. The training data may comprise data relevant to training the machine learning model 302, including data obtained by the networking component 304 during its operation. This may include metrics collected at an appropriate OSI layer, such as one or more of L1, L2, or L3 data. In at least one embodiment, these metrics are obtained directly from an ASIC or other circuit that performs the network function. Depending on the needs of machine learning model 302, the training data 302 may include additional information, such as labels, hyper-parameters to guide training, and so on.

In at least one embodiment, training algorithm 308 uses training data 310 to train, retrain, or refine the training of machine learning model 302. The training data 310 can be collected in the course of operating network device 300, and can therefore adapt to new methods used by malicious actors, and may also adapt factors local to the particular network environment in which network device 300 operations.

In at least one embodiment, administrative decisions made in relation to the operation of networking device are used in relation to the collection of training data. For example, in at least one embodiment, an administrator's decision to ban or otherwise limit certain types of network traffic can indicate that the data associated with this traffic may be considered potentially malicious, or undesired for some other reason. The networking device 300 may therefore determine to provide training data 310 to database 306 as an example of data associated with a network traffic pattern that is indicative of undesired usage. Likewise, if an administrator determines that certain types of network traffic are not associated with undesired usage of the device, the networking device 300 may determine to provide training data 310 to database 306 as an example of data that conforms to intended usage of the device. In some cases, the data may be labelled accordingly, but whether or not the data is labelled may depend upon the training algorithm 308 or machine learning model 302 used.

In at least one embodiment, training algorithm 308 performs training, retraining, or refinement of machine learning model 302 in response to one or more events. These events may include, in embodiments, the acquisition of new training data 310 by operation of the networking components 302, the passage of an interval of time, a command issued by an administrator to the networking device 300, shutdown, startup, or power cycling of the network device 300, and so forth.

Figure 4:
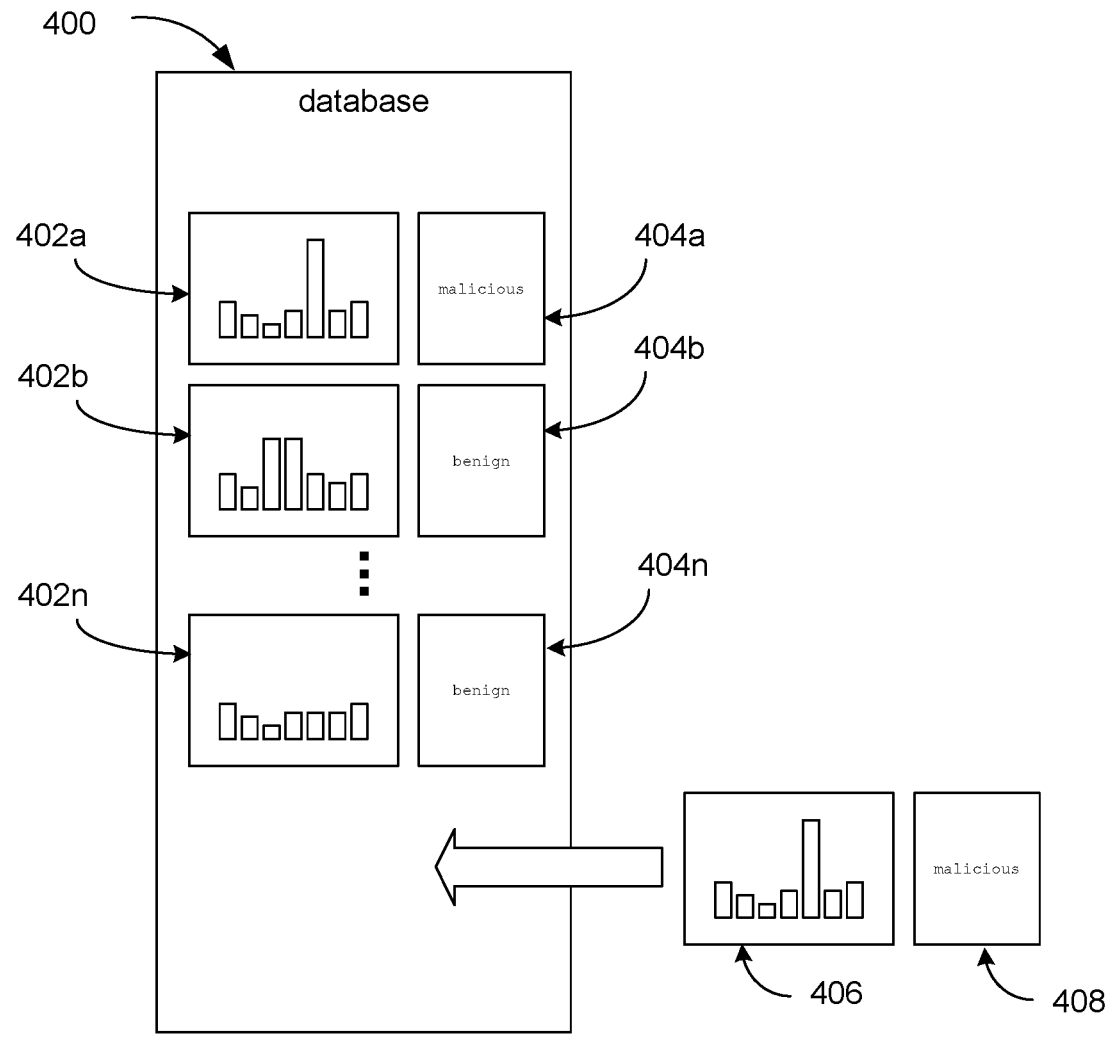
FIG. 4 illustrates maintaining a database of training examples, in accordance with at least one embodiment.

The operation of the database 306 may be further understood in view of FIG. 4, which illustrates maintaining a database of training examples, in accordance with at least one embodiment. In the example of FIG. 4, the database 400 is populated, in the course of operating a networking device, with data to be used to train, retain, or refine the training of a machine learning model. In at least one embodiment, the networking device, machine learning model, and database 400 correspond to those elements as depicted in FIG. 3.

In at least one embodiment, database 400 comprises entries of training data 402*a*-402*n* and additional data 404*a*-404*n*. The additional data 404*a*-404*n* can include data derived from operation of a networking device. In the depicted example, this could include classifications of the corresponding data as being associated with malicious or benign network traffic patterns. In some cases and embodiments, this information is obtained based on interactions with the networking device, such as those interactions that might be initiated by an administrator. For example, if a network administrator restricts or blocks certain ports or IP addresses, network data associated with those ports or IP addresses may be classified as malicious or potentially malicious. Likewise, if a port or address is approved by an administrator, network data associated with those portions or IP addresses might be classified as benign or likely benign. In some cases, an administrator may specifically identify certain ports, packets, or network addresses as being associated with benign or malicious network traffic. Similar approaches may be used with respect to data that is undesired for reasons in addition to or instead of being malicious, such as network traffic patterns that might result from a defective device or program.

The additional data 404*a*-404*n* can be stored in the database 400 along with the corresponding training data 402*a*-402*n* entries. In at least one embodiment, the database 400 is updated to include a new entry of training data 406 and additional data 408 in response to an event such as blocking or unblocking a port or IP address. The database 400 may also be updated in response to other interactions, such as in response to certain administrative commands.

In at least one embodiment, the database is updated and a machine learning model is trained, retrained, or refined using training data that comprises the new training data 406 and associated additional data 408. By training with this new data, the machine learning model may have improved capabilities for detecting and responding to future undesired network traffic patterns, including those that have characteristics in common with those associated with the new training data 406.

Figure 5:
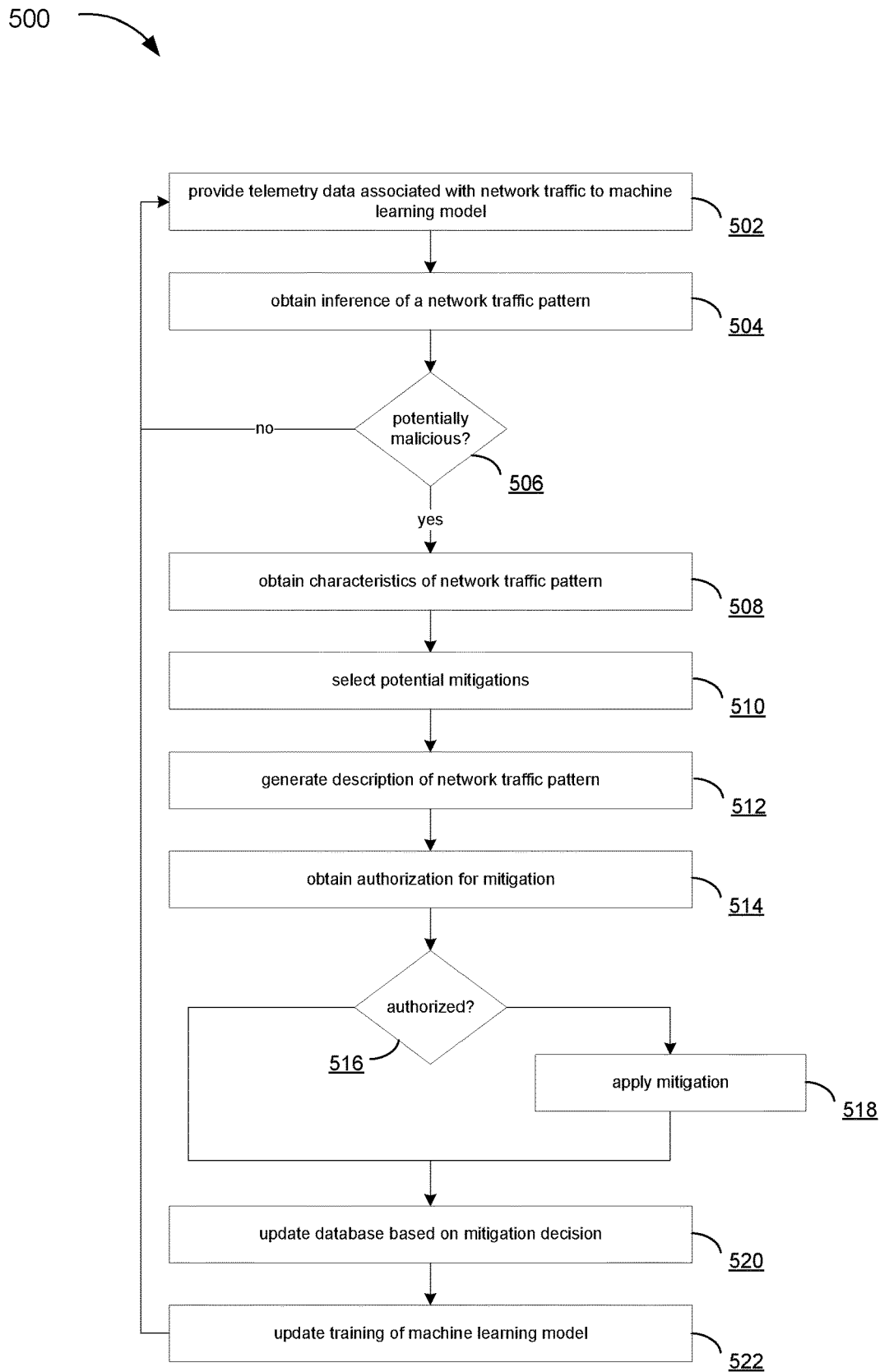
FIG. 5 illustrates a process of operating a networking device, in accordance with at least one embodiment.

FIG. 5 illustrates a process of operating a networking device, in accordance with at least one embodiment. Although the example process 500 is depicted as a sequence of operations, it will be appreciated that, in embodiments, operations depicted in relation to FIG. 5 may be altered in various ways, and that some operations may be omitted, reordered, or performed in parallel with other operations, except where an order is explicitly stated or logically implied, such as when input from one operation depends upon output of another operation.

In at least one embodiment, operations depicted in relation to FIG. 5 are performed by any suitable system, including by a networking device such as those depicted in any of the various figures included in the present disclosure. Examples of such device could include, but are not limited to, DPUs, SmartNICs, smart cables, and other device that include networking capabilities and integrated processors, accelerators, or other circuitry capable of utilizing a machine learning model.

At 502, the networking device provides telemetry data to a machine learning model. In at least one embodiment, the telemetry data is associated with network traffic processed by the networking device. Some of the data may be obtained from an ASIC or other circuitry that is performing a networking function, including but not necessarily limited to those of routing, switching, or forwarding network packets. This can include telemetry data relevant to lower OSI layers, such as L1, L2, or L3.

At 504, the networking device obtains an inference of a network traffic pattern. In at least one embodiment, the inference is obtained from a machine learning model that is maintained and executed by the networking device to obtain the inference. The inference, in some embodiments, may be a discrete classification, such as a binary classification indicating that the network traffic pattern is malicious versus benign, or as undesired verses conforming to intended usage. In other embodiments, non-discrete inferences may be obtained, such as numerical values indicating a likelihood that the analyzed network traffic pattern reflects undesired usage of the network device.

In at least one embodiment, maintenance of the machine learning model comprises storing the parameters of the model in the networking device's memory, and execution of the model comprises evaluating the model with respect to a set of input values, to obtain one or more outputs comprising the inference. The inputs may be the telemetry data obtained at 502.

At 506, the networking device analyzes the obtained inference to determine if a network traffic pattern represents undesired behavior. The networking device may determine, based on the obtained inference, whether or not to respond to the inference. Note that although the response is described in relation to FIG. 5 as being based on a yes/no classification, it will be appreciated that some embodiments may perform steps similar to those described in relation to elements 508 to 522 even if the inference does not definitively identify the analyzed network traffic as undesired.

For example, the system may provide information about network traffic patterns that have been determined, through a machine learning model, to have a probability of being benign, but still present the option of applying mitigation steps or other responses to the data. In some cases, an administrator might indicate that the network traffic pattern is undesired, even though the machine learning model did not initially do so. This decision by the administrator might then be used, as information, in subsequent training of the network device's machine learning model.

At 508, the networking device obtains characteristics of the network traffic pattern. This data can include information associated with the network traffic pattern, such as IP addresses, contents of the data packets, metrics, and so forth. In at least one embodiment, this includes telemetry data collected at 502, but may also include additional data that may be used in subsequent operations, such as generating potential mitigations, describing the network traffic pattern, or obtaining authorization for a mitigating action.

At 510, the networking device selects a potential mitigation to an observed network traffic pattern. In at least one embodiment, selecting a mitigation comprises determining potential modifications to the operation of the networking device. This could, for example, include blocking an IP address determined to be the origin of the network traffic associated with the pattern. In other embodiments, the selection of a potential mitigation comprises sending messages, such as alerts or instructions, to some other device, so that an administrator or other personnel might be notified.

In at least one embodiment, a potential mitigation is selected using an algorithm or heuristic approach. These can include rule-based systems, machine learning algorithms, decision-trees, and other techniques, including one or more of the various artificial intelligence techniques described herein.

At 512, the networking device generates a description of the network traffic pattern, using the information collected at 508. The description may be transmitted by the networking device to some computing device, for presentation to a user. The description may be useful, for example in relation to 514, for obtaining authorization from an administrator to apply a mitigating action in response to a network traffic pattern that has been identified as undesired.

At 514, the networking device obtains authorization for applying a selected mitigation. In at least one embodiment, this is done by transmitting a request to obtain the authorization, and receiving a confirmation or denial of the request. In some cases, the authorization is granted based on input provided by an administrator to a device that processes this request. For example, the networking device may transmit the request to the administrator's cellphone, tablet, personal computer, smart watch, or other similar device, and then receive, from this device, authorization that has been granted based on input from the administrator. The transmitted request may comprise a description of the network traffic pattern, information about the inference made based on the pattern, and additional information collected at 508. The request may further comprise a description of the proposed mitigation. The administrator may then make a decision based on these data points. In some embodiments, an automated or permission-based system may be employed in addition to or instead of obtaining authorization from an administrative user. For example, some mitigations may be automatically authorized, or automatically authorized when certain conditions are met. In one example, a mitigation is automatically authorized when confidence that an observed network traffic pattern is undesired is above a threshold level, and the proposed mitigation is in a class of mitigations for which automatic authorization is permitted.

At 516, if the mitigation is authorized, the flow of the depicted process moves to 518, and the mitigation is applied. Otherwise, the flow of the depicted process moves to 520.

At 520, a database, such as the database 112 depicted in FIG. 1, is updated based on the authorization of the mitigation. For example, if the mitigation was authorized, it may be taken as an indication that a network traffic patterns has been determined to be undesired, and the pattern can be used as an example of undesired behavior the next time the machine learning model, such as the machine learning model 110 depicted in FIG. 1, is trained. This is depicted, in FIG. 5, as element 522, in which a machine learning model is trained, retrained, or refined based on the updated database.

Figure 6:
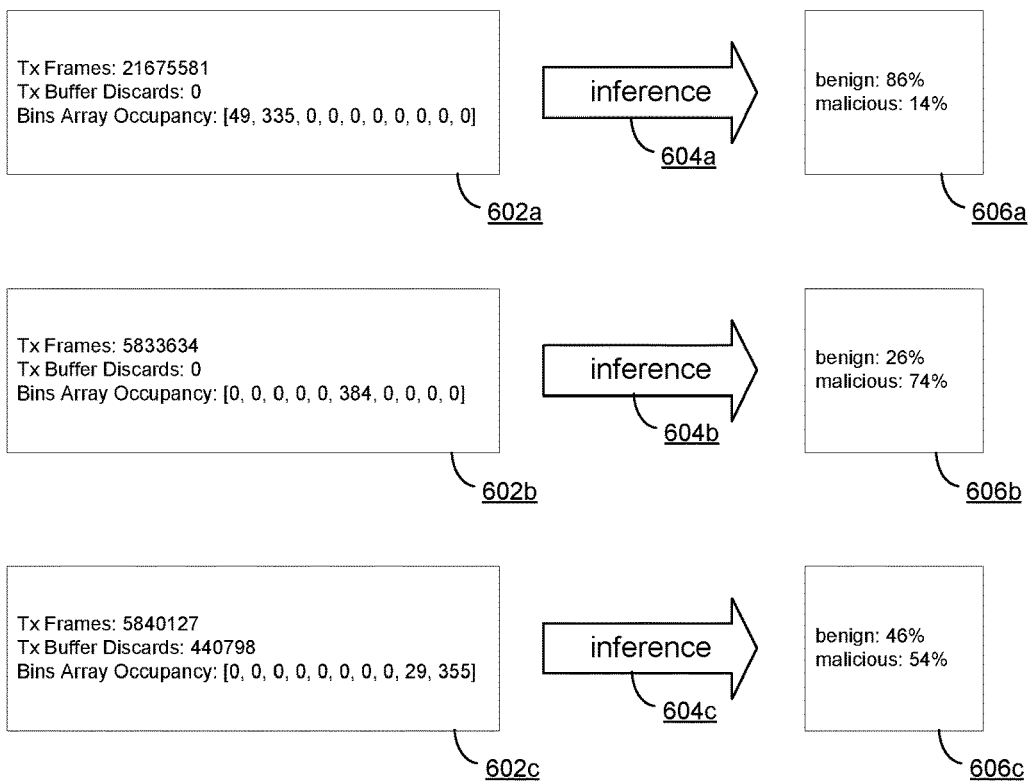
FIG. 6 illustrates examples of inferences by a machine learning model, in accordance with at least one embodiment.

FIG. 6 illustrates examples of inferences by a machine learning model, in accordance with at least one embodiment. In the example 600, telemetry data 602a-602c is used as input to a machine learning model, such as the machine learning model depicted in FIG. 1, to perform a corresponding inference 604a-604c. The output of an inference 604a-604c comprises, in various embodiments, quantitative or qualitative output. For example, as depicted in FIG. 6, the output 606a-606c might comprise numerical quantities indicating probabilities of a particular set of telemetry data being associated with a benign or undesired network traffic pattern. For example, telemetry data 602a might, via inference 604a, be determined to have an 86% chance of being associated with a benign network traffic pattern, and a 14% chance of being undesired. Similarly, telemetry data 602b might, via inference 604b, result in output 606b indicating a 74% chance of the telemetry data 602b being associated with an undesired network traffic pattern.

Figure 7:
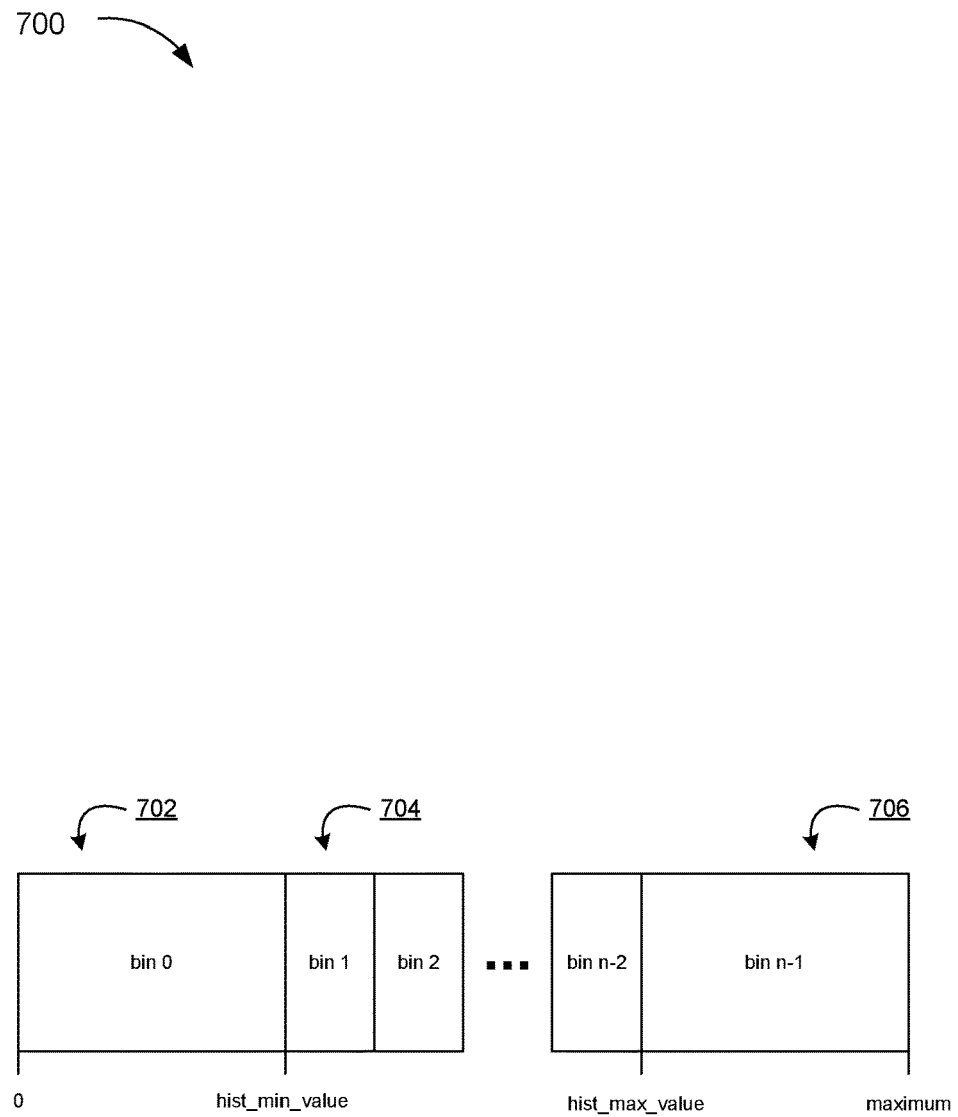
FIG. 7 illustrates an example of a telemetry data comprising a histogram, in accordance with at least one embodiment.

FIG. 7 illustrates an example of a telemetry data comprising a histogram, in accordance with at least one embodiment. In at least one embodiment, telemetry data used as input to a machine learning model, or used to train a machine learning model, comprises histogram data. In at least one embodiment, this histogram data is obtained from a networking device, such as a network switch, and provides information regarding various aspects of the device's operation. In at least one embodiment, a histogram 700 comprises data organized into a number of bins, such as the depicted bins 702. 704, 706, where each bin counts data belonging to the class represented by the particular bin.

For example, in at least one embodiment, histogram 700 is used to store queue occupancy information for a switch device. In this example, queue occupancy refers, in embodiments, to network packets that have arrived at the switch and are awaiting processing, or are in an egress queue post-processing. Queue occupancy, and other telemetry, may be collected and stored by hardware in the network device, such as by a transceiver or other hardware component of the network device. The histogram 700 is divided, in this example, into n bins. The queue depth of a given queue is sampled periodically by a networking device, and information pertaining to the depth stored in the histogram. For every sample, if the queue depth is below a size $s_0$, the counter for "bin 0" is updated, if the queue depth is between $s_0$ and $s_1$, "bin 1" is updated, and so on. In at least one embodiment, a machine learning model is trained to infer malicious or other undesired usage using this histogram. In some cases, the training may be based on data within a particular range of the histogram 700. An example of this is depicted in FIG. 7, which shows a range of bins 1 to n−2, falling between hist_min_value and hist_max_value.

In at least one embodiment, histograms are constructed on a per-port basis, in order to describe the activity associated with a given port. This data may be obtained, in embodiments, from buffers in the network device which facilitates telemetry collection on a per-port basis. In some cases, histograms are global, to describe activity associated with the device as a whole. This data may also be obtained, in some embodiments, via the network device's hardware, such as a transceiver or other component. The histograms collected via these methods, and other forms of histograms, are used in some embodiments as input for training a machine learning model or as input for obtaining inferences from a machine learning model.

FIG. 8 illustrates an additional example of telemetry data, in accordance with at least one embodiment. In FIG. 8, the example histogram 800 is based on packet latency. In at least one embodiment, a latency histogram is constructed by counting each egressing packet in a bin of the histogram 800, according to the packet's latency. For example, the histogram 800 might be depicted as a table comprising a latency column 802 and a count column 804. In the depicted example, 3456 packets having 16 ms or less latency were counted, 5543 packets were counted as having latency greater than 16 ms but less than or equal to 32 ms, and so on.

In at least one embodiment, a machine learning model is trained with or uses telemetry data that includes one or more performance counters. Examples of performance counters include those that pertain to usage per traffic class, traffic class congestion, extended counter groups, and so forth. Examples of performance counters may be found in Ethernet standards such as 802.3, Ethernet RFC 2863, Ethernet RFC 2819, and Ethernet RFC 3635. These examples are intended to be illustrative, and as such, should not be construed in a manner which would limit the scope of the present disclosure to only those that include the specific examples provided.

In at least one embodiment, a machine learning model is trained with or uses telemetry data that includes one or more management counters. In at least one embodiment, management counters include counters related to aspects of device operation such as temperature. For example, management counters may include data such as current temperature, temperature over time, counts of times at which maximum temperature was exceeded, counts of times at which a temperature range was entered or exceeded, and so forth. Other examples of management data can include, in various embodiments, the version number of software or hardware in a networking device, the number of attempts made to access certain ports or services, and so on. These examples are intended to be illustrative, and as such, should not be construed in a manner which would limit the scope of the present disclosure to only those that include the specific examples provided.

Figure 9:
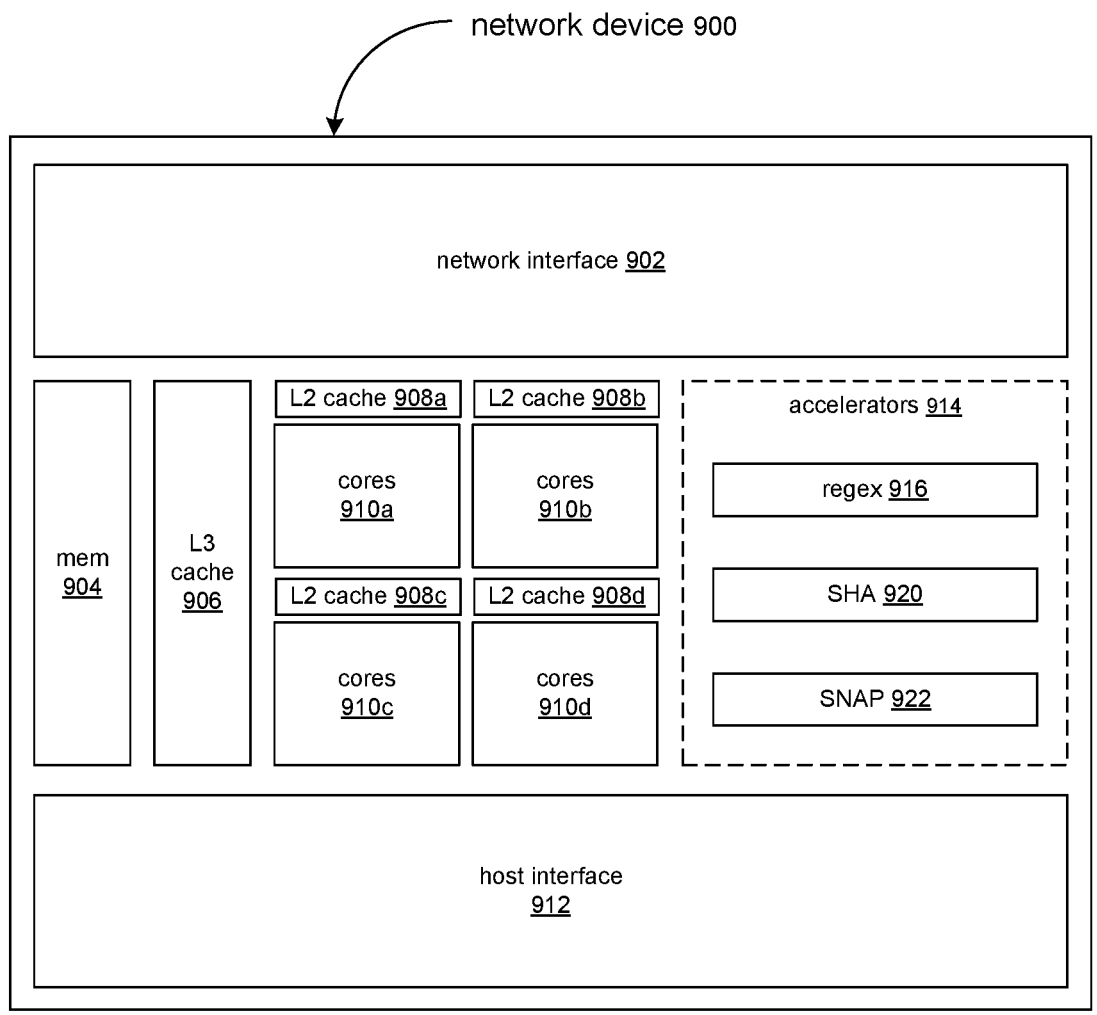
FIG. 9 illustrates an example of a networking device, in accordance with at least one embodiment.

FIG. 9 illustrates an example of a network device, in accordance with at least one embodiment. The example network device 900 comprises processor cores 910a-910d, accelerators 914, and memory 904. Associated with the cores 910a-910d are processor caches, such as the depicted L2 caches 908-a-d, and one or more additional caches, such as the L3 cache 906, to support operation of the cores 910a-910d and accelerators 914. The network device 900 may sometimes be described as a DPU, smart networking device, or smart network interface card.

The network device further comprises a network interface 902 and a host interface 912. In at least one embodiment, network interface 902 comprises circuitry for communicating with a wireless or wired network. For example, in at least one embodiment, the network interface 902 comprises one or more ports for network communication such as Ethernet, InfiniBand, Fibre-Channel, and so forth. In at least one embodiment, the network interface 902 comprises one or more wireless receivers, such as those used in IEEE 802.11 or Bluetooth.

In at least one embodiment, host interface 912 comprises circuitry for communicating between the network device 900 and a host computing device. Examples of a host interface 912 include, but are not limited to, peripheral component interconnect ("PCI") and PCI Express ("PCIe") interface. In at least one embodiment, NVMe over PCIe is used.

In at least one embodiment, examples of accelerators 914 include, but are not necessarily limited to, a regex accelerator 916, an SHA accelerator 920, and a SNAP accelerator 922. The regex accelerator 916 may sometimes be referred to as a RegEx matching processor. It includes circuitry for rapidly performing regular expression searches on data obtained by the network device 900. The SHA accelerator 920 comprises circuitry for rapidly calculating SHA hashes of data obtained by the network device 900. The SNAP accelerator 922 comprises circuitry to enable hardware-accelerated virtualization of storage. In at least one embodiment, this storage is NVMe storage, and may be used to make networked storage look like a local NVMe SSD, emulating an NVMe drive on a PCIe bus. Note that the accelerators 914 each comprise circuitry adapted to their particular purpose, rather than being general-purpose computing processors. For example, the regex accelerator 916 comprises circuitry particularly adapted to identify patterns in data, and the SHA accelerator 920 comprises circuitry particularly adapted to generate SHA hashes.

In at least one embodiment, the techniques described herein are practiced in an active cable. An active cable may sometimes be referred to as a smart cable, intelligent cable, or using other similar nomenclature. An active cable may include circuitry to perform functions such as signal processing, conversion between transmission formats, conversion between transmission media (such as between electrical and optical transmission media), and so forth. In at least one embodiment, an active cable comprises circuitry for collecting telemetry data and analyzing the data using a machine learning model as described herein. The active cable may further comprise one or more general-purpose or specialized processors for using a machine learning model to obtain an inference of a network traffic pattern and respond to the inference.

Servers and Data Centers

The following figures set forth, without limitation, exemplary network server and data center-based systems that can be used to implement at least one embodiment.

Figure 10:
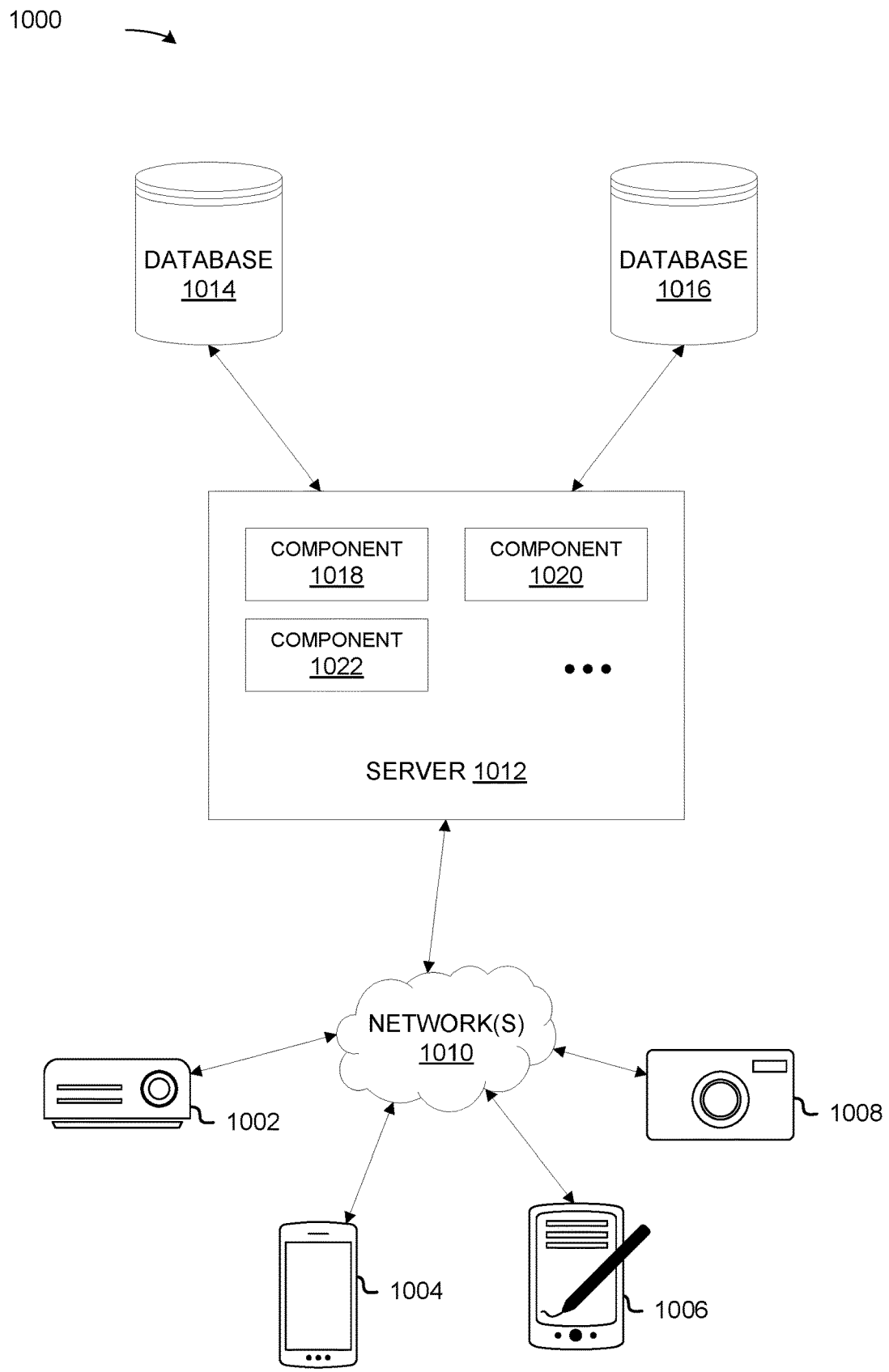
FIG. 10 illustrates a distributed system, in accordance with at least one embodiment.

FIG. 10 illustrates a distributed system 1000, in accordance with at least one embodiment. In at least one embodiment, distributed system 1000 includes one or more client computing devices 1002, 1004, 1006, and 1008, which are configured to execute and operate a client application such as a web browser, proprietary client, and/or variations thereof over one or more network(s) 1010. In at least one embodiment, server 1012 may be communicatively coupled with remote client computing devices 1002, 1004, 1006, and 1008 via network 1010.

In at least one embodiment, server 1012 may be adapted to run one or more services or software applications such as services and applications that may manage session activity of single sign-on (SSO) access across multiple data centers. In at least one embodiment, server 1012 may also provide other services or software applications can include non-virtual and virtual environments. In at least one embodiment, these services may be offered as web-based or cloud services or under a Software as a Service (SaaS) model to users of client computing devices 1002, 1004, 1006, and/or 1008. In at least one embodiment, users operating client computing devices 1002, 1004, 1006, and/or 1008 may in turn utilize one or more client applications to interact with server 1012 to utilize services provided by these components.

In at least one embodiment, software components 1018, 1020 and 1022 of system 1000 are implemented on server 1012. In at least one embodiment, one or more components of system 1000 and/or services provided by these components may also be implemented by one or more of client computing devices 1002, 1004, 1006, and/or 1008. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 1000. The embodiment shown in FIG. 10 is thus one example of a distributed system for implementing an embodiment system and is not intended to be limiting.

In at least one embodiment, client computing devices 1002, 1004, 1006, and/or 1008 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1010. Although distributed system 1000 in FIG. 10 is shown with four client computing devices, any number of client computing devices may be supported. Other devices, such as devices with sensors, etc., may interact with server 1012.

In at least one embodiment, network(s) 1010 in distributed system 1000 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 1010 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 1012 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 1012 using software defined networking. In at least one embodiment, server 1012 may be adapted to run one or more services or software applications.

In at least one embodiment, server 1012 may run any operating system, as well as any commercially available server operating system. In at least one embodiment, server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, exemplary database servers include without limitation those commercially available from Oracle, Microsoft, Sybase, IBM (International Business Machines), and/or variations thereof.

In at least one embodiment, server 1012 may include one or more applications to analyze and consolidate data feeds and/or event updates received from users of client computing devices 1002, 1004, 1006, and 1008. In at least one embodiment, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and/or variations thereof. In at least one embodiment, server 1012 may also include one or more applications to display data feeds and/or real-time events via one or more display devices of client computing devices 1002, 1004, 1006, and 1008.

In at least one embodiment, distributed system 1000 may also include one or more databases 1014 and 1016. In at least one embodiment, databases may provide a mechanism for storing information such as user interactions information, usage patterns information, adaptation rules information, and other information. In at least one embodiment, databases 1014 and 1016 may reside in a variety of locations. In at least one embodiment, one or more of databases 1014 and 1016 may reside on a non-transitory storage medium local to (and/or resident in) server 1012. In at least one embodiment, databases 1014 and 1016 may be remote from server 1012 and in communication with server 1012 via a network-based or dedicated connection. In at least one embodiment, databases 1014 and 1016 may reside in a storage-area network (SAN). In at least one embodiment, any necessary files for performing functions attributed to server 1012 may be stored locally on server 1012 and/or remotely, as appropriate. In at least one embodiment, databases 1014 and 1016 may include relational databases, such as databases that are adapted to store, update, and retrieve data in response to SQL-formatted commands.

Figure 11:
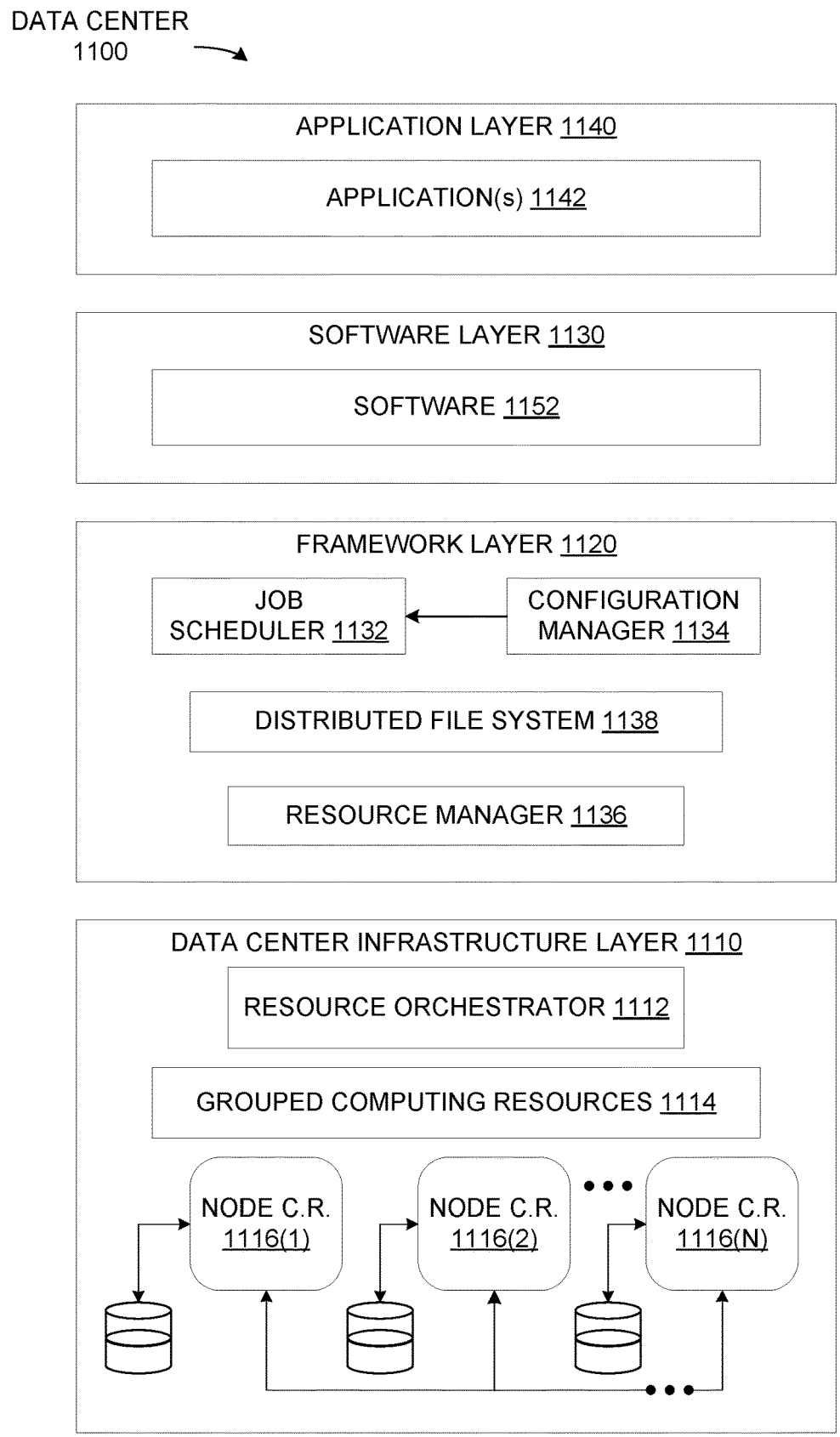
FIG. 11 illustrates an exemplary data center, in accordance with at least one embodiment.

FIG. 11 illustrates an exemplary data center 1100, in accordance with at least one embodiment. In at least one embodiment, data center 1100 includes, without limitation, a data center infrastructure layer 1110, a framework layer 1120, a software layer 1130 and an application layer 1140.

In at least one embodiment, as shown in FIG. 11, data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1116(1)-1116(N) may be a server having one or more of above-mentioned computing resources.

In at least one embodiment, grouped computing resources 1114 may include separate groupings of node C.R.s housed within one or more racks (not shown), or many racks housed in data centers at various geographical locations (also not shown). Separate groupings of node C.R.s within grouped computing resources 1114 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1112 may configure or otherwise control one or more node C.R.s 1116(1)-1116(N) and/or grouped computing resources 1114. In at least one embodiment, resource orchestrator 1112 may include a software design infrastructure ("SDI") management entity for data center 1100. In at least one embodiment, resource orchestrator 1112 may include hardware, software or some combination thereof.

In at least one embodiment, as shown in FIG. 11, framework layer 1120 includes, without limitation, a job scheduler 1132, a configuration manager 1134, a resource manager 1136 and a distributed file system 1138. In at least one embodiment, framework layer 1120 may include a framework to support software 1152 of software layer 1130 and/or one or more application(s) 1142 of application layer 1140. In at least one embodiment, software 1152 or application(s) 1142 may respectively include web-based service software or applications, such as those provided by Amazon Web Services, Google Cloud and Microsoft Azure. In at least one embodiment, framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1132 may include a Spark driver to facilitate scheduling of workloads supported by various layers of data center 1100. In at least one embodiment, configuration manager 1134 may be capable of configuring different layers such as software layer 1130 and framework layer 1120, including Spark and distributed file system 1138 for supporting large-scale data processing. In at least one embodiment, resource manager 1136 may be capable of managing clustered or grouped computing resources mapped to or allocated for support of distributed file system 1138 and job scheduler 1132. In at least one embodiment, clustered or grouped computing resources may include grouped computing resource 1114 at data center infrastructure layer 1110. In at least one embodiment, resource manager 1136 may coordinate with resource orchestrator 1112 to manage these mapped or allocated computing resources.

In at least one embodiment, software 1152 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1138 of framework layer 1120. In at least one or more types of applications may include, without limitation, CUDA applications, 5G network applications, artificial intelligence application, data center applications, and/or variations thereof.

In at least one embodiment, any of configuration manager 1134, resource manager 1136, and resource orchestrator 1112 may implement any number and type of self-modifying actions based on any amount and type of data acquired in any technically feasible fashion. In at least one embodiment, self-modifying actions may relieve a data center operator of data center 1100 from making possibly bad configuration decisions and possibly avoiding underutilized and/or poor performing portions of a data center.

Figure 12:
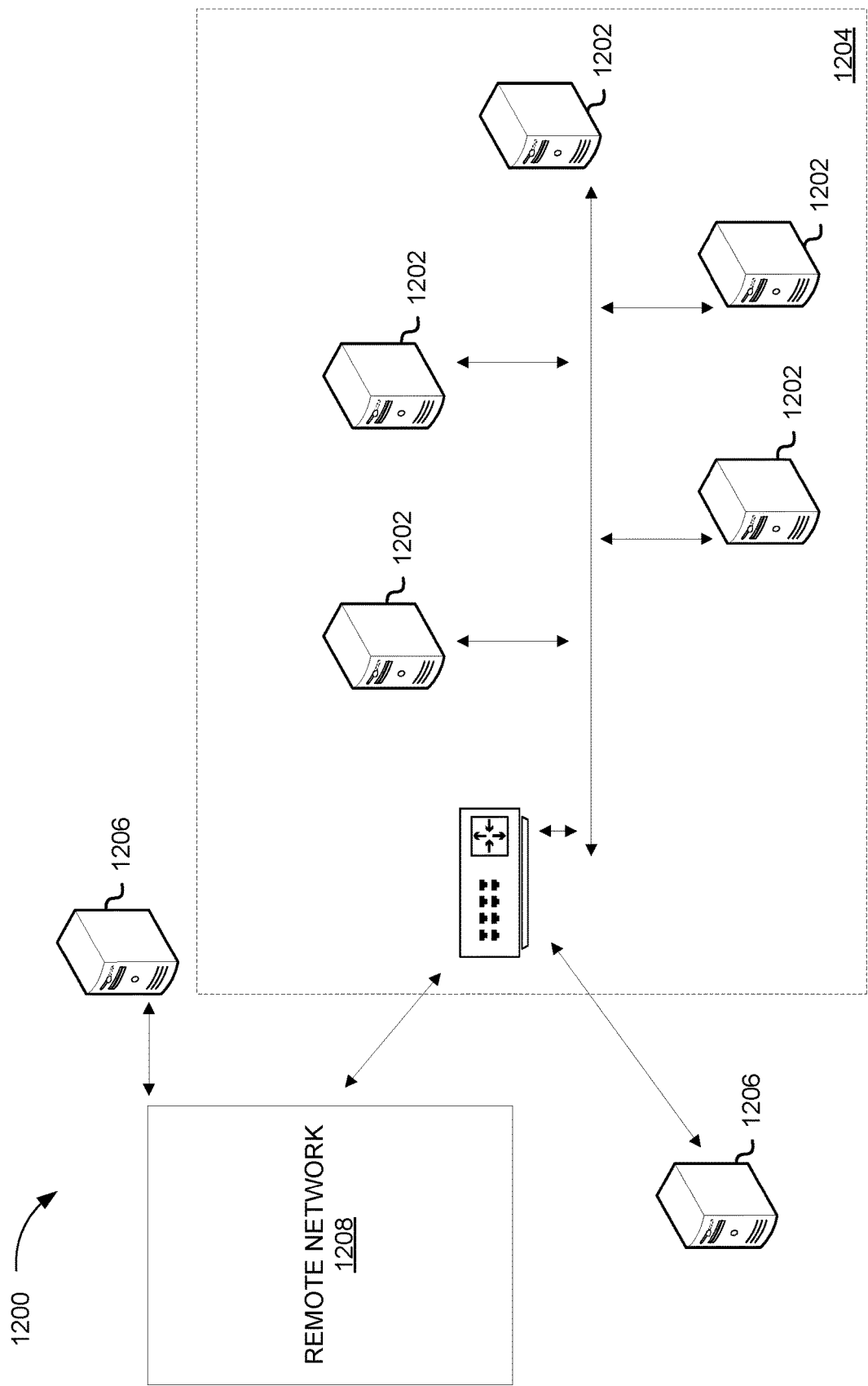
FIG. 12 illustrates a client-server network, in accordance with at least one embodiment.

FIG. 12 illustrates a client-server network 1204 formed by a plurality of network server computers 1202 which are interlinked, in accordance with at least one embodiment. In at least one embodiment, each network server computer 1202 stores data accessible to other network server computers 1202 and to client computers 1206 and networks 1208 which link into a wide area network 1204. In at least one embodiment, configuration of a client-server network 1204 may change over time as client computers 1206 and one or more networks 1208 connect and disconnect from a network 1204, and as one or more trunk line server computers 1202 are added or removed from a network 1204. In at least one embodiment, when a client computer 1206 and a network 1208 are connected with network server computers 1202, client-server network includes such client computer 1206 and network 1208. In at least one embodiment, the term computer includes any device or machine capable of accepting data, applying prescribed processes to data, and supplying results of processes.

In at least one embodiment, client-server network 1204 stores information which is accessible to network server computers 1202, remote networks 1208 and client computers 1206. In at least one embodiment, network server computers 1202 are formed by main frame computers minicomputers, and/or microcomputers having one or more processors each. In at least one embodiment, server computers 1202 are linked together by wired and/or wireless transfer media, such as conductive wire, fiber optic cable, and/or microwave transmission media, satellite transmission media or other conductive, optic or electromagnetic wave transmission media. In at least one embodiment, client computers 1206 access a network server computer 1202 by a similar wired or a wireless transfer medium. In at least one embodiment, a client computer 1206 may link into a client-server network 1204 using a modem and a standard telephone communication network. In at least one embodiment, alternative carrier systems such as cable and satellite communication systems also may be used to link into client-server network 1204. In at least one embodiment, other private or time-shared carrier systems may be used. In at least one embodiment, network 1204 is a global information network, such as the Internet. In at least one embodiment, network is a private intranet using similar protocols as the Internet, but with added security measures and restricted access controls. In at least one embodiment, network 1204 is a private, or semi-private network using proprietary communication protocols.

In at least one embodiment, client computer 1206 is any end user computer, and may also be a mainframe computer, mini-computer or microcomputer having one or more microprocessors. In at least one embodiment, server computer 1202 may at times function as a client computer accessing another server computer 1202. In at least one embodiment, remote network 1208 may be a local area network, a network added into a wide area network through an independent service provider (ISP) for the Internet, or another group of computers interconnected by wired or wireless transfer media having a configuration which is either fixed or changing over time. In at least one embodiment, client computers 1206 may link into and access a network 1204 independently or through a remote network 1208.

Figure 13:
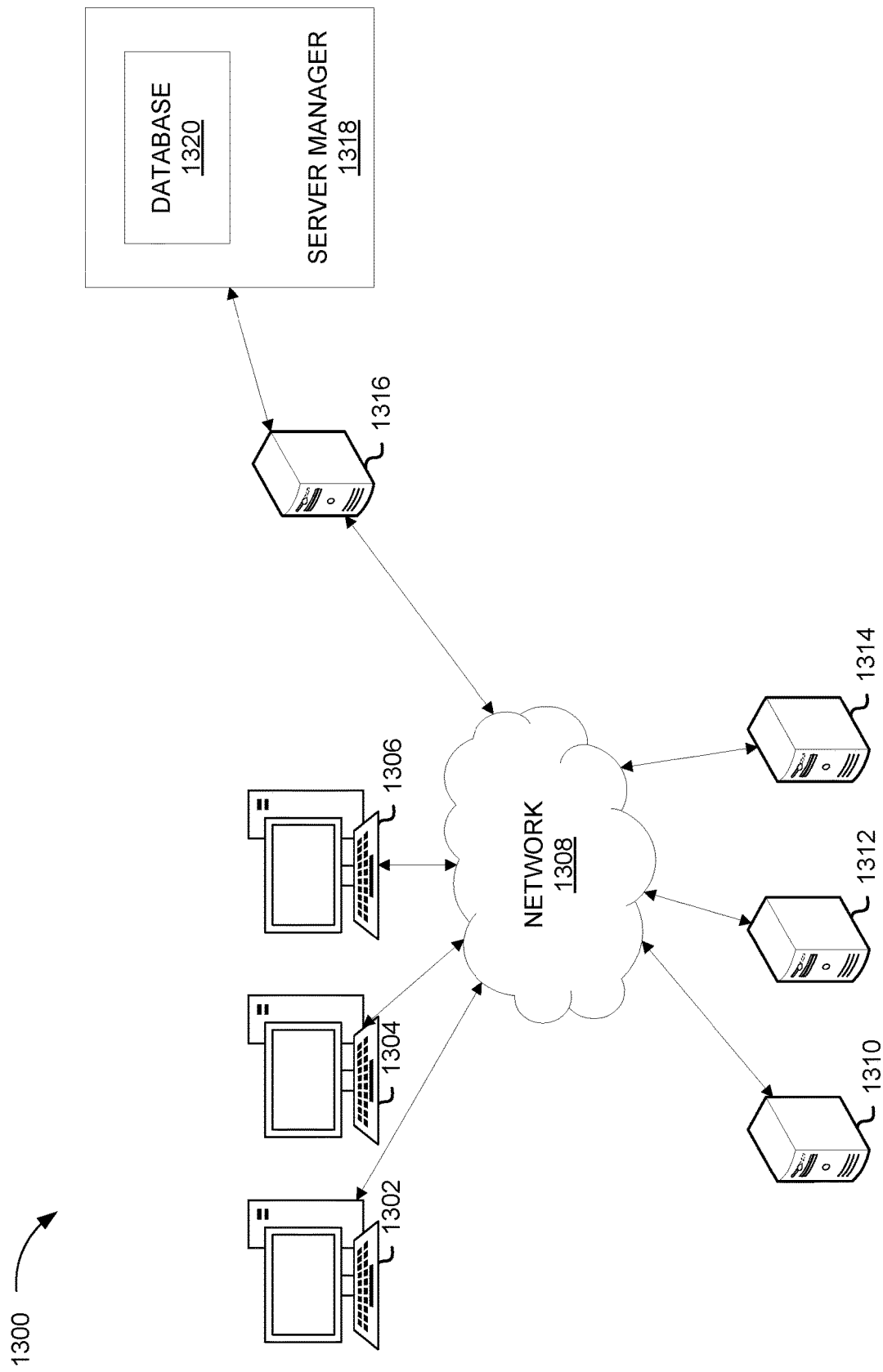
FIG. 13 illustrates a computer network, in accordance with at least one embodiment.

FIG. 13 illustrates a computer network 1308 connecting one or more computing machines, in accordance with at least one embodiment. In at least one embodiment, network 1308 may be any type of electronically connected group of computers including, for instance, the following networks: Internet, Intranet, Local Area Networks (LAN), Wide Area Networks (WAN) or an interconnected combination of these network types. In at least one embodiment, connectivity within a network 1308 may be a remote modem, Ethernet (IEEE 802.3), Token Ring (IEEE 802.5), Fiber Distributed Datalink Interface (FDDI), Asynchronous Transfer Mode (ATM), or any other communication protocol. In at least one embodiment, computing devices linked to a network may be desktop, server, portable, handheld, set-top box, personal digital assistant (PDA), a terminal, or any other desired type or configuration. In at least one embodiment, depending on their functionality, network connected devices may vary widely in processing power, internal memory, and other performance aspects. In at least one embodiment, communications within a network and to or from computing devices connected to a network may be either wired or wireless. In at least one embodiment, network 1308 may include, at least in part, the world-wide public Internet which generally connects a plurality of users in accordance with a client-server model in accordance with a transmission control protocol/internet protocol (TCP/IP) specification. In at least one embodiment, client-server network is a dominant model for communicating between two computers. In at least one embodiment, a client computer ("client") issues one or more commands to a server computer ("server"). In at least one embodiment, server fulfills client commands by accessing available network resources and returning information to a client pursuant to client commands. In at least one embodiment, client computer systems and network resources resident on network servers are assigned a network address for identification during communications between elements of a network. In at least one embodiment, communications from other network connected systems to servers will include a network address of a relevant server/network resource as part of communication so that an appropriate destination of a data/request is identified as a recipient. In at least one embodiment, when a network 1308 comprises the global Internet, a network address is an IP address in a TCP/IP format which may, at least in part, route data to an e-mail account, a website, or other Internet tool resident on a server. In at least one embodiment, information and services which are resident on network servers may be available to a web browser of a client computer through a domain name (e.g., www.site.com) which maps to an IP address of a network server.

In at least one embodiment, a plurality of clients 1302, 1304, and 1306 are connected to a network 1308 via respective communication links. In at least one embodiment, each of these clients may access a network 1308 via any desired form of communication, such as via a dial-up modem connection, cable link, a digital subscriber line (DSL), wireless or satellite link, or any other form of communication. In at least one embodiment, each client may communicate using any machine that is compatible with a network 1308, such as a personal computer (PC), work station, dedicated terminal, personal data assistant (PDA), or other similar equipment. In at least one embodiment, clients 1302, 1304, and 1306 may or may not be located in a same geographical area.

In at least one embodiment, a plurality of servers 1310, 1312, and 1314 are connected to a network 1308 to serve clients that are in communication with a network 1308. In at least one embodiment, each server is typically a powerful computer or device that manages network resources and responds to client commands. In at least one embodiment, servers include computer readable data storage media such as hard disk drives and RAM memory that store program instructions and data. In at least one embodiment, servers 1310, 1312, 1314 run application programs that respond to client commands. In at least one embodiment, server 1310 may run a web server application for responding to client requests for HTML, pages and may also run a mail server application for receiving and routing electronic mail. In at least one embodiment, other application programs, such as an FTP server or a media server for streaming audio/video data to clients may also be running on a server 1310. In at least one embodiment, different servers may be dedicated to performing different tasks. In at least one embodiment, server 1310 may be a dedicated web server that manages resources relating to web sites for various users, whereas a server 1312 may be dedicated to provide electronic mail (email) management. In at least one embodiment, other servers may be dedicated for media (audio, video, etc.), file transfer protocol (FTP), or a combination of any two or more services that are typically available or provided over a network. In at least one embodiment, each server may be in a location that is the same as or different from that of other servers. In at least one embodiment, there may be multiple servers that perform mirrored tasks for users, thereby relieving congestion or minimizing traffic directed to and from a single server. In at least one embodiment, servers 1310, 1312, 1314 are under control of a web hosting provider in a business of maintaining and delivering third party content over a network 1308.

In at least one embodiment, web hosting providers deliver services to two different types of clients. In at least one embodiment, one type, which may be referred to as a browser, requests content from servers 1310, 1312, 1314 such as web pages, email messages, video clips, etc. In at least one embodiment, a second type, which may be referred to as a user, hires a web hosting provider to maintain a network resource such as a web site, and to make it available to browsers. In at least one embodiment, users contract with a web hosting provider to make memory space, processor capacity, and communication bandwidth available for their desired network resource in accordance with an amount of server resources a user desires to utilize.

In at least one embodiment, in order for a web hosting provider to provide services for both of these clients, application programs which manage a network resources hosted by servers must be properly configured. In at least one embodiment, program configuration process involves defining a set of parameters which control, at least in part, an application program's response to browser requests and which also define, at least in part, a server resources available to a particular user.

In one embodiment, an intranet server 1316 is in communication with a network 1308 via a communication link. In at least one embodiment, intranet server 1316 is in communication with a server manager 1318. In at least one embodiment, server manager 1318 comprises a database of an application program configuration parameters which are being utilized in servers 1310, 1312, 1314. In at least one embodiment, users modify a database 1320 via an intranet 1316, and a server manager 1318 interacts with servers 1310, 1312, 1314 to modify application program parameters so that they match a content of a database. In at least one embodiment, a user logs onto an intranet server 1316 by connecting to an intranet 1316 via computer 1302 and entering authentication information, such as a username and password.

In at least one embodiment, when a user wishes to sign up for new service or modify an existing service, an intranet server 1316 authenticates a user and provides a user with an interactive screen display/control panel that allows a user to access configuration parameters for a particular application program. In at least one embodiment, a user is presented with a number of modifiable text boxes that describe aspects of a configuration of a user's web site or other network resource. In at least one embodiment, if a user desires to increase memory space reserved on a server for its web site, a user is provided with a field in which a user specifies a desired memory space. In at least one embodiment, in response to receiving this information, an intranet server 1316 updates a database 1320. In at least one embodiment, server manager 1318 forwards this information to an appropriate server, and a new parameter is used during application program operation. In at least one embodiment, an intranet server 1316 is configured to provide users with access to configuration parameters of hosted network resources (e.g., web pages, email, FTP sites, media sites, etc.), for which a user has contracted with a web hosting service provider.

FIG. 14A illustrates a networked computer system 1400A, in accordance with at least one embodiment. In at least one embodiment, networked computer system 1400A comprises a plurality of nodes or personal computers ("PCs") 1402, 1418, 1420. In at least one embodiment, personal computer or node 1402 comprises a processor 1414, memory 1416, video camera 1404, microphone 1406, mouse 1408, speakers 1410, and monitor 1412. In at least one embodiment, PCs 1402, 1418, 1420 may each run one or more desktop servers of an internal network within a given company, for instance, or may be servers of a general network not limited to a specific environment. In at least one embodiment, there is one server per PC node of a network, so that each PC node of a network represents a particular network server, having a particular network URL address. In at least one embodiment, each server defaults to a default web page for that server's user, which may itself contain embedded URLs pointing to further subpages of that user on that server, or to other servers or pages on other servers on a network.

In at least one embodiment, nodes 1402, 1418, 1420 and other nodes of a network are interconnected via medium 1422. In at least one embodiment, medium 1422 may be, a communication channel such as an Integrated Services Digital Network ("ISDN"). In at least one embodiment, various nodes of a networked computer system may be connected through a variety of communication media, including local area networks ("LANs"), plain-old telephone lines ("POTS"), sometimes referred to as public switched telephone networks ("PSTN"), and/or variations thereof. In at least one embodiment, various nodes of a network may also constitute computer system users inter-connected via a network such as the Internet. In at least one embodiment, each server on a network (running from a particular node of a network at a given instance) has a unique address or identification within a network, which may be specifiable in terms of an URL.

In at least one embodiment, a plurality of multi-point conferencing units ("MCUs") may thus be utilized to transmit data to and from various nodes or "endpoints" of a conferencing system. In at least one embodiment, nodes and/or MCUs may be interconnected via an ISDN link or through a local area network ("LAN"), in addition to various other communications media such as nodes connected through the Internet. In at least one embodiment, nodes of a conferencing system may, in general, be connected directly to a communications medium such as a LAN or through an MCU, and that a conferencing system may comprise other nodes or elements such as routers, servers, and/or variations thereof.

In at least one embodiment, processor 1414 is a general-purpose programmable processor. In at least one embodiment, processors of nodes of networked computer system 1400A may also be special-purpose video processors. In at least one embodiment, various peripherals and components of a node such as those of node 1402 may vary from those of other nodes. In at least one embodiment, node 1418 and node 1420 may be configured identically to or differently than node 1402. In at least one embodiment, a node may be implemented on any suitable computer system in addition to PC systems.

Figure 14B:
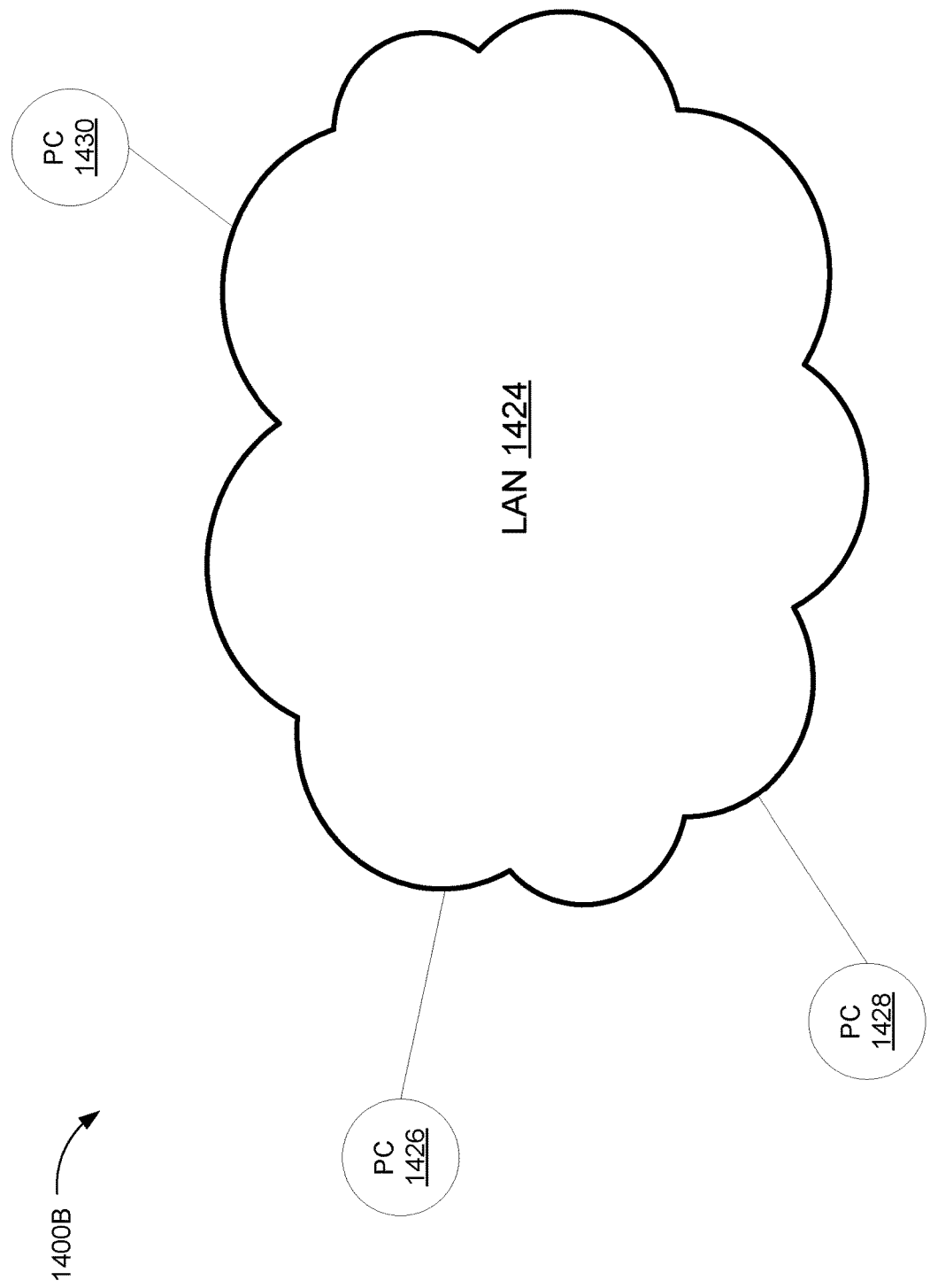
FIG. 14B illustrates a networked computer system, in accordance with at least one embodiment.

FIG. 14B illustrates a networked computer system 1400B, in accordance with at least one embodiment. In at least one embodiment, system 1400B illustrates a network such as LAN 1424, which may be used to interconnect a variety of nodes that may communicate with each other. In at least one embodiment, attached to LAN 1424 are a plurality of nodes such as PC nodes 1426, 1428, 1430. In at least one embodiment, a node may also be connected to the LAN via a network server or other means. In at least one embodiment, system 1400B comprises other types of nodes or elements, for example including routers, servers, and nodes.

Figure 14C:
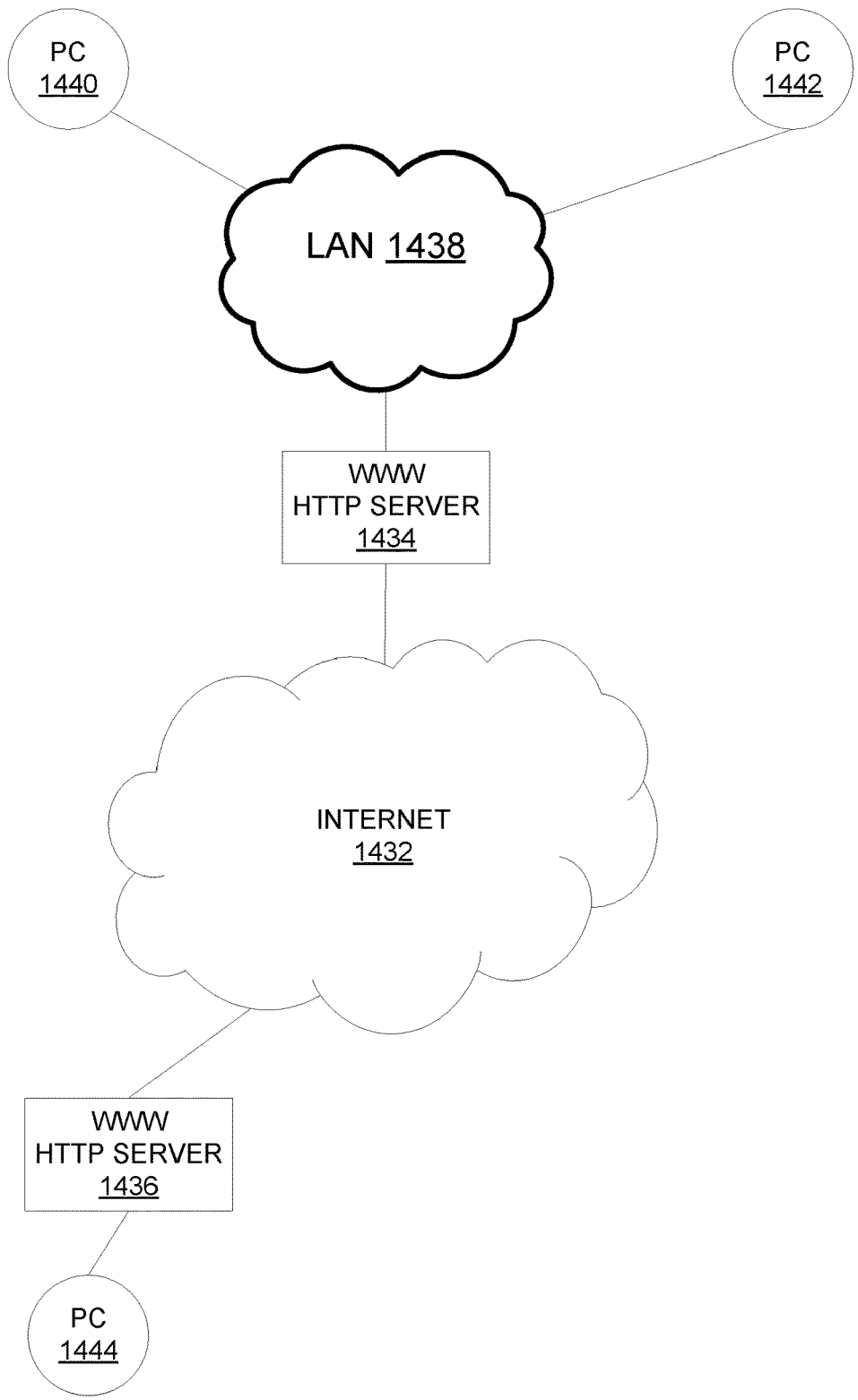
FIG. 14C illustrates a networked computer system, in accordance with at least one embodiment.

FIG. 14C illustrates a networked computer system 1400C, in accordance with at least one embodiment. In at least one embodiment, system 1400C illustrates a WWW system having communications across a backbone communications network such as Internet 1432, which may be used to interconnect a variety of nodes of a network. In at least one embodiment, WWW is a set of protocols operating on top of the Internet, and allows a graphical interface system to operate thereon for accessing information through the Internet. In at least one embodiment, attached to Internet 1432 in WWW are a plurality of nodes such as PCs 1440, 1442, 1444. In at least one embodiment, a node is interfaced to other nodes of WWW through a WWW HTTP server such as servers 1434, 1436. In at least one embodiment, PC 1444 may be a PC forming a node of network 1432 and itself running its server 1436, although PC 1444 and server 1436 are illustrated separately in FIG. 14C for illustrative purposes.

In at least one embodiment, WWW is a distributed type of application, characterized by WWW HTTP, WWW's protocol, which runs on top of the Internet's transmission control protocol/Internet protocol ("TCP/IP"). In at least one embodiment, WWW may thus be characterized by a set of protocols (i.e., HTTP) running on the Internet as its "backbone."

In at least one embodiment, a web browser is an application running on a node of a network that, in WWW-compatible type network systems, allows users of a particular server or node to view such information and thus allows a user to search graphical and text-based files that are linked together using hypertext links that are embedded in documents or files available from servers on a network that understand HTTP. In at least one embodiment, when a given web page of a first server associated with a first node is retrieved by a user using another server on a network such as the Internet, a document retrieved may have various hypertext links embedded therein and a local copy of a page is created local to a retrieving user. In at least one embodiment, when a user clicks on a hypertext link, locally-stored information related to a selected hypertext link is typically sufficient to allow a user's machine to open a connection across the Internet to a server indicated by a hypertext link.

In at least one embodiment, more than one user may be coupled to each HTTP server, for example through a LAN such as LAN 1438 as illustrated with respect to WWW HTTP server 1434. In at least one embodiment, system 1400C may also comprise other types of nodes or elements. In at least one embodiment, a WWW HTTP server is an application running on a machine, such as a PC. In at least one embodiment, each user may be considered to have a unique "server," as illustrated with respect to PC 1444. In at least one embodiment, a server may be considered to be a server such as WWW HTTP server 1434, which provides access to a network for a LAN or plurality of nodes or plurality of LANs. In at least one embodiment, there are a plurality of users, each having a desktop PC or node of a network, each desktop PC potentially establishing a server for a user thereof. In at least one embodiment, each server is associated with a particular network address or URL, which, when accessed, provides a default web page for that user. In at least one embodiment, a web page may contain further links (embedded URLs) pointing to further subpages of that user on that server, or to other servers on a network or to pages on other servers on a network.

Cloud Computing and Services

The following figures set forth, without limitation, exemplary cloud-based systems that can be used to implement at least one embodiment.

In at least one embodiment, cloud computing is a style of computing in which dynamically scalable and often virtualized resources are provided as a service over the Internet. In at least one embodiment, users need not have knowledge of, expertise in, or control over technology infrastructure, which can be referred to as "in the cloud," that supports them. In at least one embodiment, cloud computing incorporates infrastructure as a service, platform as a service, software as a service, and other variations that have a common theme of reliance on the Internet for satisfying computing needs of users. In at least one embodiment, a typical cloud deployment, such as in a private cloud (e.g., enterprise network), or a data center (DC) in a public cloud (e.g., Internet) can consist of thousands of servers (or alternatively, VMs), hundreds of Ethernet, Fiber Channel or Fiber Channel over Ethernet (FCoE) ports, switching and storage infrastructure, etc. In at least one embodiment, cloud can also consist of network services infrastructure like IPsec VPN hubs, firewalls, load balancers, wide area network (WAN) optimizers etc. In at least one embodiment, remote subscribers can access cloud applications and services securely by connecting via a VPN tunnel, such as an IPsec VPN tunnel.

In at least one embodiment, cloud computing is a model for enabling convenient, on-demand network access to a shared pool of configurable computing resources (e.g., networks, servers, storage, applications, and services) that can be rapidly provisioned and released with minimal management effort or service provider interaction.

In at least one embodiment, cloud computing is characterized by on-demand self-service, in which a consumer can unilaterally provision computing capabilities, such as server time and network storage, as needed automatically without requiring human interaction with each service's provider. In at least one embodiment, cloud computing is characterized by broad network access, in which capabilities are available over a network and accessed through standard mechanisms that promote use by heterogeneous thin or thick client platforms (e.g., mobile phones, laptops, and PDAs). In at least one embodiment, cloud computing is characterized by resource pooling, in which a provider's computing resources are pooled to serve multiple consumers using a multi-tenant model, with different physical and virtual resources dynamically as-signed and reassigned according to consumer demand. In at least one embodiment, there is a sense of location independence in that a customer generally has no control or knowledge over an exact location of provided resources, but may be able to specify location at a higher level of abstraction (e.g., country, state, or datacenter). In at least one embodiment, examples of resources include storage, processing, memory, network bandwidth, and virtual machines. In at least one embodiment, cloud computing is characterized by rapid elasticity, in which capabilities can be rapidly and elastically provisioned, in some cases automatically, to quickly scale out and rapidly released to quickly scale in. In at least one embodiment, to a consumer, capabilities available for provisioning often appear to be unlimited and can be purchased in any quantity at any time. In at least one embodiment, cloud computing is characterized by measured service, in which cloud systems automatically control and optimize resource use by leveraging a metering capability at some level of abstraction appropriate to a type of service (e.g., storage, processing, bandwidth, and active user accounts). In at least one embodiment, resource usage can be monitored, controlled, and reported providing transparency for both a provider and consumer of a utilized service.

In at least one embodiment, cloud computing may be associated with various services. In at least one embodiment, cloud Software as a Service (SaaS) may refer to as service in which a capability provided to a consumer is to use a provider's applications running on a cloud infrastructure. In at least one embodiment, applications are accessible from various client devices through a thin client interface such as a web browser (e.g., web-based email). In at least one embodiment, consumer does not manage or control underlying cloud infrastructure including network, servers, operating systems, storage, or even individual application capabilities, with a possible exception of limited user-specific application configuration settings.

In at least one embodiment, cloud Platform as a Service (PaaS) may refer to a service in which a capability provided to a consumer is to deploy onto cloud infrastructure consumer-created or acquired applications created using programming languages and tools supported by a provider. In at least one embodiment, consumer does not manage or control underlying cloud infrastructure including networks, servers, operating systems, or storage, but has control over deployed applications and possibly application hosting environment configurations.

In at least one embodiment, cloud Infrastructure as a Service (IaaS) may refer to a service in which a capability provided to a consumer is to provision processing, storage, networks, and other fundamental computing resources where a consumer is able to deploy and run arbitrary software, which can include operating systems and applications. In at least one embodiment, consumer does not manage or control underlying cloud infrastructure, but has control over operating systems, storage, deployed applications, and possibly limited control of select networking components (e.g., host firewalls).

In at least one embodiment, cloud computing may be deployed in various ways. In at least one embodiment, a private cloud may refer to a cloud infrastructure that is operated solely for an organization. In at least one embodiment, a private cloud may be managed by an organization or a third party and may exist on-premises or off-premises. In at least one embodiment, a community cloud may refer to a cloud infrastructure that is shared by several organizations and supports a specific community that has shared concerns (e.g., mission, security requirements, policy, and compliance considerations). In at least one embodiment, a community cloud may be managed by organizations or a third party and may exist on-premises or off-premises. In at least one embodiment, a public cloud may refer to a cloud infrastructure that is made available to a general public or a large industry group and is owned by an organization providing cloud services. In at least one embodiment, a hybrid cloud may refer to a cloud infrastructure is a composition of two or more clouds (private, community, or public) that remain unique entities, but are bound together by standardized or proprietary technology that enables data and application portability (e.g., cloud bursting for load-balancing between clouds). In at least one embodiment, a cloud computing environment is service oriented with a focus on statelessness, low coupling, modularity, and semantic interoperability.

Figure 15:
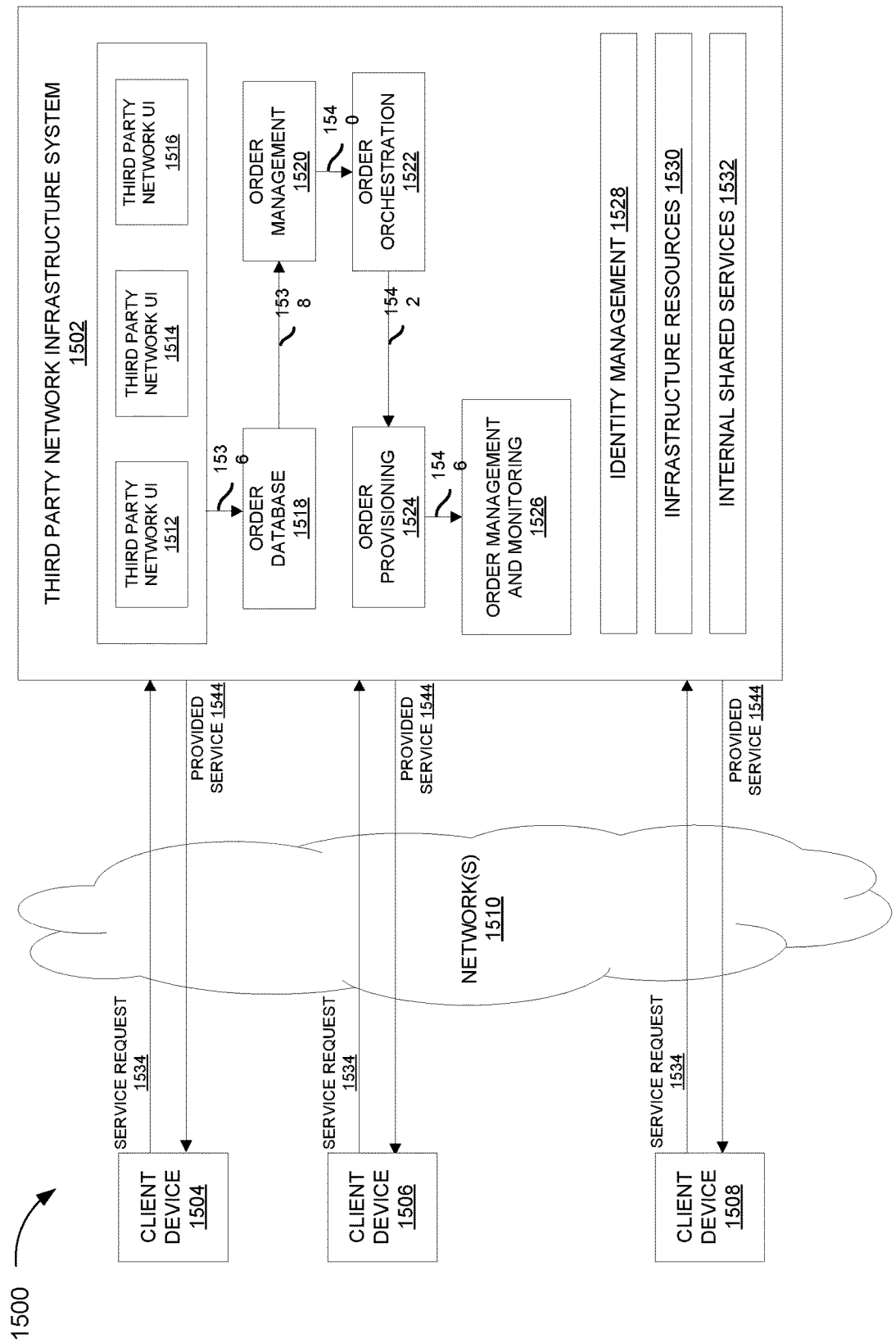
FIG. 15 illustrates one or more components of a system environment in which services may be offered as third party network services, in accordance with at least one embodiment.

FIG. 15 illustrates one or more components of a system environment 1500 in which services may be offered as third party network services, in accordance with at least one embodiment. In at least one embodiment, a third party network may be referred to as a cloud, cloud network, cloud computing network, and/or variations thereof. In at least one embodiment, system environment 1500 includes one or more client computing devices 1504, 1506, and 1508 that may be used by users to interact with a third party network infrastructure system 1502 that provides third party network services, which may be referred to as cloud computing services. In at least one embodiment, third party network infrastructure system 1502 may comprise one or more computers and/or servers.

It should be appreciated that third party network infrastructure system 1502 depicted in FIG. 15 may have other components than those depicted. Further, FIG. 15 depicts an embodiment of a third party network infrastructure system. In at least one embodiment, third party network infrastructure system 1502 may have more or fewer components than depicted in FIG. 15, may combine two or more components, or may have a different configuration or arrangement of components.

In at least one embodiment, client computing devices 1504, 1506, and 1508 may be configured to operate a client application such as a web browser, a proprietary client application, or some other application, which may be used by a user of a client computing device to interact with third party network infrastructure system 1502 to use services provided by third party network infrastructure system 1502. Although exemplary system environment 1500 is shown with three client computing devices, any number of client computing devices may be supported. In at least one embodiment, other devices such as devices with sensors, etc. may interact with third party network infrastructure system 1502. In at least one embodiment, network(s) 1510 may facilitate communications and exchange of data between client computing devices 1504, 1506, and 1508 and third party network infrastructure system 1502.

In at least one embodiment, services provided by third party network infrastructure system 1502 may include a host of services that are made available to users of a third party network infrastructure system on demand. In at least one embodiment, various services may also be offered including without limitation online data storage and backup solutions, Web-based e-mail services, hosted office suites and document collaboration services, database management and processing, managed technical support services, and/or variations thereof. In at least one embodiment, services provided by a third party network infrastructure system can dynamically scale to meet needs of its users.

In at least one embodiment, a specific instantiation of a service provided by third party network infrastructure system 1502 may be referred to as a "service instance." In at least one embodiment, in general, any service made available to a user via a communication network, such as the Internet, from a third party network service provider's system is referred to as a "third party network service." In at least one embodiment, in a public third party network environment, servers and systems that make up a third party network service provider's system are different from a customer's own on-premises servers and systems. In at least one embodiment, a third party network service provider's system may host an application, and a user may, via a communication network such as the Internet, on demand, order and use an application.

In at least one embodiment, a service in a computer network third party network infrastructure may include protected computer network access to storage, a hosted database, a hosted web server, a software application, or other service provided by a third party network vendor to a user. In at least one embodiment, a service can include password-protected access to remote storage on a third party network through the Internet. In at least one embodiment, a service can include a web service-based hosted relational database and a script-language middleware engine for private use by a networked developer. In at least one embodiment, a service can include access to an email software application hosted on a third party network vendor's web site.

In at least one embodiment, third party network infrastructure system 1502 may include a suite of applications, middleware, and database service offerings that are delivered to a customer in a self-service, subscription-based, elastically scalable, reliable, highly available, and secure manner. In at least one embodiment, third party network infrastructure system 1502 may also provide "big data" related computation and analysis services. In at least one embodiment, term "big data" is generally used to refer to extremely large data sets that can be stored and manipulated by analysts and researchers to visualize large amounts of data, detect trends, and/or otherwise interact with data. In at least one embodiment, big data and related applications can be hosted and/or manipulated by an infrastructure system on many levels and at different scales. In at least one embodiment, tens, hundreds, or thousands of processors linked in parallel can act upon such data in order to present it or simulate external forces on data or what it represents. In at least one embodiment, these data sets can involve structured data, such as that organized in a database or otherwise according to a structured model, and/or unstructured data (e.g., emails, images, data blobs (binary large objects), web pages, complex event processing). In at least one embodiment, by leveraging an ability of an embodiment to relatively quickly focus more (or fewer) computing resources upon an objective, a third party network infrastructure system may be better available to carry out tasks on large data sets based on demand from a business, government agency, research organization, private individual, group of like-minded individuals or organizations, or other entity.

In at least one embodiment, third party network infrastructure system 1502 may be adapted to automatically provision, manage and track a customer's subscription to services offered by third party network infrastructure system 1502. In at least one embodiment, third party network infrastructure system 1502 may provide third party network services via different deployment models. In at least one embodiment, services may be provided under a public third party network model in which third party network infrastructure system 1502 is owned by an organization selling third party network services and services are made available to a general public or different industry enterprises. In at least one embodiment, services may be provided under a private third party network model in which third party network infrastructure system 1502 is operated solely for a single organization and may provide services for one or more entities within an organization. In at least one embodiment, third party network services may also be provided under a community third party network model in which third party network infrastructure system 1502 and services provided by third party network infrastructure system 1502 are shared by several organizations in a related community. In at least one embodiment, third party network services may also be provided under a hybrid third party network model, which is a combination of two or more different models.

In at least one embodiment, services provided by third party network infrastructure system 1502 may include one or more services provided under Software as a Service (SaaS) category, Platform as a Service (PaaS) category, Infrastructure as a Service (IaaS) category, or other categories of services including hybrid services. In at least one embodiment, a customer, via a subscription order, may order one or more services provided by third party network infrastructure system 1502. In at least one embodiment, third party network infrastructure system 1502 then performs processing to provide services in a customer's subscription order.

In at least one embodiment, services provided by third party network infrastructure system 1502 may include, without limitation, application services, platform services and infrastructure services. In at least one embodiment, application services may be provided by a third party network infrastructure system via a SaaS platform. In at least one embodiment, SaaS platform may be configured to provide third party network services that fall under a SaaS category. In at least one embodiment, SaaS platform may provide capabilities to build and deliver a suite of on-demand applications on an integrated development and deployment platform. In at least one embodiment, SaaS platform may manage and control underlying software and infrastructure for providing SaaS services. In at least one embodiment, by utilizing services provided by a SaaS platform, customers can utilize applications executing on a third party network infrastructure system. In at least one embodiment, customers can acquire an application services without a need for customers to purchase separate licenses and support. In at least one embodiment, various different SaaS services may be provided. In at least one embodiment, examples include, without limitation, services that provide solutions for sales performance management, enterprise integration, and business flexibility for large organizations.

In at least one embodiment, platform services may be provided by third party network infrastructure system 1502 via a PaaS platform. In at least one embodiment, PaaS platform may be configured to provide third party network services that fall under a PaaS category. In at least one embodiment, examples of platform services may include without limitation services that enable organizations to consolidate existing applications on a shared, common architecture, as well as an ability to build new applications that leverage shared services provided by a platform. In at least one embodiment, PaaS platform may manage and control underlying software and infrastructure for providing PaaS services. In at least one embodiment, customers can acquire PaaS services provided by third party network infrastructure system 1502 without a need for customers to purchase separate licenses and support.

In at least one embodiment, by utilizing services provided by a PaaS platform, customers can employ programming languages and tools supported by a third party network infrastructure system and also control deployed services. In at least one embodiment, platform services provided by a third party network infrastructure system may include database third party network services, middleware third party network services and third party network services. In at least one embodiment, database third party network services may support shared service deployment models that enable organizations to pool database resources and offer customers a Database as a Service in a form of a database third party network. In at least one embodiment, middleware third party network services may provide a platform for customers to develop and deploy various business applications, and third party network services may provide a platform for customers to deploy applications, in a third party network infrastructure system.

In at least one embodiment, various different infrastructure services may be provided by an IaaS platform in a third party network infrastructure system. In at least one embodiment, infrastructure services facilitate management and control of underlying computing resources, such as storage, networks, and other fundamental computing resources for customers utilizing services provided by a SaaS platform and a PaaS platform.

In at least one embodiment, third party network infrastructure system 1502 may also include infrastructure resources 1530 for providing resources used to provide various services to customers of a third party network infrastructure system. In at least one embodiment, infrastructure resources 1530 may include pre-integrated and optimized combinations of hardware, such as servers, storage, and networking resources to execute services provided by a Paas platform and a Saas platform, and other resources.

In at least one embodiment, resources in third party network infrastructure system 1502 may be shared by multiple users and dynamically re-allocated per demand. In at least one embodiment, resources may be allocated to users in different time zones. In at least one embodiment, third party network infrastructure system 1502 may enable a first set of users in a first time zone to utilize resources of a third party network infrastructure system for a specified number of hours and then enable a re-allocation of same resources to another set of users located in a different time zone, thereby maximizing utilization of resources.

In at least one embodiment, a number of internal shared services 1532 may be provided that are shared by different components or modules of third party network infrastructure system 1502 to enable provision of services by third party network infrastructure system 1502. In at least one embodiment, these internal shared services may include, without limitation, a security and identity service, an integration service, an enterprise repository service, an enterprise manager service, a virus scanning and white list service, a high availability, backup and recovery service, service for enabling third party network support, an email service, a notification service, a file transfer service, and/or variations thereof.

In at least one embodiment, third party network infrastructure system 1502 may provide comprehensive management of third party network services (e.g., SaaS, PaaS, and IaaS services) in a third party network infrastructure system. In at least one embodiment, third party network management functionality may include capabilities for provisioning, managing and tracking a customer's subscription received by third party network infrastructure system 1502, and/or variations thereof.

In at least one embodiment, as depicted in FIG. 15, third party network management functionality may be provided by one or more modules, such as an order management module 1520, an order orchestration module 1522, an order provisioning module 1524, an order management and monitoring module 1526, and an identity management module 1528. In at least one embodiment, these modules may include or be provided using one or more computers and/or servers, which may be general purpose computers, specialized server computers, server farms, server clusters, or any other appropriate arrangement and/or combination.

In at least one embodiment, at step 1534, a customer using a client device, such as client computing devices 1504, 1506 or 1508, may interact with third party network infrastructure system 1502 by requesting one or more services provided by third party network infrastructure system 1502 and placing an order for a subscription for one or more services offered by third party network infrastructure system 1502. In at least one embodiment, a customer may access a third party network User Interface (UI) such as third party network UI 1512, third party network UI 1514 and/or third party network UI 1516 and place a subscription order via these UIs.

In at least one embodiment, order information received by third party network infrastructure system 1502 in response to a customer placing an order may include information identifying a customer and one or more services offered by a third party network infrastructure system 1502 that a customer intends to subscribe to.

In at least one embodiment, at step 1536, an order information received from a customer may be stored in an order database 1518. In at least one embodiment, if this is a new order, a new record may be created for an order. In at least one embodiment, order database 1518 can be one of several databases operated by third party network infrastructure system 1518 and operated in conjunction with other system elements.

In at least one embodiment, at step 1538, an order information may be forwarded to an order management module 1520 that may be configured to perform billing and accounting functions related to an order, such as verifying an order, and upon verification, booking an order.

In at least one embodiment, at step 1540, information regarding an order may be communicated to an order orchestration module 1522 that is configured to orchestrate provisioning of services and resources for an order placed by a customer. In at least one embodiment, order orchestration module 1522 may use services of order provisioning module 1524 for provisioning. In at least one embodiment, order orchestration module 1522 enables management of business processes associated with each order and applies business logic to determine whether an order should proceed to provisioning.

In at least one embodiment, at step 1542, upon receiving an order for a new subscription, order orchestration module 1522 sends a request to order provisioning module 1524 to allocate resources and configure resources needed to fulfill a subscription order. In at least one embodiment, order provisioning module 1524 enables an allocation of resources for services ordered by a customer. In at least one embodiment, order provisioning module 1524 provides a level of abstraction between third party network services provided by third party network infrastructure system 1500 and a physical implementation layer that is used to provision resources for providing requested services. In at least one embodiment, this enables order orchestration module 1522 to be isolated from implementation details, such as whether or not services and resources are actually provisioned in real-time or pre-provisioned and only allocated/assigned upon request.

In at least one embodiment, at step 1544, once services and resources are provisioned, a notification may be sent to subscribing customers indicating that a requested service is now ready for use. In at least one embodiment, information (e.g., a link) may be sent to a customer that enables a customer to start using requested services.

In at least one embodiment, at step 1546, a customer's subscription order may be managed and tracked by an order management and monitoring module 1526. In at least one embodiment, order management and monitoring module 1526 may be configured to collect usage statistics regarding a customer use of subscribed services. In at least one embodiment, statistics may be collected for an amount of storage used, an amount data transferred, a number of users, and an amount of system up time and system down time, and/or variations thereof.

In at least one embodiment, third party network infrastructure system 1500 may include an identity management module 1528 that is configured to provide identity services, such as access management and authorization services in third party network infrastructure system 1500. In at least one embodiment, identity management module 1528 may control information about customers who wish to utilize services provided by third party network infrastructure system 1502. In at least one embodiment, such information can include information that authenticates identities of such customers and information that describes which actions those customers are authorized to perform relative to various system resources (e.g., files, directories, applications, communication ports, memory segments, etc.). In at least one embodiment, identity management module 1528 may also include management of descriptive information about each customer and about how and by whom that descriptive information can be accessed and modified.

Figure 16:
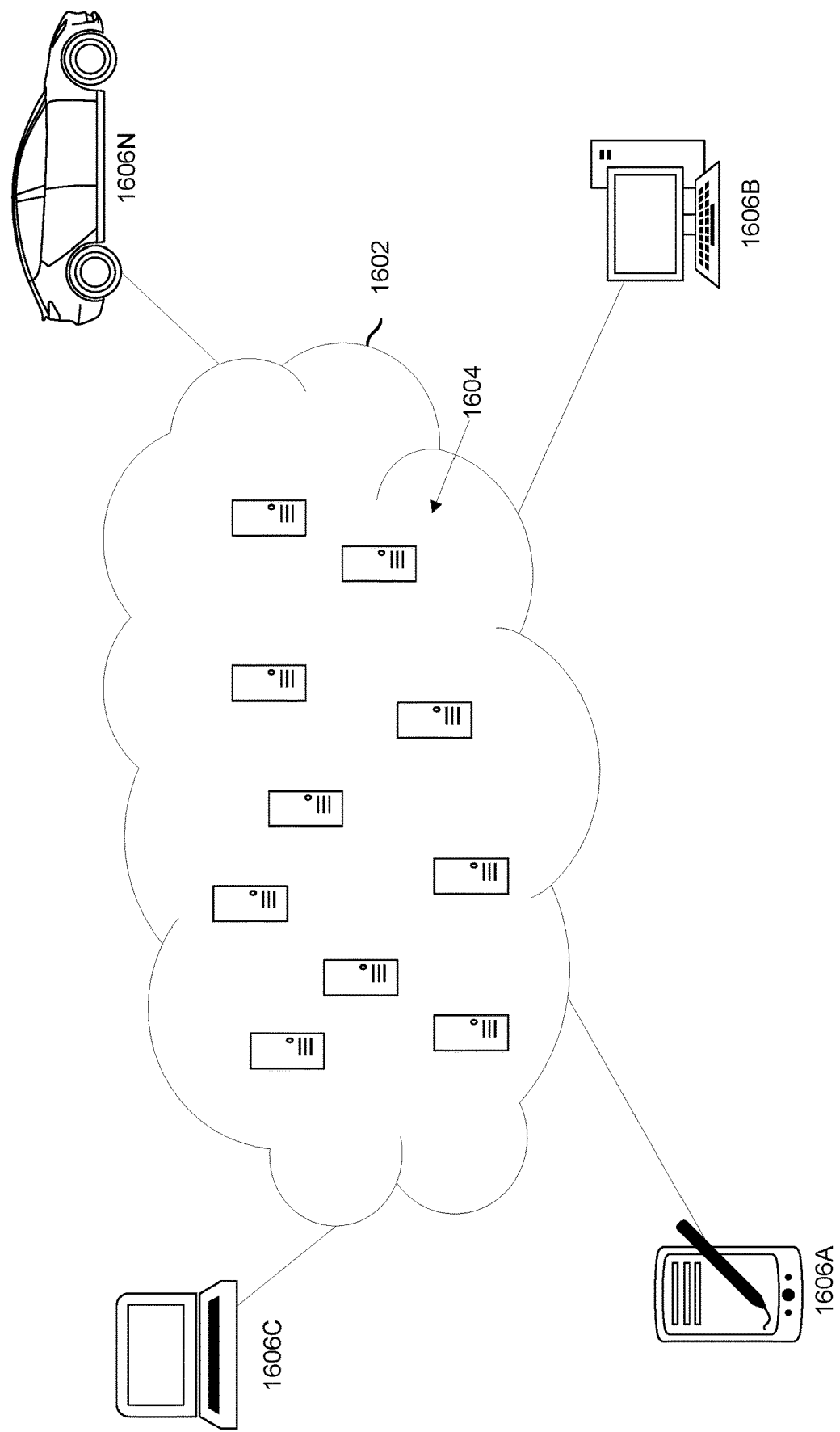
FIG. 16 illustrates a cloud computing environment, in accordance with at least one embodiment.

FIG. 16 illustrates a cloud computing environment 1602, in accordance with at least one embodiment. In at least one embodiment, cloud computing environment 1602 comprises one or more computer system/servers 1604 with which computing devices such as, personal digital assistant (PDA) or cellular telephone 1606A, desktop computer 1606B, laptop computer 1606C, and/or automobile computer system 1606N communicate. In at least one embodiment, this allows for infrastructure, platforms and/or software to be offered as services from cloud computing environment 1602, so as to not require each client to separately maintain such resources. It is understood that types of computing devices 1606A-N shown in FIG. 16 are intended to be illustrative only and that cloud computing environment 1602 can communicate with any type of computerized device over any type of network and/or network/addressable connection (e.g., using a web browser).

In at least one embodiment, a computer system/server 1604, which can be denoted as a cloud computing node, is operational with numerous other general purpose or special purpose computing system environments or configurations. In at least one embodiment, examples of computing systems, environments, and/or configurations that may be suitable for use with computer system/server 1604 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and/or variations thereof.

In at least one embodiment, computer system/server 1604 may be described in a general context of computer system-executable instructions, such as program modules, being executed by a computer system. In at least one embodiment, program modules include routines, programs, objects, components, logic, data structures, and so on, that perform particular tasks or implement particular abstract data types. In at least one embodiment, exemplary computer system/server 1604 may be practiced in distributed loud computing environments where tasks are performed by remote processing devices that are linked through a communications network. In at least one embodiment, in a distributed cloud computing environment, program modules may be located in both local and remote computer system storage media including memory storage devices.

Figure 17:
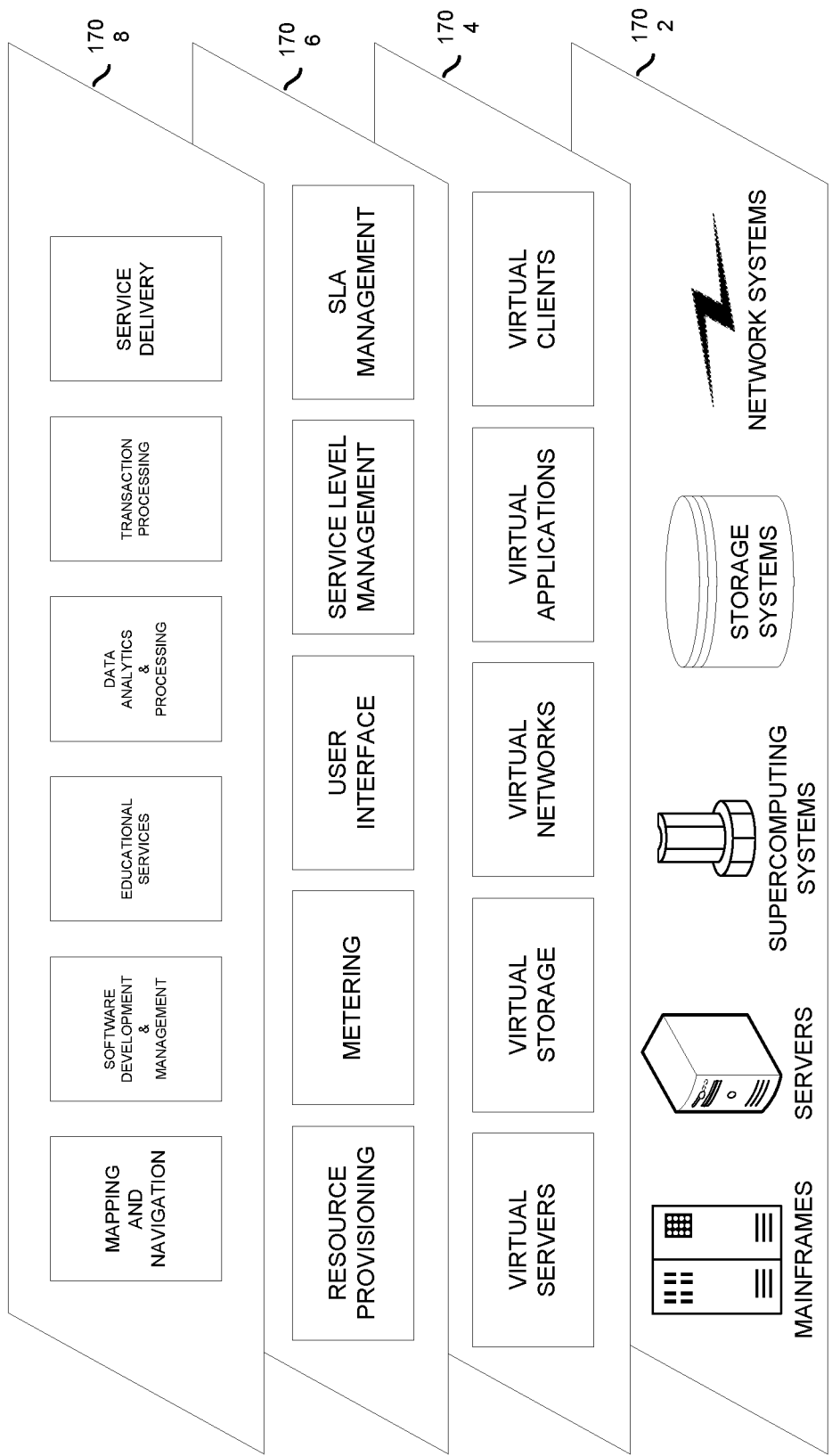
FIG. 17 illustrates a set of functional abstraction layers provided by a cloud computing environment, in accordance with at least one embodiment.

FIG. 17 illustrates a set of functional abstraction layers provided by cloud computing environment 1602 (FIG. 16), in accordance with at least one embodiment. It should be understood in advance that components, layers, and functions shown in FIG. 17 are intended to be illustrative only, and components, layers, and functions may vary.

In at least one embodiment, hardware and software layer 1702 includes hardware and software components. In at least one embodiment, examples of hardware components include mainframes, various RISC (Reduced Instruction Set Computer) architecture based servers, various computing systems, supercomputing systems, storage devices, networks, networking components, and/or variations thereof. In at least one embodiment, examples of software components include network application server software, various application server software, various database software, and/or variations thereof.

In at least one embodiment, virtualization layer 1704 provides an abstraction layer from which following exemplary virtual entities may be provided: virtual servers, virtual storage, virtual networks, including virtual private networks, virtual applications, virtual clients, and/or variations thereof.

In at least one embodiment, management layer 1706 provides various functions. In at least one embodiment, resource provisioning provides dynamic procurement of computing resources and other resources that are utilized to perform tasks within a cloud computing environment. In at least one embodiment, metering provides usage tracking as resources are utilized within a cloud computing environment, and billing or invoicing for consumption of these resources. In at least one embodiment, resources may comprise application software licenses. In at least one embodiment, security provides identity verification for users and tasks, as well as protection for data and other resources. In at least one embodiment, user interface provides access to a cloud computing environment for both users and system administrators. In at least one embodiment, service level management provides cloud computing resource allocation and management such that required service levels are met. In at least one embodiment, Service Level Agreement (SLA) management provides pre-arrangement for, and procurement of, cloud computing resources for which a future requirement is anticipated in accordance with an SLA.

In at least one embodiment, workloads layer 1708 provides functionality for which a cloud computing environment is utilized. In at least one embodiment, examples of workloads and functions which may be provided from this layer include: mapping and navigation, software development and management, educational services, data analytics and processing, transaction processing, and service delivery.

Supercomputing

The following figures set forth, without limitation, exemplary supercomputer-based systems that can be used to implement at least one embodiment.

In at least one embodiment, a supercomputer may refer to a hardware system exhibiting substantial parallelism and comprising at least one chip, where chips in a system are interconnected by a network and are placed in hierarchically organized enclosures. In at least one embodiment, a large hardware system filling a machine room, with several racks, each containing several boards/rack modules, each containing several chips, all interconnected by a scalable network, is one particular example of a supercomputer. In at least one embodiment, a single rack of such a large hardware system is another example of a supercomputer. In at least one embodiment, a single chip exhibiting substantial parallelism and containing several hardware components can equally be considered to be a supercomputer, since as feature sizes may decrease, an amount of hardware that can be incorporated in a single chip may also increase.

Figure 18:
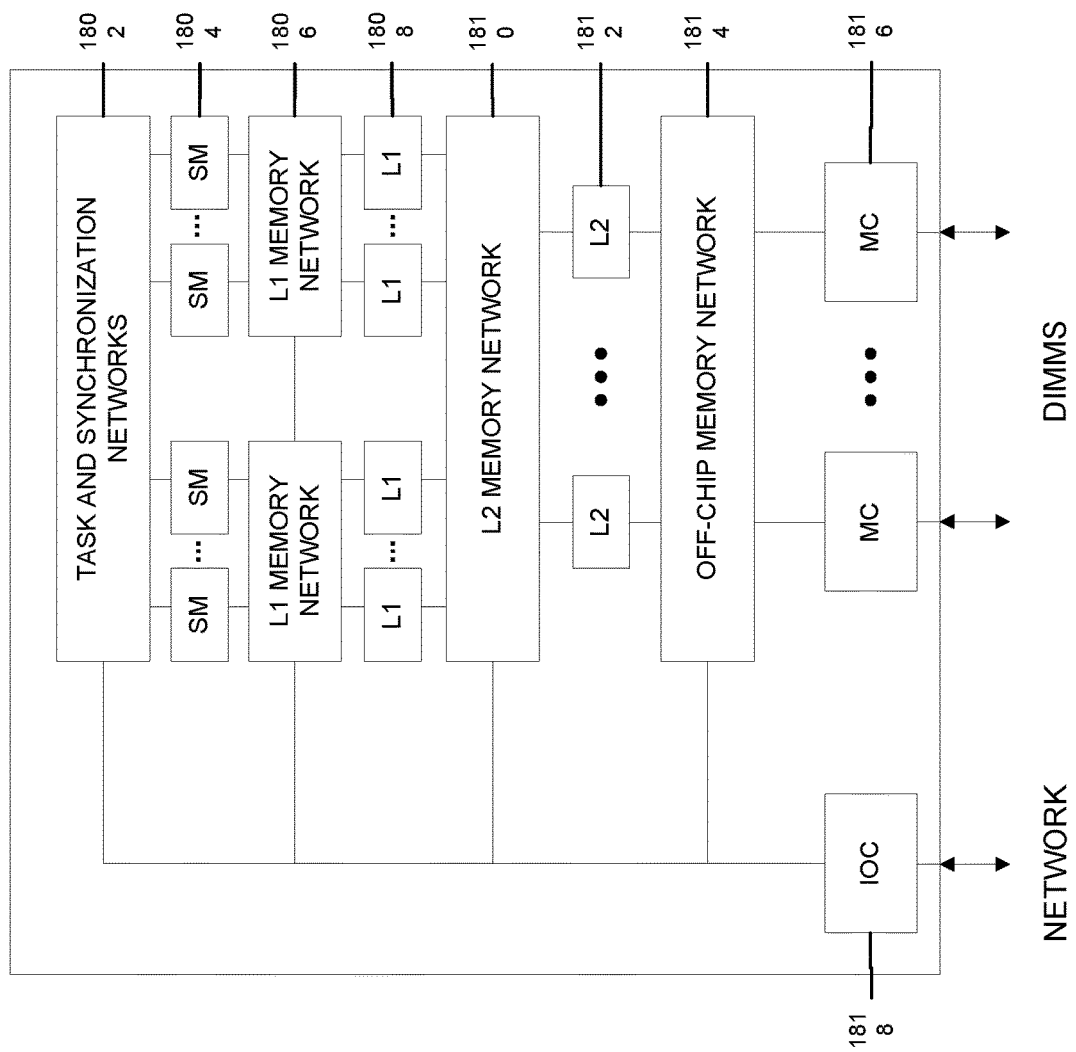
FIG. 18 illustrates a supercomputer at a chip level, in accordance with at least one embodiment.

FIG. 18 illustrates a supercomputer at a chip level, in accordance with at least one embodiment. In at least one embodiment, inside an FPGA or ASIC chip, main computation is performed within finite state machines (1804) called thread units. In at least one embodiment, task and synchronization networks (1802) connect finite state machines and are used to dispatch threads and execute operations in correct order. In at least one embodiment, a multi-level partitioned on-chip cache hierarchy (1808, 1812) is accessed using memory networks (1806, 1810). In at least one embodiment, off-chip memory is accessed using memory controllers (1816) and an off-chip memory network (1814). In at least one embodiment, I/O controller (1818) is used for cross-chip communication when a design does not fit in a single logic chip.

Figure 19:
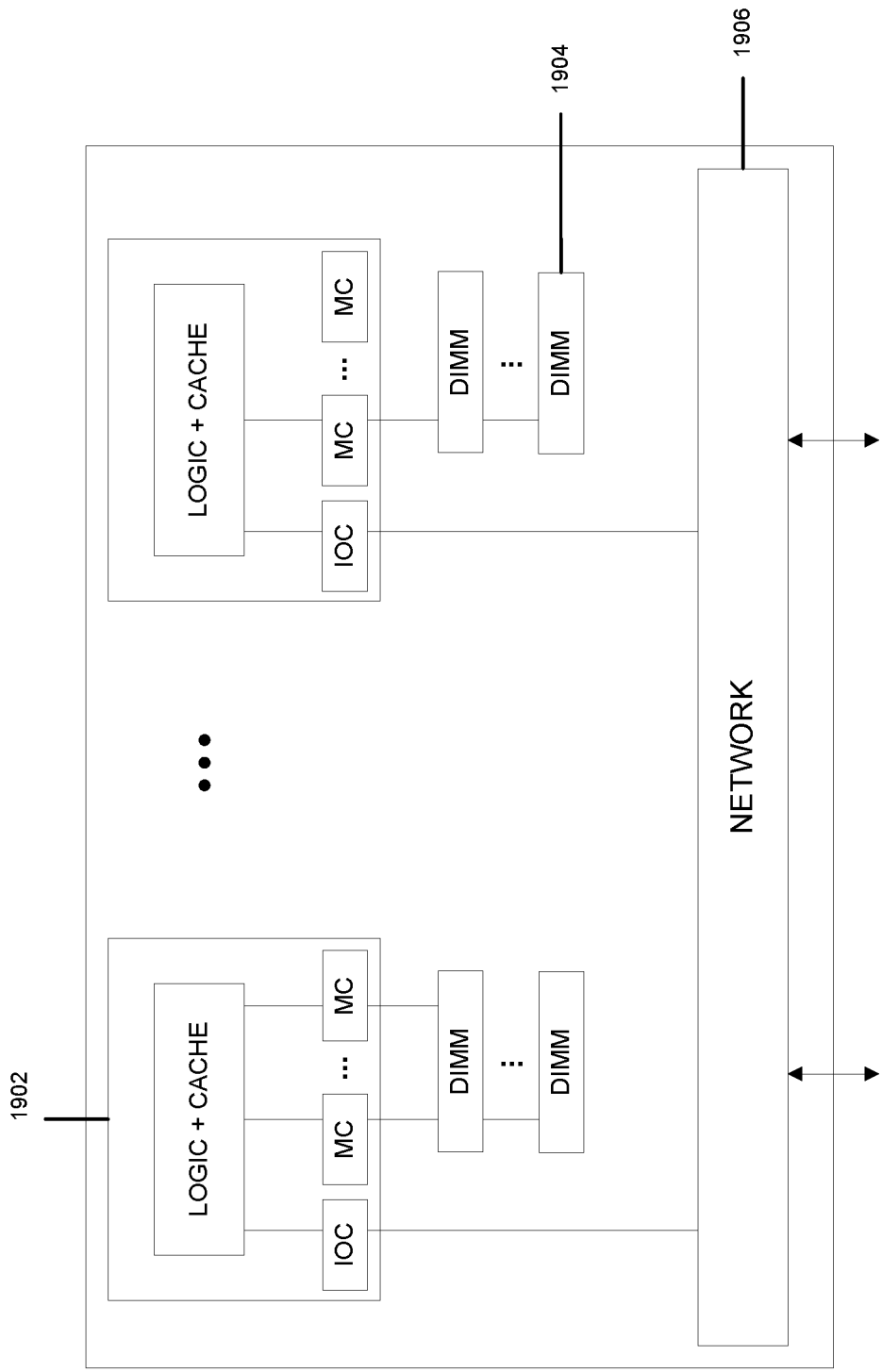
FIG. 19 illustrates a supercomputer at a rack module level, in accordance with at least one embodiment.

FIG. 19 illustrates a supercomputer at a rock module level, in accordance with at least one embodiment. In at least one embodiment, within a rack module, there are multiple FPGA or ASIC chips (1902) that are connected to one or more DRAM units (1904) which constitute main accelerator memory. In at least one embodiment, each FPGA/ASIC chip is connected to its neighbor FPGA/ASIC chip using wide busses on a board, with differential high speed signaling (1906). In at least one embodiment, each FPGA/ASIC chip is also connected to at least one high-speed serial communication cable.

Figure 20:
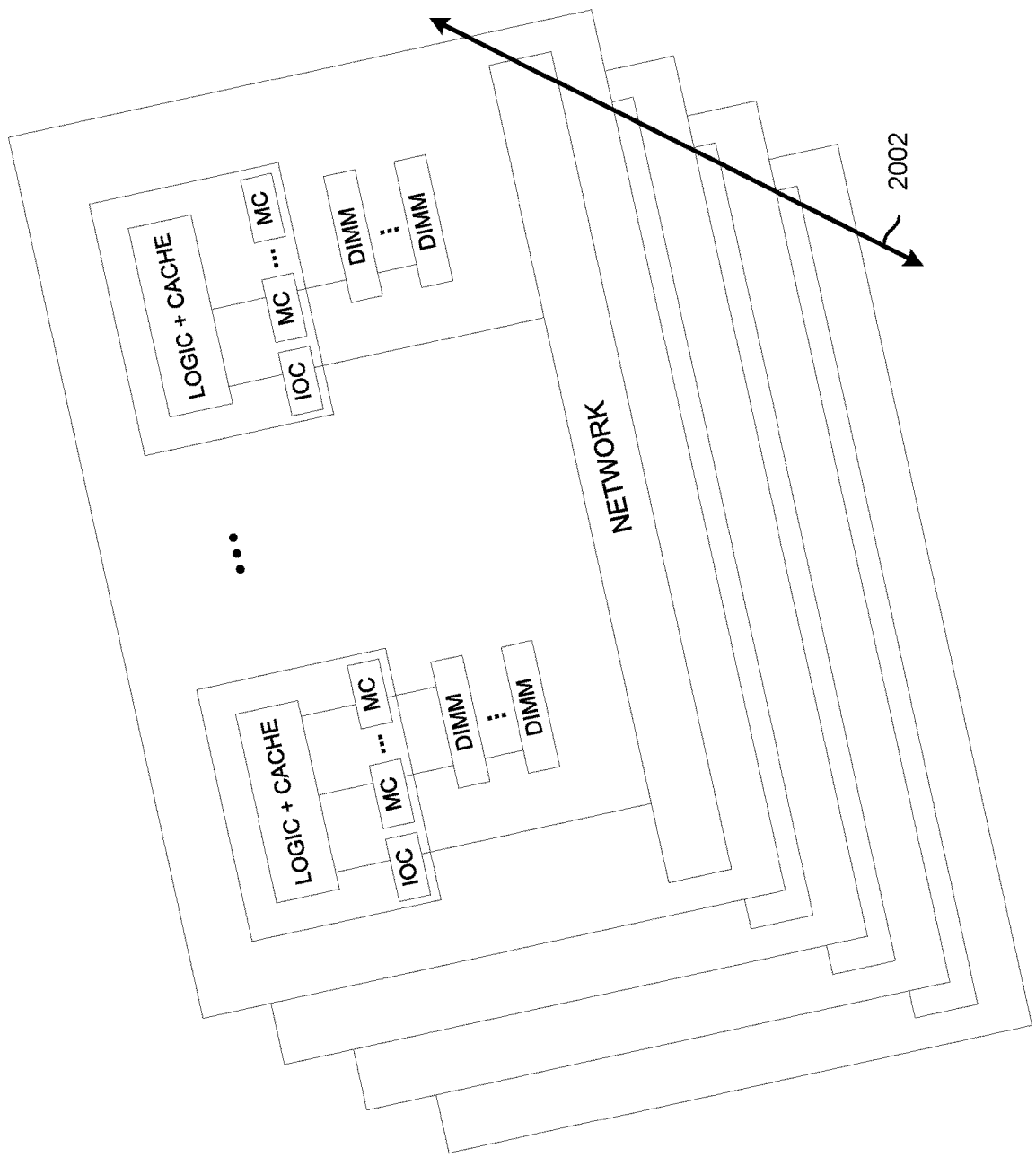
FIG. 20 illustrates a supercomputer at a rack level, in accordance with at least one embodiment.
Figure 21:
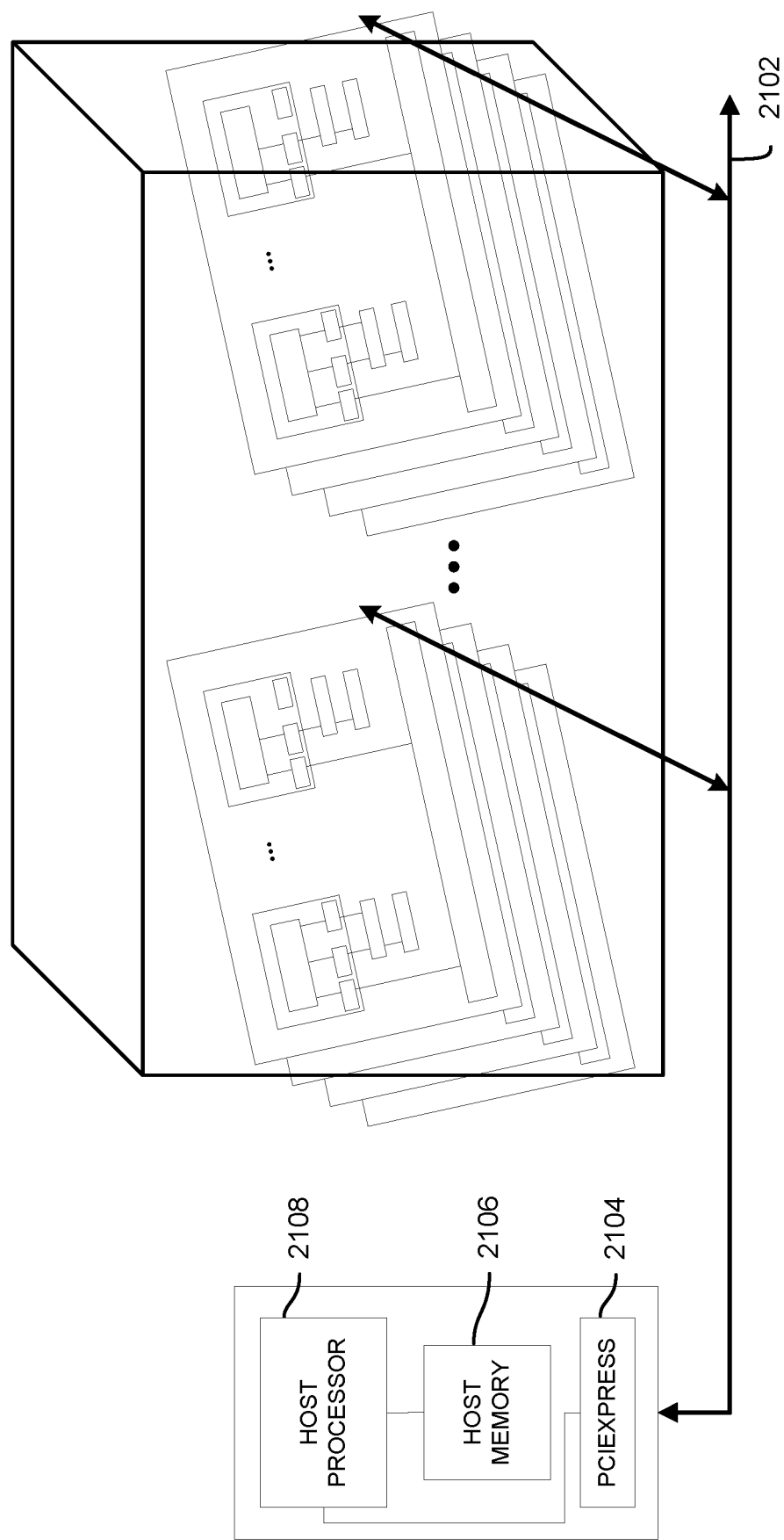
FIG. 21 illustrates a supercomputer at a whole system level, in accordance with at least one embodiment.

FIG. 20 illustrates a supercomputer at a rack level, in accordance with at least one embodiment. FIG. 21 illustrates a supercomputer at a whole system level, in accordance with at least one embodiment. In at least one embodiment, referring to FIG. 20 and FIG. 21, between rack modules in a rack and across racks throughout an entire system, high-speed serial optical or copper cables (2002, 2102) are used to realize a scalable, possibly incomplete hypercube network. In at least one embodiment, one of FPGA/ASIC chips of an accelerator is connected to a host system through a PCI-Express connection (2104). In at least one embodiment, host system comprises a host microprocessor (2108) that a software part of an application runs on and a memory consisting of one or more host memory DRAM units (2106) that is kept coherent with memory on an accelerator. In at least one embodiment, host system can be a separate module on one of racks, or can be integrated with one of a supercomputer's modules. In at least one embodiment, cube-connected cycles topology provide communication links to create a hypercube network for a large supercomputer. In at least one embodiment, a small group of FPGA/ASIC chips on a rack module can act as a single hypercube node, such that a total number of external links of each group is increased, compared to a single chip. In at least one embodiment, a group contains chips A, B, C and D on a rack module with internal wide differential busses connecting A, B, C and D in a torus organization. In at least one embodiment, there are 12 serial communication cables connecting a rack module to an outside world. In at least one embodiment, chip A on a rack module connects to serial communication cables 0, 1, 2. In at least one embodiment, chip B connects to cables 3, 4, 5. In at least one embodiment, chip C connects to 6, 7, 8. In at least one embodiment, chip D connects to 9, 10, 11. In at least one embodiment, an entire group {A, B, C, D} constituting a rack module can form a hypercube node within a supercomputer system, with up to 2¹²=4096 rack modules (16384 FPGA/ASIC chips). In at least one embodiment, for chip A to send a message out on link 4 of group {A, B, C, D}, a message has to be routed first to chip B with an on-board differential wide bus connection. In at least one embodiment, a message arriving into a group {A, B, C, D} on link 4 (i.e., arriving at B) destined to chip A, also has to be routed first to a correct destination chip (A) internally within a group {A, B, C, D}. In at least one embodiment, parallel supercomputer systems of other sizes may also be implemented.

Artificial Intelligence

The following figures set forth, without limitation, exemplary artificial intelligence-based systems that can be used to implement at least one embodiment.

Figure 22A:
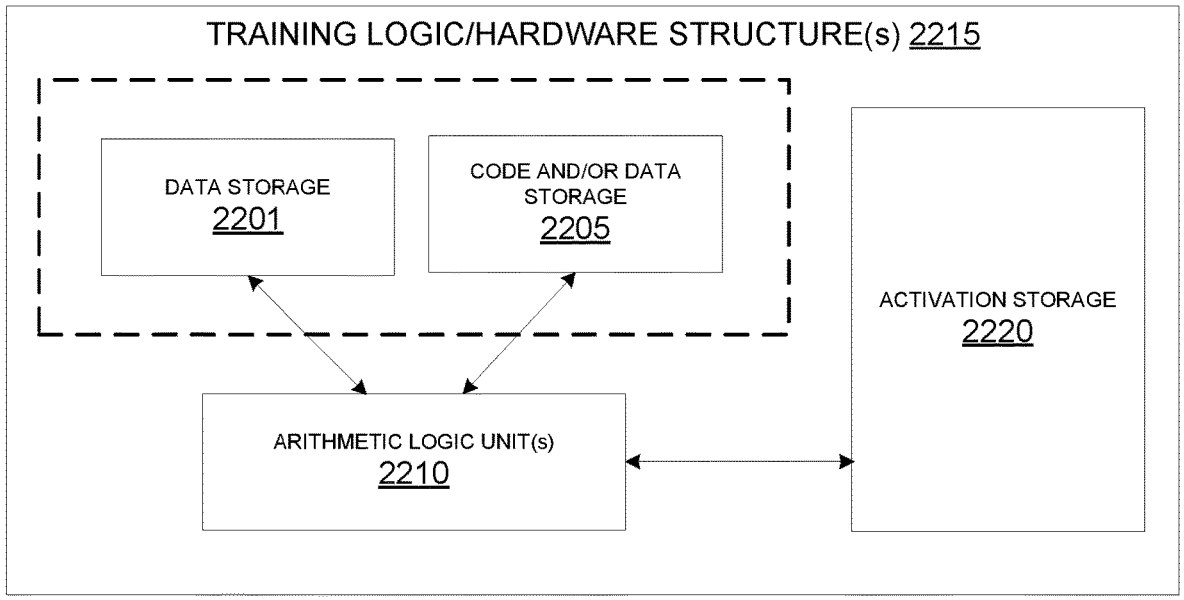
FIG. 22A illustrates inference and/or training logic, in accordance with at least one embodiment.

FIG. 22A illustrates inference and/or training logic 2215 used to perform inferencing and/or training operations associated with one or more embodiments. Details regarding inference and/or training logic 2215 are provided below in conjunction with FIGS. 22A and/or 22B.

In at least one embodiment, inference and/or training logic 2215 may include, without limitation, code and/or data storage 2201 to store forward and/or output weight and/or input/output data, and/or other parameters to configure neurons or layers of a neural network trained and/or used for inferencing in aspects of one or more embodiments. In at least one embodiment, training logic 2215 may include, or be coupled to code and/or data storage 2201 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which such code corresponds. In at least one embodiment code and/or data storage 2201 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 2201 may be included with other on-chip or off-chip data storage, including a processor's L1, L2, or L3 cache or system memory.

In at least one embodiment, any portion of code and/or data storage 2201 may be internal or external to one or more processors or other hardware logic devices or circuits. In at least one embodiment, code and/or code and/or data storage 2201 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 2201 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2215 may include, without limitation, a code and/or data storage 2205 to store backward and/or output weight and/or input/output data corresponding to neurons or layers of a neural network trained and/or used for inferencing in aspects of one or more embodiments. In at least one embodiment, code and/or data storage 2205 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 2215 may include, or be coupled to code and/or data storage 2205 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes loading of weight or other parameter information into processor ALUs based on an architecture of a neural network to which such code corresponds. In at least one embodiment, any portion of code and/or data storage 2205 may be included with other on-chip or off-chip data storage, including a processor's L1, L2, or L3 cache or system memory. In at least one embodiment, any portion of code and/or data storage 2205 may be internal or external to one or more processors or other hardware logic devices or circuits. In at least one embodiment, code and/or data storage 2205 may be cache memory, DRAM, SRAM, non-volatile memory (e.g., flash memory), or other storage. In at least one embodiment, a choice of whether code and/or data storage 2205 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 2201 and code and/or data storage 2205 may be separate storage structures. In at least one embodiment, code and/or data storage 2201 and code and/or data storage 2205 may be a combined storage structure. In at least one embodiment, code and/or data storage 2201 and code and/or data storage 2205 may be partially combined and partially separate. In at least one embodiment, any portion of code and/or data storage 2201 and code and/or data storage 2205 may be included with other on-chip or off-chip data storage, including a processor's L1, L2, or L3 cache or system memory.

In at least one embodiment, inference and/or training logic 2215 may include, without limitation, one or more arithmetic logic unit(s) ("ALU(s)") 2210, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 2220 that are functions of input/output and/or weight parameter data stored in code and/or data storage 2201 and/or code and/or data storage 2205. In at least one embodiment, activations stored in activation storage 2220 are generated according to linear algebraic and or matrix-based mathematics performed by ALU(s) 2210 in response to performing instructions or other code, wherein weight values stored in code and/or data storage 2205 and/or data storage 2201 are used as operands along with other values, such as bias values, gradient information, momentum values, or other parameters or hyperparameters, any or all of which may be stored in code and/or data storage 2205 or code and/or data storage 2201 or another storage on or off-chip.

In at least one embodiment, ALU(s) 2210 are included within one or more processors or other hardware logic devices or circuits, whereas in another embodiment, ALU(s) 2210 may be external to a processor or other hardware logic device or circuit that uses them (e.g., a co-processor). In at least one embodiment, ALUs 2210 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 2201, code and/or data storage 2205, and activation storage 2220 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 2220 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 2220 may be cache memory, DRAM, SRAM, non-volatile memory (e.g., flash memory), or other storage. In at least one embodiment, activation storage 2220 may be completely or partially within or external to one or more processors or other logical circuits. In at least one embodiment, a choice of whether activation storage 2220 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2215 illustrated in FIG. 22A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 2215 illustrated in FIG. 22A may be used in conjunction with central processing unit ("CPU") hardware, graphics processing unit ("GPU") hardware or other hardware, such as field programmable gate arrays ("FPGAs").

Figure 22B:
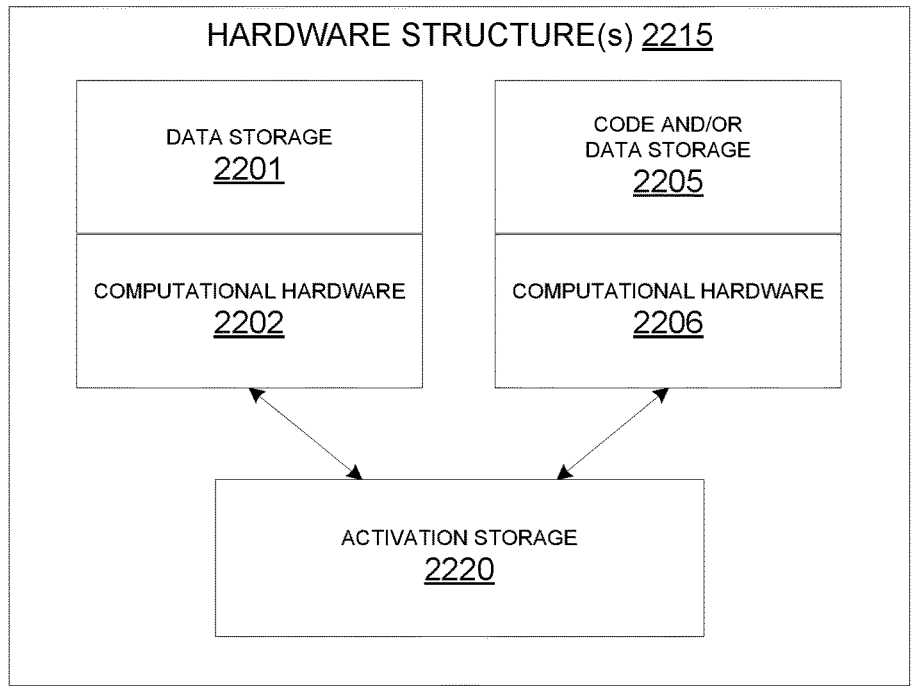
FIG. 22B illustrates inference and/or training logic, in accordance with at least one embodiment.

FIG. 22B illustrates inference and/or training logic 2215, according to at least one embodiment. In at least one embodiment, inference and/or training logic 2215 may include, without limitation, hardware logic in which computational resources are dedicated or otherwise exclusively used in conjunction with weight values or other information corresponding to one or more layers of neurons within a neural network. In at least one embodiment, inference and/or training logic 2215 illustrated in FIG. 22B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 2215 illustrated in FIG. 22B may be used in conjunction with central processing unit (CPU) hardware, graphics processing unit (GPU) hardware or other hardware, such as field programmable gate arrays (FPGAs). In at least one embodiment, inference and/or training logic 2215 includes, without limitation, code and/or data storage 2201 and code and/or data storage 2205, which may be used to store code (e.g., graph code), weight values and/or other information, including bias values, gradient information, momentum values, and/or other parameter or hyperparameter information. In at least one embodiment illustrated in FIG. 22B, each of code and/or data storage 2201 and code and/or data storage 2205 is associated with a dedicated computational resource, such as computational hardware 2202 and computational hardware 2206, respectively. In at least one embodiment, each of computational hardware 2202 and computational hardware 2206 comprises one or more ALUs that perform mathematical functions, such as linear algebraic functions, only on information stored in code and/or data storage 2201 and code and/or data storage 2205, respectively, result of which is stored in activation storage 2220.

In at least one embodiment, each of code and/or data storage 2201 and 2205 and corresponding computational hardware 2202 and 2206, respectively, correspond to different layers of a neural network, such that resulting activation from one storage/computational pair 2201/2202 of code and/or data storage 2201 and computational hardware 2202 is provided as an input to a next storage/computational pair 2205/2206 of code and/or data storage 2205 and computational hardware 2206, in order to mirror a conceptual organization of a neural network. In at least one embodiment, each of storage/computational pairs 2201/2202 and 2205/2206 may correspond to more than one neural network layer. In at least one embodiment, additional storage/computation pairs (not shown) subsequent to or in parallel with storage/computation pairs 2201/2202 and 2205/2206 may be included in inference and/or training logic 2215.

Figure 23:
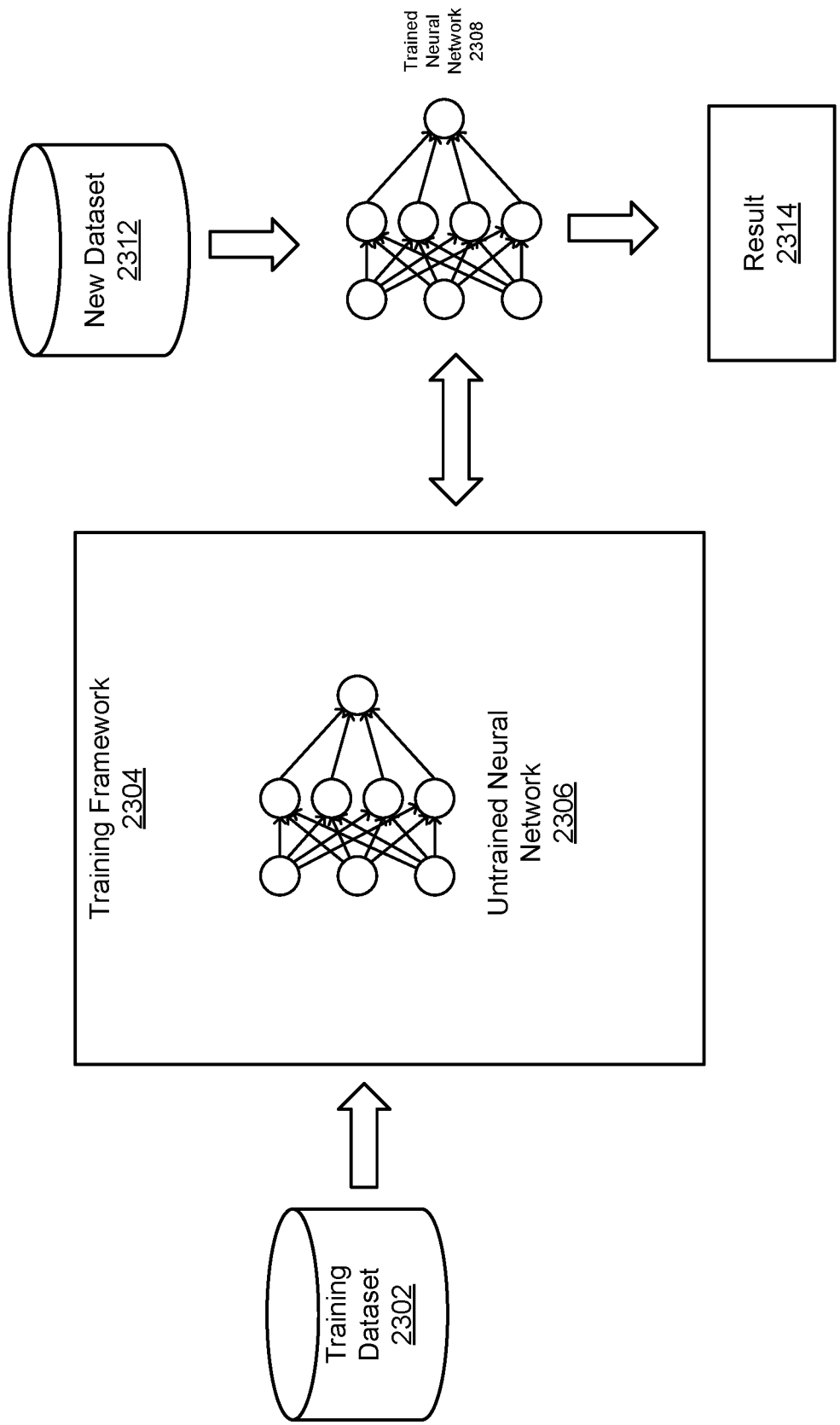
FIG. 23 illustrates training and deployment of a neural network, in accordance with at least one embodiment.

FIG. 23 illustrates training and deployment of a deep neural network, according to at least one embodiment. In at least one embodiment, untrained neural network 2306 is trained using a training dataset 2302. In at least one embodiment, training framework 2304 is a PyTorch framework, whereas in other embodiments, training framework 2304 is a TensorFlow, Boost, Caffe, Microsoft Cognitive Toolkit/CNTK, MXNet, Chainer, Keras, Deeplearning4j, or other training framework. In at least one embodiment, training framework 2304 trains an untrained neural network 2306 and enables it to be trained using processing resources described herein to generate a trained neural network 2308. In at least one embodiment, weights may be chosen randomly or by pre-training using a deep belief network. In at least one embodiment, training may be performed in either a supervised, partially supervised, or unsupervised manner.

In at least one embodiment, untrained neural network 2306 is trained using supervised learning, wherein training dataset 2302 includes an input paired with a desired output for an input, or where training dataset 2302 includes input having a known output and an output of neural network 2306 is manually graded. In at least one embodiment, untrained neural network 2306 is trained in a supervised manner and processes inputs from training dataset 2302 and compares resulting outputs against a set of expected or desired outputs. In at least one embodiment, errors are then propagated back through untrained neural network 2306. In at least one embodiment, training framework 2304 adjusts weights that control untrained neural network 2306. In at least one embodiment, training framework 2304 includes tools to monitor how well untrained neural network 2306 is converging towards a model, such as trained neural network 2308, suitable to generating correct answers, such as in result 2314, based on input data such as a new dataset 2312. In at least one embodiment, training framework 2304 trains untrained neural network 2306 repeatedly while adjust weights to refine an output of untrained neural network 2306 using a loss function and adjustment algorithm, such as stochastic gradient descent. In at least one embodiment, training framework 2304 trains untrained neural network 2306 until untrained neural network 2306 achieves a desired accuracy. In at least one embodiment, trained neural network 2308 can then be deployed to implement any number of machine learning operations.

In at least one embodiment, untrained neural network 2306 is trained using unsupervised learning, wherein untrained neural network 2306 attempts to train itself using unlabeled data. In at least one embodiment, unsupervised learning training dataset 2302 will include input data without any associated output data or "ground truth" data. In at least one embodiment, untrained neural network 2306 can learn groupings within training dataset 2302 and can determine how individual inputs are related to untrained dataset 2302. In at least one embodiment, unsupervised training can be used to generate a self-organizing map in trained neural network 2308 capable of performing operations useful in reducing dimensionality of new dataset 2312. In at least one embodiment, unsupervised training can also be used to perform anomaly detection, which allows identification of data points in new dataset 2312 that deviate from normal patterns of new dataset 2312.

In at least one embodiment, semi-supervised learning may be used, which is a technique in which in training dataset 2302 includes a mix of labeled and unlabeled data. In at least one embodiment, training framework 2304 may be used to perform incremental learning, such as through transferred learning techniques. In at least one embodiment, incremental learning enables trained neural network 2308 to adapt to new dataset 2312 without forgetting knowledge instilled within trained neural network 2308 during initial training.

5G Networks

The following figures set forth, without limitation, exemplary 5G network-based systems that can be used to implement at least one embodiment.

Figure 24:
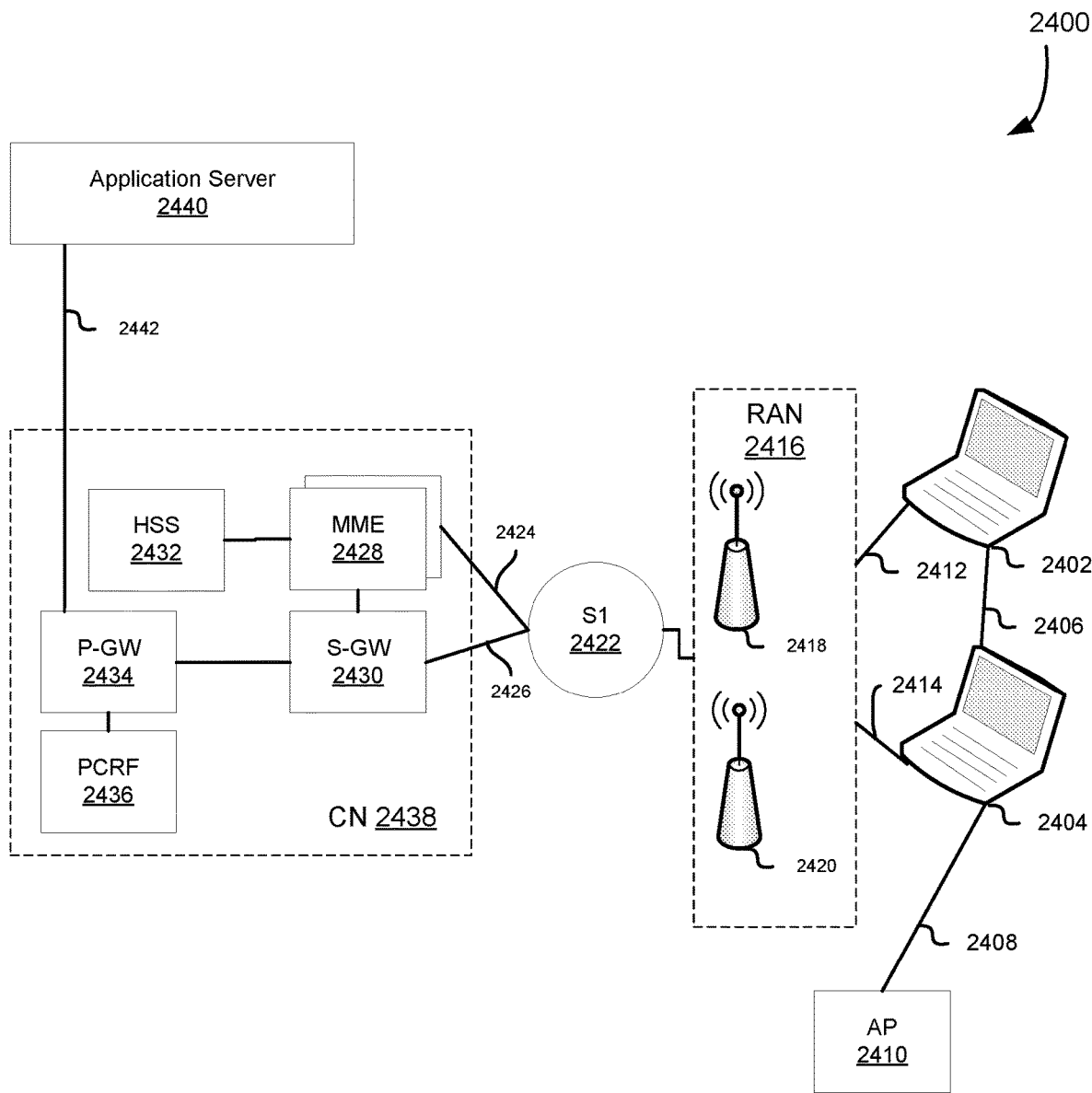
FIG. 24 illustrates an architecture of a system of a network, in accordance with at least one embodiment.

FIG. 24 illustrates an architecture of a system 2400 of a network, in accordance with at least one embodiment. In at least one embodiment, system 2400 is shown to include a user equipment (UE) 2402 and a UE 2404. In at least one embodiment, UEs 2402 and 2404 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In at least one embodiment, any of UEs 2402 and 2404 can comprise an Internet of Things (IoT) UE, which can comprise a network access layer designed for low-power IoT applications utilizing short-lived UE connections. In at least one embodiment, an IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. In at least one embodiment, a M2M or MTC exchange of data may be a machine-initiated exchange of data. In at least one embodiment, an IoT network describes interconnecting IoT UEs, which may include uniquely identifiable embedded computing devices (within Internet infrastructure), with short-lived connections. In at least one embodiment, an IoT UEs may execute background applications (e.g., keep alive messages, status updates, etc.) to facilitate connections of an IoT network.

In at least one embodiment, UEs 2402 and 2404 may be configured to connect, e.g., communicatively couple, with a radio access network (RAN) 2416. In at least one embodiment, RAN 2416 may be, for example, an Evolved Universal Mobile Telecommunications System (UMTS) Terrestrial Radio Access Network (E-UTRAN), a NextGen RAN (NG RAN), or some other type of RAN. In at least one embodiment, UEs 2402 and 2404 utilize connections 2412 and 2414, respectively, each of which comprises a physical communications interface or layer. In at least one embodiment, connections 2412 and 2414 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and variations thereof.

In at least one embodiment, UEs 2402 and 2404 may further directly exchange communication data via a ProSe interface 2406. In at least one embodiment, ProSe interface 2406 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

In at least one embodiment, UE 2404 is shown to be configured to access an access point (AP) 2410 via connection 2408. In at least one embodiment, connection 2408 can comprise a local wireless connection, such as a connection consistent with any IEEE 802.11 protocol, wherein AP 2410 would comprise a wireless fidelity (WiFi®) router. In at least one embodiment, AP 2410 is shown to be connected to an Internet without connecting to a core network of a wireless system.

In at least one embodiment, RAN 2416 can include one or more access nodes that enable connections 2412 and 2414. In at least one embodiment, these access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). In at least one embodiment, RAN 2416 may include one or more RAN nodes for providing macrocells, e.g., macro RAN node 2418, and one or more RAN nodes for providing femtocells or picocells (e.g., cells having smaller coverage areas, smaller user capacity, or higher bandwidth compared to macrocells), e.g., low power (LP) RAN node 2420.

In at least one embodiment, any of RAN nodes 2418 and 2420 can terminate an air interface protocol and can be a first point of contact for UEs 2402 and 2404. In at least one embodiment, any of RAN nodes 2418 and 2420 can fulfill various logical functions for RAN 2416 including, but not limited to, radio network controller (RNC) functions such as radio bearer management, uplink and downlink dynamic radio resource management and data packet scheduling, and mobility management.

In at least one embodiment, UEs 2402 and 2404 can be configured to communicate using Orthogonal Frequency-Division Multiplexing (OFDM) communication signals with each other or with any of RAN nodes 2418 and 2420 over a multi-carrier communication channel in accordance various communication techniques, such as, but not limited to, an Orthogonal Frequency Division Multiple Access (OFDMA) communication technique (e.g., for downlink communications) or a Single Carrier Frequency Division Multiple Access (SC-FDMA) communication technique (e.g., for uplink and ProSe or sidelink communications), and/or variations thereof. In at least one embodiment, OFDM signals can comprise a plurality of orthogonal subcarriers.

In at least one embodiment, a downlink resource grid can be used for downlink transmissions from any of RAN nodes 2418 and 2420 to UEs 2402 and 2404, while uplink transmissions can utilize similar techniques. In at least one embodiment, a grid can be a time frequency grid, called a resource grid or time-frequency resource grid, which is a physical resource in a downlink in each slot. In at least one embodiment, such a time frequency plane representation is a common practice for OFDM systems, which makes it intuitive for radio resource allocation. In at least one embodiment, each column and each row of a resource grid corresponds to one OFDM symbol and one OFDM subcarrier, respectively. In at least one embodiment, a duration of a resource grid in a time domain corresponds to one slot in a radio frame. In at least one embodiment, a smallest time-frequency unit in a resource grid is denoted as a resource element. In at least one embodiment, each resource grid comprises a number of resource blocks, which describe a mapping of certain physical channels to resource elements. In at least one embodiment, each resource block comprises a collection of resource elements. In at least one embodiment, in a frequency domain, this may represent a smallest quantity of resources that currently can be allocated. In at least one embodiment, there are several different physical downlink channels that are conveyed using such resource blocks.

In at least one embodiment, a physical downlink shared channel (PDSCH) may carry user data and higher-layer signaling to UEs 2402 and 2404. In at least one embodiment, a physical downlink control channel (PDCCH) may carry information about a transport format and resource allocations related to PDSCH channel, among other things. In at least one embodiment, it may also inform UEs 2402 and 2404 about a transport format, resource allocation, and HARQ (Hybrid Automatic Repeat Request) information related to an uplink shared channel. In at least one embodiment, typically, downlink scheduling (assigning control and shared channel resource blocks to UE 2402 within a cell) may be performed at any of RAN nodes 2418 and 2420 based on channel quality information fed back from any of UEs 2402 and 2404. In at least one embodiment, downlink resource assignment information may be sent on a PDCCH used for (e.g., assigned to) each of UEs 2402 and 2404.

In at least one embodiment, a PDCCH may use control channel elements (CCEs) to convey control information. In at least one embodiment, before being mapped to resource elements, PDCCH complex valued symbols may first be organized into quadruplets, which may then be permuted using a sub-block interleaver for rate matching. In at least one embodiment, each PDCCH may be transmitted using one or more of these CCEs, where each CCE may correspond to nine sets of four physical resource elements known as resource element groups (REGs). In at least one embodiment, four Quadrature Phase Shift Keying (QPSK) symbols may be mapped to each REG. In at least one embodiment, PDCCH can be transmitted using one or more CCEs, depending on a size of a downlink control information (DCI) and a channel condition. In at least one embodiment, there can be four or more different PDCCH formats defined in LTE with different numbers of CCEs (e.g., aggregation level, L=1, 2, 4, or 8).

In at least one embodiment, an enhanced physical downlink control channel (EPDCCH) that uses PDSCH resources may be utilized for control information transmission. In at least one embodiment, EPDCCH may be transmitted using one or more enhanced control channel elements (ECCEs). In at least one embodiment, each ECCE may correspond to nine sets of four physical resource elements known as an enhanced resource element groups (EREGs). In at least one embodiment, an ECCE may have other numbers of EREGs in some situations.

In at least one embodiment, RAN 2416 is shown to be communicatively coupled to a core network (CN) 2438 via an S1 interface 2422. In at least one embodiment, CN 2438 may be an evolved packet core (EPC) network, a NextGen Packet Core (NPC) network, or some other type of CN. In at least one embodiment, S1 interface 2422 is split into two parts: S1-U interface 2426, which carries traffic data between RAN nodes 2418 and 2420 and serving gateway (S-GW) 2430, and a S1-mobility management entity (MME) interface 2424, which is a signaling interface between RAN nodes 2418 and 2420 and MMES 2428.

In at least one embodiment, CN 2438 comprises MMES 2428, S-GW 2430, Packet Data Network (PDN) Gateway (P-GW) 2434, and a home subscriber server (HSS) 2432. In at least one embodiment, MMES 2428 may be similar in function to a control plane of legacy Serving General Packet Radio Service (GPRS) Support Nodes (SGSN). In at least one embodiment, MMES 2428 may manage mobility aspects in access such as gateway selection and tracking area list management. In at least one embodiment, HSS 2432 may comprise a database for network users, including subscription related information to support a network entities' handling of communication sessions. In at least one embodiment, CN 2438 may comprise one or several HSSs 2432, depending on a number of mobile subscribers, on a capacity of an equipment, on an organization of a network, etc. In at least one embodiment, HSS 2432 can provide support for routing/roaming, authentication, authorization, naming/addressing resolution, location dependencies, etc.

In at least one embodiment, S-GW 2430 may terminate a S1 interface 2422 towards RAN 2416, and routes data packets between RAN 2416 and CN 2438. In at least one embodiment, S-GW 2430 may be a local mobility anchor point for inter-RAN node handovers and also may provide an anchor for inter-3GPP mobility. In at least one embodiment, other responsibilities may include lawful intercept, charging, and some policy enforcement.

In at least one embodiment, P-GW 2434 may terminate an SGi interface toward a PDN. In at least one embodiment, P-GW 2434 may route data packets between an EPC network 2438 and external networks such as a network including application server 2440 (alternatively referred to as application function (AF)) via an Internet Protocol (IP) interface 2442. In at least one embodiment, application server 2440 may be an element offering applications that use IP bearer resources with a core network (e.g., UMTS Packet Services (PS) domain, LTE PS data services, etc.). In at least one embodiment, P-GW 2434 is shown to be communicatively coupled to an application server 2440 via an IP communications interface 2442. In at least one embodiment, application server 2440 can also be configured to support one or more communication services (e.g., Voice-over-Internet Protocol (VoIP) sessions, PTT sessions, group communication sessions, social networking services, etc.) for UEs 2402 and 2404 via CN 2438.

In at least one embodiment, P-GW 2434 may further be a node for policy enforcement and charging data collection. In at least one embodiment, policy and Charging Enforcement Function (PCRF) 2436 is a policy and charging control element of CN 2438. In at least one embodiment, in a non-roaming scenario, there may be a single PCRF in a Home Public Land Mobile Network (HPLMN) associated with a UE's Internet Protocol Connectivity Access Network (IP-CAN) session. In at least one embodiment, in a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). In at least one embodiment, PCRF 2436 may be communicatively coupled to application server 2440 via P-GW 2434. In at least one embodiment, application server 2440 may signal PCRF 2436 to indicate a new service flow and select an appropriate Quality of Service (QoS) and charging parameters. In at least one embodiment, PCRF 2436 may provision this rule into a Policy and Charging Enforcement Function (PCEF) (not shown) with an appropriate traffic flow template (TFT) and QoS class of identifier (QCI), which commences a QoS and charging as specified by application server 2440.

Figure 25:
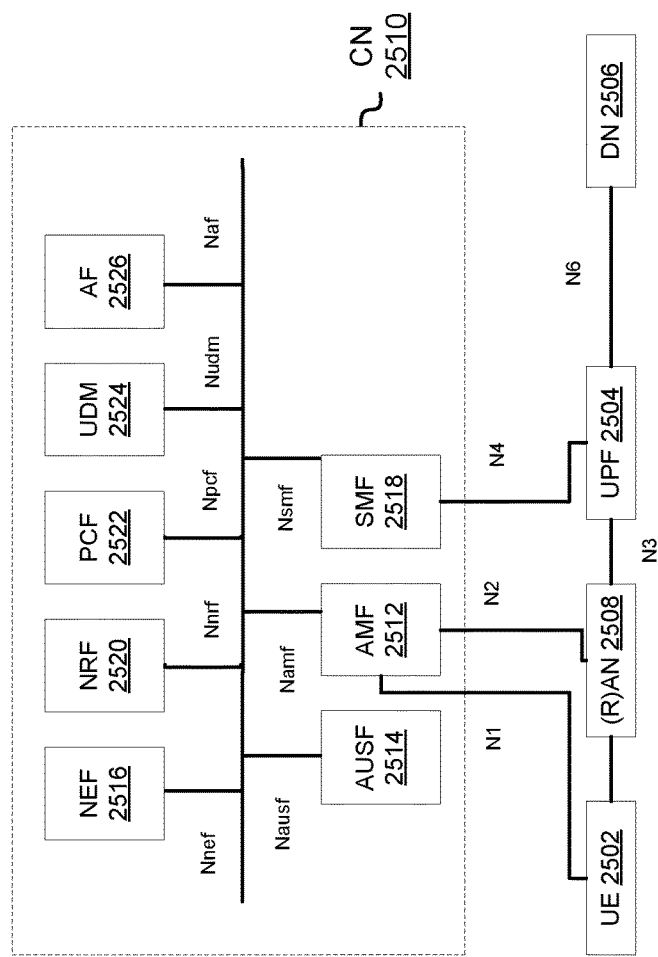
FIG. 25 illustrates an architecture of a system of a network, in accordance with at least one embodiment.

FIG. 25 illustrates an architecture of a system 2500 of a network in accordance with some embodiments. In at least one embodiment, system 2500 is shown to include a UE 2502, a 5G access node or RAN node (shown as (R)AN node 2508), a User Plane Function (shown as UPF 2504), a Data Network (DN 2506), which may be, for example, operator services, Internet access or 3rd party services, and a 5G Core Network (5GC) (shown as CN 2510).

In at least one embodiment, CN 2510 includes an Authentication Server Function (AUSF 2514); a Core Access and Mobility Management Function (AMF 2512); a Session Management Function (SMF 2518); a Network Exposure Function (NEF 2516); a Policy Control Function (PCF 2522); a Network Function (NF) Repository Function (NRF 2520); a Unified Data Management (UDM 2524); and an Application Function (AF 2526). In at least one embodiment, CN 2510 may also include other elements that are not shown, such as a Structured Data Storage network function (SDSF), an Unstructured Data Storage network function (UDSF), and variations thereof.

In at least one embodiment, UPF 2504 may act as an anchor point for intra-RAT and inter-RAT mobility, an external PDU session point of interconnect to DN 2506, and a branching point to support multi-homed PDU session. In at least one embodiment, UPF 2504 may also perform packet routing and forwarding, packet inspection, enforce user plane part of policy rules, lawfully intercept packets (UP collection); traffic usage reporting, perform QoS handling for user plane (e.g., packet filtering, gating, UL/DL rate enforcement), perform Uplink Traffic verification (e.g., SDF to QoS flow mapping), transport level packet marking in uplink and downlink, and downlink packet buffering and downlink data notification triggering. In at least one embodiment, UPF 2504 may include an uplink classifier to support routing traffic flows to a data network. In at least one embodiment, DN 2506 may represent various network operator services, Internet access, or third party services.

In at least one embodiment, AUSF 2514 may store data for authentication of UE 2502 and handle authentication related functionality. In at least one embodiment, AUSF 2514 may facilitate a common authentication framework for various access types.

In at least one embodiment, AMF 2512 may be responsible for registration management (e.g., for registering UE 2502, etc.), connection management, reachability management, mobility management, and lawful interception of AMF-related events, and access authentication and authorization. In at least one embodiment, AMF 2512 may provide transport for SM messages for SMF 2518, and act as a transparent proxy for routing SM messages. In at least one embodiment, AMF 2512 may also provide transport for short message service (SMS) messages between UE 2502 and an SMS function (SMSF) (not shown by FIG. 25). In at least one embodiment, AMF 2512 may act as Security Anchor Function (SEA), which may include interaction with AUSF 2514 and UE 2502 and receipt of an intermediate key that was established as a result of UE 2502 authentication process. In at least one embodiment, where USIM based authentication is used, AMF 2512 may retrieve security material from AUSF 2514. In at least one embodiment, AMF 2512 may also include a Security Context Management (SCM) function, which receives a key from SEA that it uses to derive access-network specific keys. In at least one embodiment, furthermore, AMF 2512 may be a termination point of RAN CP interface (N2 reference point), a termination point of NAS (NI) signaling, and perform NAS ciphering and integrity protection.

In at least one embodiment, AMF 2512 may also support NAS signaling with a UE 2502 over an N3 interworking-function (IWF) interface. In at least one embodiment, N3IWF may be used to provide access to untrusted entities. In at least one embodiment, N3IWF may be a termination point for N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in uplink, and enforce QoS corresponding to N3 packet marking taking into account QoS requirements associated to such marking received over N2. In at least one embodiment, N3IWF may also relay uplink and downlink control-plane NAS (NI) signaling between UE 2502 and AMF 2512, and relay uplink and downlink user-plane packets between UE 2502 and UPF 2504. In at least one embodiment, N3IWF also provides mechanisms for IPsec tunnel establishment with UE 2502.

In at least one embodiment, SMF 2518 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. In at least one embodiment, SMF 2518 may include following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

In at least one embodiment, NEF 2516 may provide means for securely exposing services and capabilities provided by 3GPP network functions for third party, internal exposure/re-exposure, Application Functions (e.g., AF 2526), edge computing or fog computing systems, etc. In at least one embodiment, NEF 2516 may authenticate, authorize, and/or throttle AFs. In at least one embodiment, NEF 2516 may also translate information exchanged with AF 2526 and information exchanged with internal network functions. In at least one embodiment, NEF 2516 may translate between an AF-Service-Identifier and an internal 5GC information. In at least one embodiment, NEF 2516 may also receive information from other network functions (NFs) based on exposed capabilities of other network functions. In at least one embodiment, this information may be stored at NEF 2516 as structured data, or at a data storage NF using a standardized interfaces. In at least one embodiment, stored information can then be re-exposed by NEF 2516 to other NFs and AFs, and/or used for other purposes such as analytics.

In at least one embodiment, NRF 2520 may support service discovery functions, receive NF Discovery Requests from NF instances, and provide information of discovered NF instances to NF instances. In at least one embodiment, NRF 2520 also maintains information of available NF instances and their supported services.

In at least one embodiment, PCF 2522 may provide policy rules to control plane function(s) to enforce them, and may also support unified policy framework to govern network behavior. In at least one embodiment, PCF 2522 may also implement a front end (FE) to access subscription information relevant for policy decisions in a UDR of UDM 2524.

In at least one embodiment, UDM 2524 may handle subscription-related information to support a network entities' handling of communication sessions, and may store subscription data of UE 2502. In at least one embodiment, UDM 2524 may include two parts, an application FE and a User Data Repository (UDR). In at least one embodiment, UDM may include a UDM FE, which is in charge of processing of credentials, location management, subscription management and so on. In at least one embodiment, several different front ends may serve a same user in different transactions. In at least one embodiment, UDM-FE accesses subscription information stored in an UDR and performs authentication credential processing; user identification handling; access authorization; registration/mobility management; and subscription management. In at least one embodiment, UDR may interact with PCF 2522. In at least one embodiment, UDM 2524 may also support SMS management, wherein an SMS-FE implements a similar application logic as discussed previously.

In at least one embodiment, AF 2526 may provide application influence on traffic routing, access to a Network Capability Exposure (NCE), and interact with a policy framework for policy control. In at least one embodiment, NCE may be a mechanism that allows a 5GC and AF 2526 to provide information to each other via NEF 2516, which may be used for edge computing implementations. In at least one embodiment, network operator and third party services may be hosted close to UE 2502 access point of attachment to achieve an efficient service delivery through a reduced end-to-end latency and load on a transport network. In at least one embodiment, for edge computing implementations, 5GC may select a UPF 2504 close to UE 2502 and execute traffic steering from UPF 2504 to DN 2506 via N6 interface. In at least one embodiment, this may be based on UE subscription data, UE location, and information provided by AF 2526. In at least one embodiment, AF 2526 may influence UPF (re)selection and traffic routing. In at least one embodiment, based on operator deployment, when AF 2526 is considered to be a trusted entity, a network operator may permit AF 2526 to interact directly with relevant NFs.

In at least one embodiment, CN 2510 may include an SMSF, which may be responsible for SMS subscription checking and verification, and relaying SM messages to/from UE 2502 to/from other entities, such as an SMS-GMSC/IWMSC/SMS-router. In at least one embodiment, SMS may also interact with AMF 2512 and UDM 2524 for notification procedure that UE 2502 is available for SMS transfer (e.g., set a UE not reachable flag, and notifying UDM 2524 when UE 2502 is available for SMS).

In at least one embodiment, system 2500 may include following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

In at least one embodiment, system 2500 may include following reference points: N1: Reference point between UE and AMF; N2: Reference point between (R)AN and AMF; N3: Reference point between (R)AN and UPF; N4: Reference point between SMF and UPF; and N6: Reference point between UPF and a Data Network. In at least one embodiment, there may be many more reference points and/or service-based interfaces between a NF services in NFs, however, these interfaces and reference points have been omitted for clarity. In at least one embodiment, an NS reference point may be between a PCF and AF; an N7 reference point may be between PCF and SMF; an N11 reference point between AMF and SMF; etc. In at least one embodiment, CN 2510 may include an Nx interface, which is an inter-CN interface between MME and AMF 2512 in order to enable interworking between CN 2510 and CN 7225.

In at least one embodiment, system 2500 may include multiple RAN nodes (such as (R)AN node 2508) wherein an Xn interface is defined between two or more (R)AN node 2508 (e.g., gNBs) that connecting to 5GC 410, between a (R)AN node 2508 (e.g., gNB) connecting to CN 2510 and an eNB (e.g., a macro RAN node), and/or between two eNBs connecting to CN 2510.

In at least one embodiment, Xn interface may include an Xn user plane (Xn-U) interface and an Xn control plane (Xn-C) interface. In at least one embodiment, Xn-U may provide non-guaranteed delivery of user plane PDUs and support/provide data forwarding and flow control functionality. In at least one embodiment, Xn-C may provide management and error handling functionality, functionality to manage a Xn-C interface; mobility support for UE 2502 in a connected mode (e.g., CM-CONNECTED) including functionality to manage UE mobility for connected mode between one or more (R)AN node 2508. In at least one embodiment, mobility support may include context transfer from an old (source) serving (R)AN node 2508 to new (target) serving (R)AN node 2508; and control of user plane tunnels between old (source) serving (R)AN node 2508 to new (target) serving (R)AN node 2508.

In at least one embodiment, a protocol stack of a Xn-U may include a transport network layer built on Internet Protocol (IP) transport layer, and a GTP-U layer on top of a UDP and/or IP layer(s) to carry user plane PDUs. In at least one embodiment, Xn-C protocol stack may include an application layer signaling protocol (referred to as Xn Application Protocol (Xn-AP)) and a transport network layer that is built on SCTP layer. In at least one embodiment, SCTP layer may be on top of an IP layer. In at least one embodiment, SCTP layer provides a guaranteed delivery of application layer messages. In at least one embodiment, in a transport IP layer point-to-point transmission is used to deliver signaling PDUs. In at least one embodiment, Xn-U protocol stack and/or a Xn-C protocol stack may be same or similar to a user plane and/or control plane protocol stack(s) shown and described herein.

Figure 26:
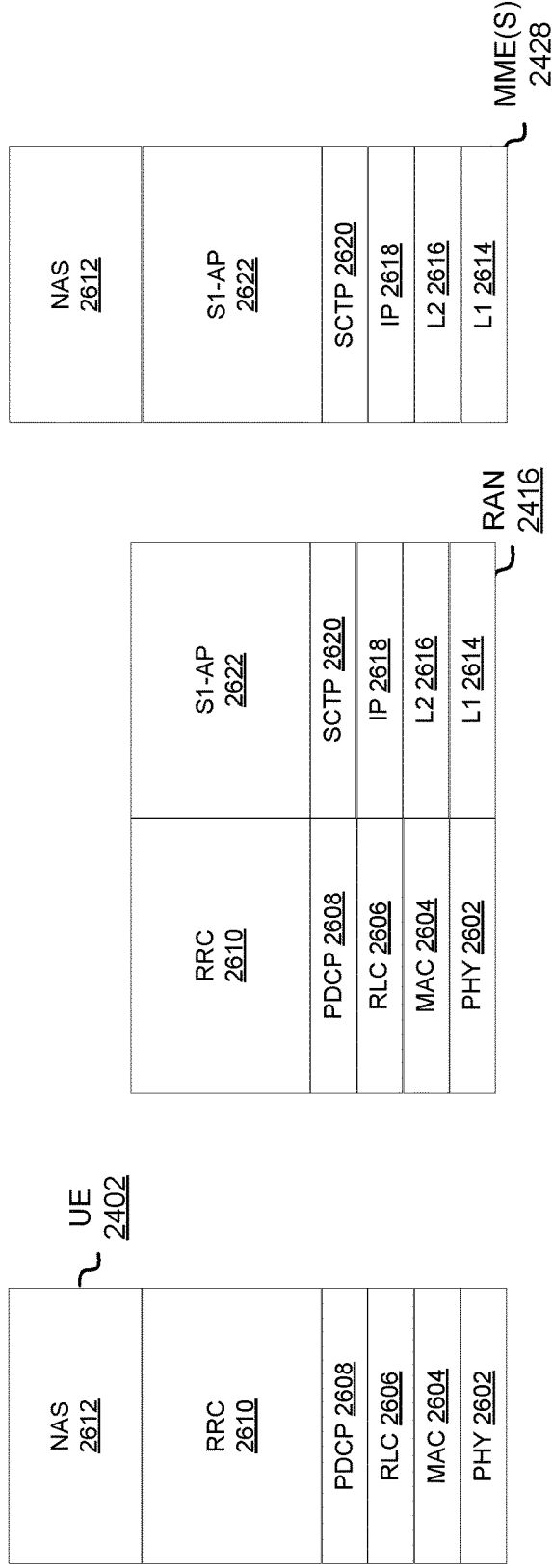
FIG. 26 illustrates a control plane protocol stack, in accordance with at least one embodiment.

FIG. 26 is an illustration of a control plane protocol stack in accordance with some embodiments. In at least one embodiment, a control plane 2600 is shown as a communications protocol stack between UE 2402 (or alternatively, UE 2404), RAN 2416, and MME(s) 2428.

In at least one embodiment, PHY layer 2602 may transmit or receive information used by MAC layer 2604 over one or more air interfaces. In at least one embodiment, PHY layer 2602 may further perform link adaptation or adaptive modulation and coding (AMC), power control, cell search (e.g., for initial synchronization and handover purposes), and other measurements used by higher layers, such as an RRC layer 2610. In at least one embodiment, PHY layer 2602 may still further perform error detection on transport channels, forward error correction (FEC) coding/de-coding of transport channels, modulation/demodulation of physical channels, interleaving, rate matching, mapping onto physical channels, and Multiple Input Multiple Output (MIMO) antenna processing.

In at least one embodiment, MAC layer 2604 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from PHY via transport channels, multiplexing MAC SDUs onto TBs, scheduling information reporting, error correction through hybrid automatic repeat request (HARD), and logical channel prioritization.

In at least one embodiment, RLC layer 2606 may operate in a plurality of modes of operation, including: Transparent Mode (TM), Unacknowledged Mode (UM), and Acknowledged Mode (AM). In at least one embodiment, RLC layer 2606 may execute transfer of upper layer protocol data units (PDUs), error correction through automatic repeat request (ARQ) for AM data transfers, and concatenation, segmentation and reassembly of RLC SDUs for UM and AM data transfers. In at least one embodiment, RLC layer 2606 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

In at least one embodiment, PDCP layer 2608 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

In at least one embodiment, main services and functions of a RRC layer 2610 may include broadcast of system information (e.g., included in Master Information Blocks (MIBs) or System Information Blocks (SIBs) related to a non-access stratum (NAS)), broadcast of system information related to an access stratum (AS), paging, establishment, maintenance and release of an RRC connection between an UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. In at least one embodiment, said MIBs and SIBs may comprise one or more information elements (IEs), which may each comprise individual data fields or data structures.

In at least one embodiment, UE 2402 and RAN 2416 may utilize a Uu interface (e.g., an LTE-Uu interface) to exchange control plane data via a protocol stack comprising PHY layer 2602, MAC layer 2604, RLC layer 2606, PDCP layer 2608, and RRC layer 2610.

In at least one embodiment, non-access stratum (NAS) protocols (NAS protocols 2612) form a highest stratum of a control plane between UE 2402 and MME(s) 2428. In at least one embodiment, NAS protocols 2612 support mobility of UE 2402 and session management procedures to establish and maintain IP connectivity between UE 2402 and P-GW 2434.

In at least one embodiment, Si Application Protocol (S1-AP) layer (Si-AP layer 2622) may support functions of a Si interface and comprise Elementary Procedures (EPs). In at least one embodiment, an EP is a unit of interaction between RAN 2416 and CN 2428. In at least one embodiment, S1-AP layer services may comprise two groups: UE-associated services and non UE-associated services. In at least one embodiment, these services perform functions including, but not limited to: E-UTRAN Radio Access Bearer (E-RAB) management, UE capability indication, mobility, NAS signaling transport, RAN Information Management (RIM), and configuration transfer.

In at least one embodiment, Stream Control Transmission Protocol (SCTP) layer (alternatively referred to as a stream control transmission protocol/internet protocol (SCTP/IP) layer) (SCTP layer 2620) may ensure reliable delivery of signaling messages between RAN 2416 and MME(s) 2428 based, in part, on an IP protocol, supported by an IP layer 2618. In at least one embodiment, L2 layer 2616 and an L1 layer 2614 may refer to communication links (e.g., wired or wireless) used by a RAN node and MME to exchange information.

In at least one embodiment, RAN 2416 and MME(s) 2428 may utilize an S1-MME interface to exchange control plane data via a protocol stack comprising a L1 layer 2614, L2 layer 2616, IP layer 2618, SCTP layer 2620, and Si-AP layer 2622.

Figure 27:
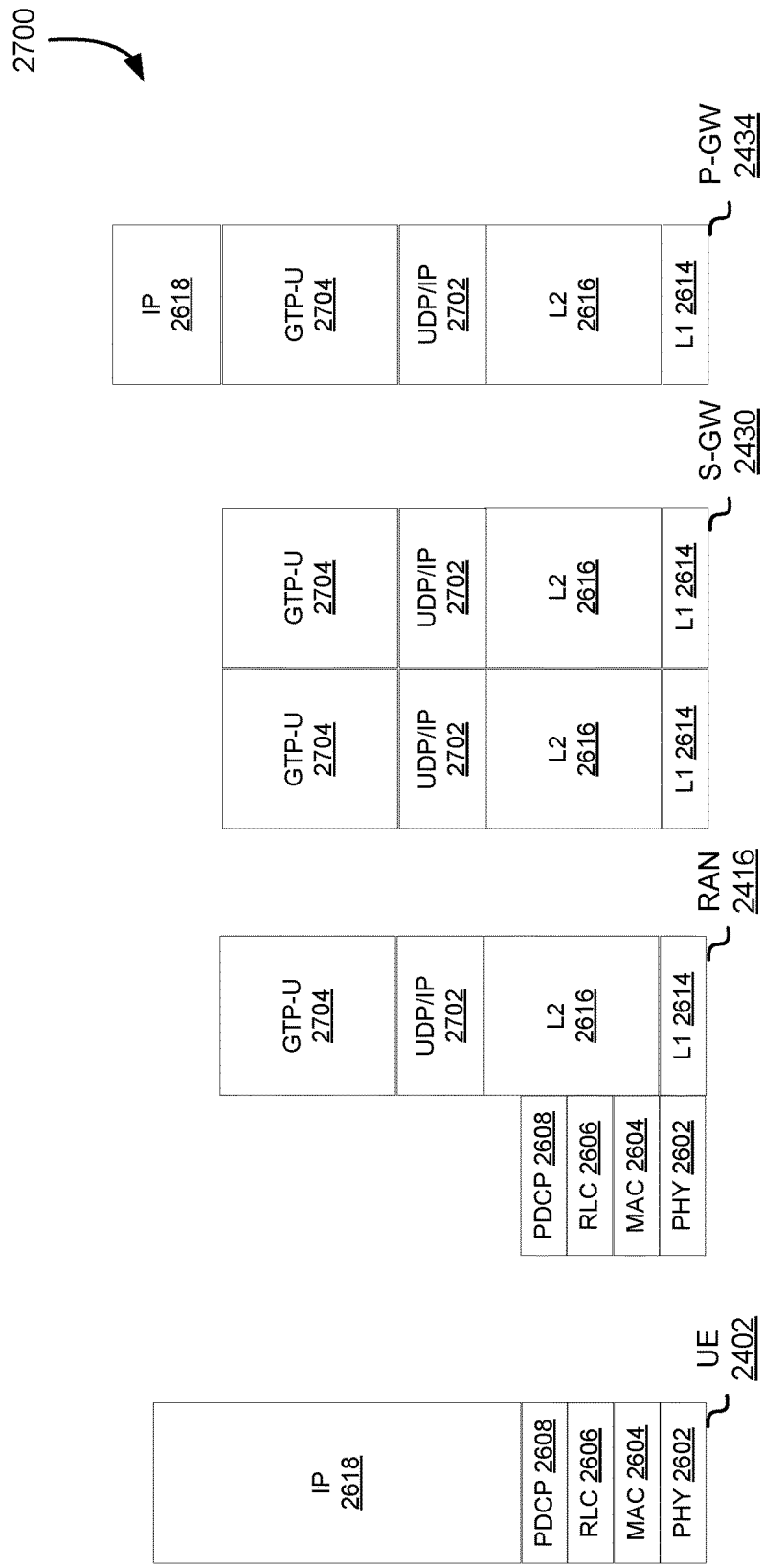
FIG. 27 illustrates a user plane protocol stack, in accordance with at least one embodiment.

FIG. 27 is an illustration of a user plane protocol stack in accordance with at least one embodiment. In at least one embodiment, a user plane 2700 is shown as a communications protocol stack between a UE 2402, RAN 2416, S-GW 2430, and P-GW 2434. In at least one embodiment, user plane 2700 may utilize a same protocol layers as control plane 2600. In at least one embodiment, for example, UE 2402 and RAN 2416 may utilize a Uu interface (e.g., an LTE-Uu interface) to exchange user plane data via a protocol stack comprising PHY layer 2602, MAC layer 2604, RLC layer 2606, PDCP layer 2608.

In at least one embodiment, General Packet Radio Service (GPRS) Tunneling Protocol for a user plane (GTP-U) layer (GTP-U layer 2704) may be used for carrying user data within a GPRS core network and between a radio access network and a core network. In at least one embodiment, user data transported can be packets in any of IPv4, IPv6, or PPP formats, for example. In at least one embodiment, UDP and IP security (UDP/IP) layer (UDP/IP layer 2702) may provide checksums for data integrity, port numbers for addressing different functions at a source and destination, and encryption and authentication on selected data flows. In at least one embodiment, RAN 2416 and S-GW 2430 may utilize an S1-U interface to exchange user plane data via a protocol stack comprising L1 layer 2614, L2 layer 2616, UDP/IP layer 2702, and GTP-U layer 2704. In at least one embodiment, S-GW 2430 and P-GW 2434 may utilize an S5/S8a interface to exchange user plane data via a protocol stack comprising L1 layer 2614, L2 layer 2616, UDP/IP layer 2702, and GTP-U layer 2704. In at least one embodiment, as discussed above with respect to FIG. 26, NAS protocols support a mobility of UE 2402 and session management procedures to establish and maintain IP connectivity between UE 2402 and P-GW 2434.

Figure 28:
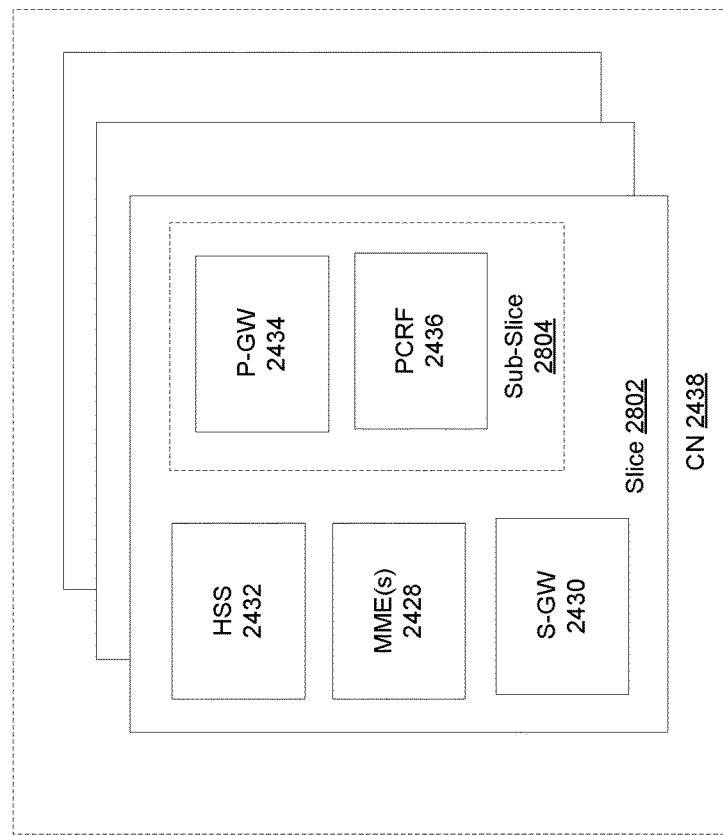
FIG. 28 illustrates components of a core network, in accordance with at least one embodiment.

FIG. 28 illustrates components 2800 of a core network in accordance with at least one embodiment. In at least one embodiment, components of CN 2438 may be implemented in one physical node or separate physical nodes including components to read and execute instructions from a machine-readable or computer-readable medium (e.g., a non-transitory machine-readable storage medium). In at least one embodiment, Network Functions Virtualization (NFV) is utilized to virtualize any or all of above described network node functions via executable instructions stored in one or more computer readable storage mediums (described in further detail below). In at least one embodiment, a logical instantiation of CN 2438 may be referred to as a network slice 2802 (e.g., network slice 2802 is shown to include HSS 2432, MME(s) 2428, and S-GW 2430). In at least one embodiment, a logical instantiation of a portion of CN 2438 may be referred to as a network sub-slice 2804 (e.g., network sub-slice 2804 is shown to include P-GW 2434 and PCRF 2436).

In at least one embodiment, NFV architectures and infrastructures may be used to virtualize one or more network functions, alternatively performed by proprietary hardware, onto physical resources comprising a combination of industry-standard server hardware, storage hardware, or switches. In at least one embodiment, NFV systems can be used to execute virtual or reconfigurable implementations of one or more EPC components/functions.

Figure 29:
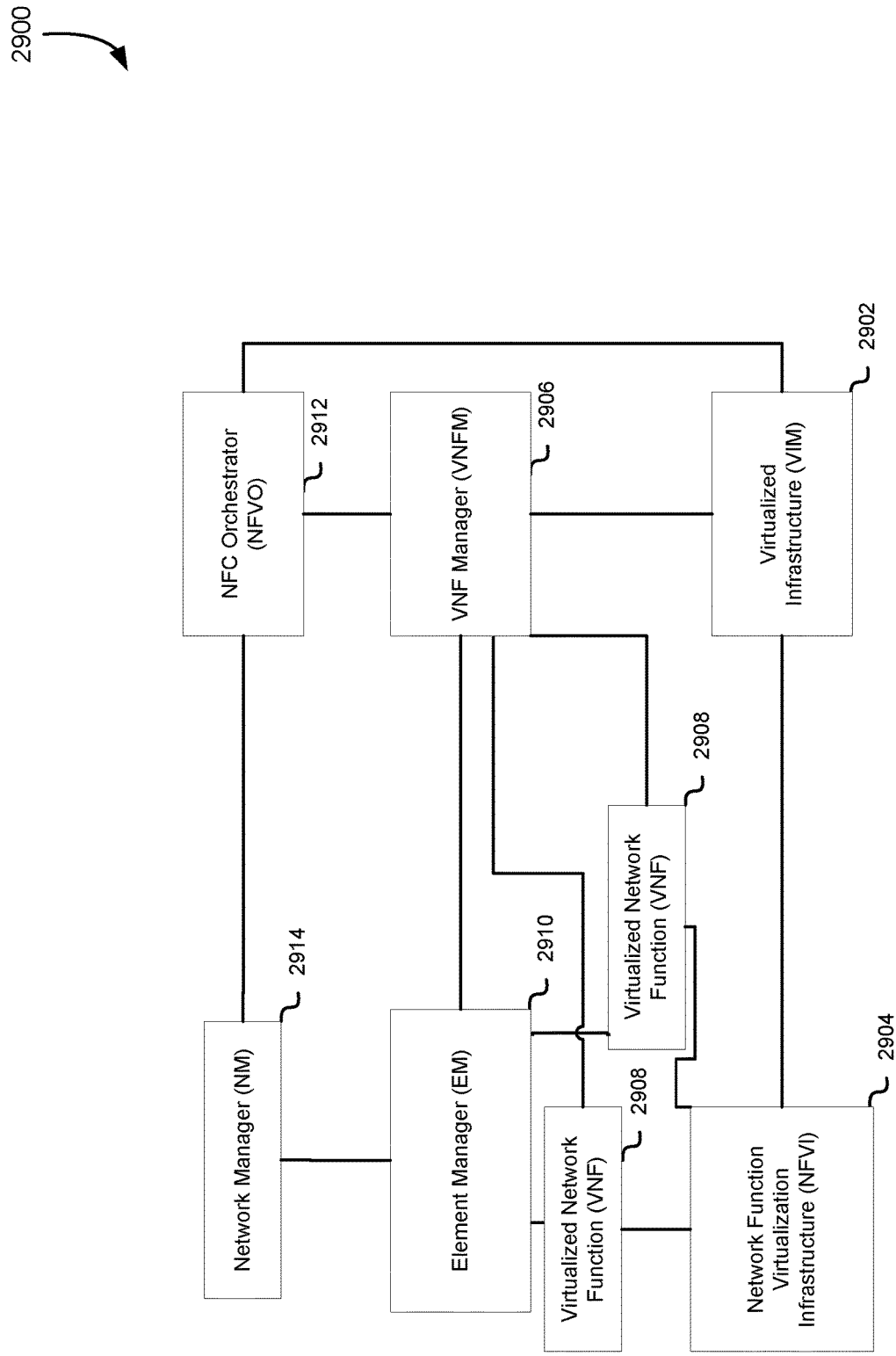
FIG. 29 illustrates components of a system to support network function virtualization (NFV), in accordance with at least one embodiment.

FIG. 29 is a block diagram illustrating components, according to at least one embodiment, of a system 2900 to support network function virtualization (NFV). In at least one embodiment, system 2900 is illustrated as including a virtualized infrastructure manager (shown as VIM 2902), a network function virtualization infrastructure (shown as NFVI 2904), a VNF manager (shown as VNFM 2906), virtualized network functions (shown as VNF 2908), an element manager (shown as EM 2910), an NFV Orchestrator (shown as NFVO 2912), and a network manager (shown as NM 2914).

In at least one embodiment, VIM 2902 manages resources of NFVI 2904. In at least one embodiment, NFVI 2904 can include physical or virtual resources and applications (including hypervisors) used to execute system 2900. In at least one embodiment, VIM 2902 may manage a life cycle of virtual resources with NFVI 2904 (e.g., creation, maintenance, and tear down of virtual machines (VMs) associated with one or more physical resources), track VM instances, track performance, fault and security of VM instances and associated physical resources, and expose VM instances and associated physical resources to other management systems.

In at least one embodiment, VNFM 2906 may manage VNF 2908. In at least one embodiment, VNF 2908 may be used to execute EPC components/functions. In at least one embodiment, VNFM 2906 may manage a life cycle of VNF 2908 and track performance, fault and security of virtual aspects of VNF 2908. In at least one embodiment, EM 2910 may track performance, fault and security of functional aspects of VNF 2908. In at least one embodiment, tracking data from VNFM 2906 and EM 2910 may comprise, for example, performance measurement (PM) data used by VIM 2902 or NFVI 2904. In at least one embodiment, both VNFM 2906 and EM 2910 can scale up/down a quantity of VNFs of system 2900.

In at least one embodiment, NFVO 2912 may coordinate, authorize, release and engage resources of NFVI 2904 in order to provide a requested service (e.g., to execute an EPC function, component, or slice). In at least one embodiment, NM 2914 may provide a package of end-user functions with responsibility for a management of a network, which may include network elements with VNFs, non-virtualized network functions, or both (management of VNFs may occur via an EM 2910).

Computer-Based Systems

The following figures set forth, without limitation, exemplary computer-based systems that can be used to implement at least one embodiment.

Figure 30:
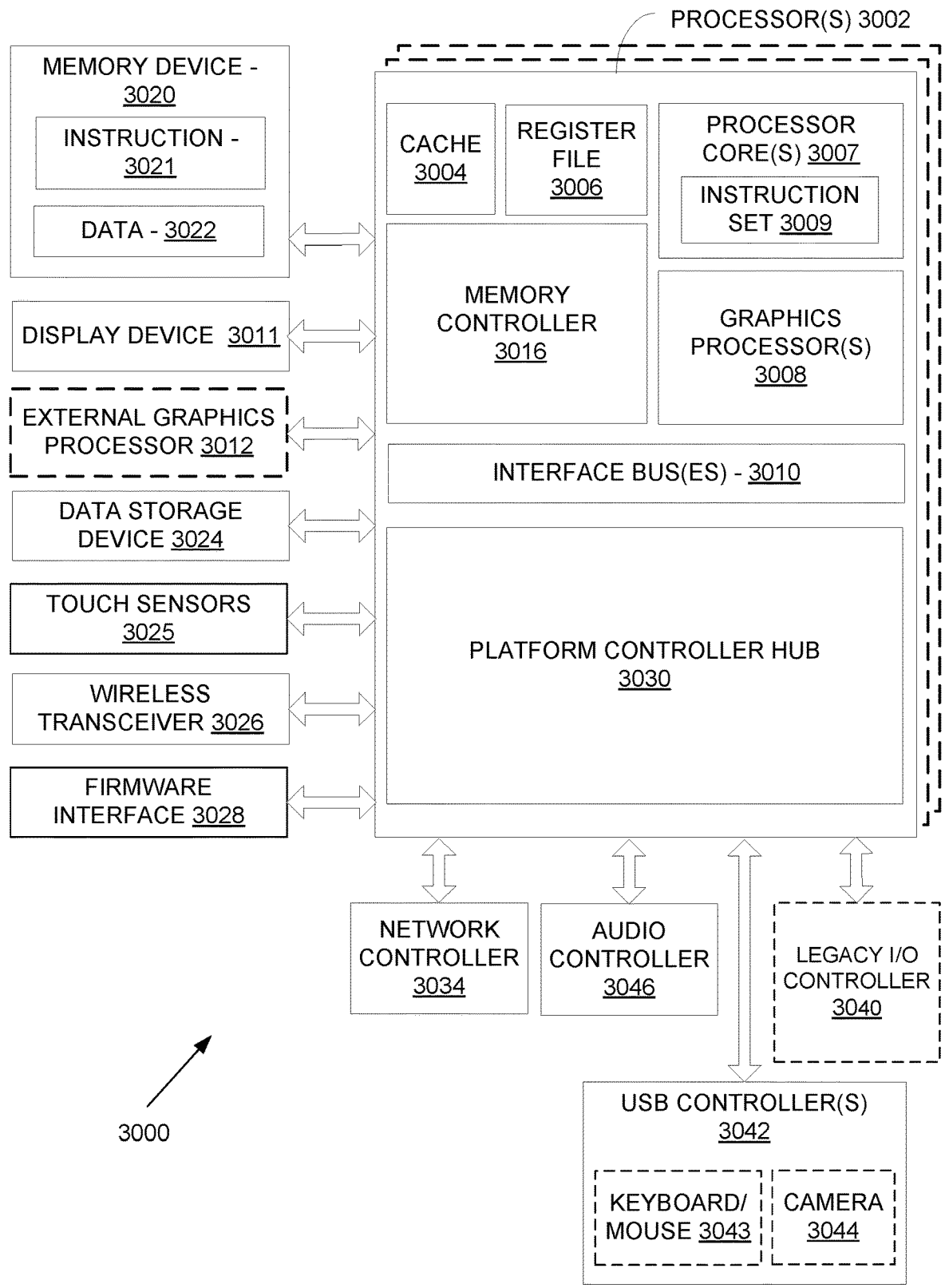
FIG. 30 illustrates a processing system, in accordance with at least one embodiment.

FIG. 30 illustrates a processing system 3000, in accordance with at least one embodiment. In at least one embodiment, processing system 3000 includes one or more processors 3002 and one or more graphics processors 3008, and may be a single processor desktop system, a multiprocessor workstation system, or a server system having a large number of processors 3002 or processor cores 3007. In at least one embodiment, processing system 3000 is a processing platform incorporated within a system-on-a-chip ("SoC") integrated circuit for use in mobile, handheld, or embedded devices.

In at least one embodiment, processing system 3000 can include, or be incorporated within a server-based gaming platform, a game console, a media console, a mobile gaming console, a handheld game console, or an online game console. In at least one embodiment, processing system 3000 is a mobile phone, smart phone, tablet computing device or mobile Internet device. In at least one embodiment, processing system 3000 can also include, couple with, or be integrated within a wearable device, such as a smart watch wearable device, smart eyewear device, augmented reality device, or virtual reality device. In at least one embodiment, processing system 3000 is a television or set top box device having one or more processors 3002 and a graphical interface generated by one or more graphics processors 3008.

In at least one embodiment, one or more processors 3002 each include one or more processor cores 3007 to process instructions which, when executed, perform operations for system and user software. In at least one embodiment, each of one or more processor cores 3007 is configured to process a specific instruction set 3009. In at least one embodiment, instruction set 3009 may facilitate Complex Instruction Set Computing ("CISC"), Reduced Instruction Set Computing ("RISC"), or computing via a Very Long Instruction Word ("VLIW"). In at least one embodiment, processor cores 3007 may each process a different instruction set 3009, which may include instructions to facilitate emulation of other instruction sets. In at least one embodiment, processor core 3007 may also include other processing devices, such as a digital signal processor ("DSP").

In at least one embodiment, processor 3002 includes cache memory ('cache") 3004. In at least one embodiment, processor 3002 can have a single internal cache or multiple levels of internal cache. In at least one embodiment, cache memory is shared among various components of processor 3002. In at least one embodiment, processor 3002 also uses an external cache (e.g., a Level 3 ("L3") cache or Last Level Cache ("LLC")) (not shown), which may be shared among processor cores 3007 using known cache coherency techniques. In at least one embodiment, register file 3006 is additionally included in processor 3002 which may include different types of registers for storing different types of data (e.g., integer registers, floating point registers, status registers, and an instruction pointer register). In at least one embodiment, register file 3006 may include general-purpose registers or other registers.

In at least one embodiment, one or more processor(s) 3002 are coupled with one or more interface bus(es) 3010 to transmit communication signals such as address, data, or control signals between processor 3002 and other components in processing system 3000. In at least one embodiment interface bus 3010, in one embodiment, can be a processor bus, such as a version of a Direct Media Interface ("DMI") bus. In at least one embodiment, interface bus 3010 is not limited to a DMI bus, and may include one or more Peripheral Component Interconnect buses (e.g., "PCI," PCI Express ("PCIe")), memory buses, or other types of interface buses. In at least one embodiment processor(s) 3002 include an integrated memory controller 3016 and a platform controller hub 3030. In at least one embodiment, memory controller 3016 facilitates communication between a memory device and other components of processing system 3000, while platform controller hub ("PCH") 3030 provides connections to Input/Output ("I/O") devices via a local I/O bus.

In at least one embodiment, memory device 3020 can be a dynamic random access memory ("DRAM") device, a static random access memory ("SRAM") device, flash memory device, phase-change memory device, or some other memory device having suitable performance to serve as processor memory. In at least one embodiment memory device 3020 can operate as system memory for processing system 3000, to store data 3022 and instructions 3021 for use when one or more processors 3002 executes an application or process. In at least one embodiment, memory controller 3016 also couples with an optional external graphics processor 3012, which may communicate with one or more graphics processors 3008 in processors 3002 to perform graphics and media operations. In at least one embodiment, a display device 3011 can connect to processor(s) 3002. In at least one embodiment display device 3011 can include one or more of an internal display device, as in a mobile electronic device or a laptop device or an external display device attached via a display interface (e.g., DisplayPort, etc.). In at least one embodiment, display device 3011 can include a head mounted display ("HMD") such as a stereoscopic display device for use in virtual reality ("VR") applications or augmented reality ("AR") applications.

In at least one embodiment, platform controller hub 3030 enables peripherals to connect to memory device 3020 and processor 3002 via a high-speed I/O bus. In at least one embodiment, I/O peripherals include, but are not limited to, an audio controller 3046, a network controller 3034, a firmware interface 3028, a wireless transceiver 3026, touch sensors 3025, a data storage device 3024 (e.g., hard disk drive, flash memory, etc.). In at least one embodiment, data storage device 3024 can connect via a storage interface (e.g., SATA) or via a peripheral bus, such as PCI, or PCIe. In at least one embodiment, touch sensors 3025 can include touch screen sensors, pressure sensors, or fingerprint sensors. In at least one embodiment, wireless transceiver 3026 can be a Wi-Fi transceiver, a Bluetooth transceiver, or a mobile network transceiver such as a 3G, 4G, or Long Term Evolution ("LTE") transceiver. In at least one embodiment, firmware interface 3028 enables communication with system firmware, and can be, for example, a unified extensible firmware interface ("UEFI"). In at least one embodiment, network controller 3034 can enable a network connection to a wired network. In at least one embodiment, a high-performance network controller (not shown) couples with interface bus 3010. In at least one embodiment, audio controller 3046 is a multi-channel high definition audio controller. In at least one embodiment, processing system 3000 includes an optional legacy I/O controller 3040 for coupling legacy (e.g., Personal System 2 ("PS/2")) devices to processing system 3000. In at least one embodiment, platform controller hub 3030 can also connect to one or more Universal Serial Bus ("USB") controllers 3042 connect input devices, such as keyboard and mouse 3043 combinations, a camera 3044, or other USB input devices.

In at least one embodiment, an instance of memory controller 3016 and platform controller hub 3030 may be integrated into a discreet external graphics processor, such as external graphics processor 3012. In at least one embodiment, platform controller hub 3030 and/or memory controller 3016 may be external to one or more processor(s) 3002. For example, in at least one embodiment, processing system 3000 can include an external memory controller 3016 and platform controller hub 3030, which may be configured as a memory controller hub and peripheral controller hub within a system chipset that is in communication with processor(s) 3002.

Figure 31:
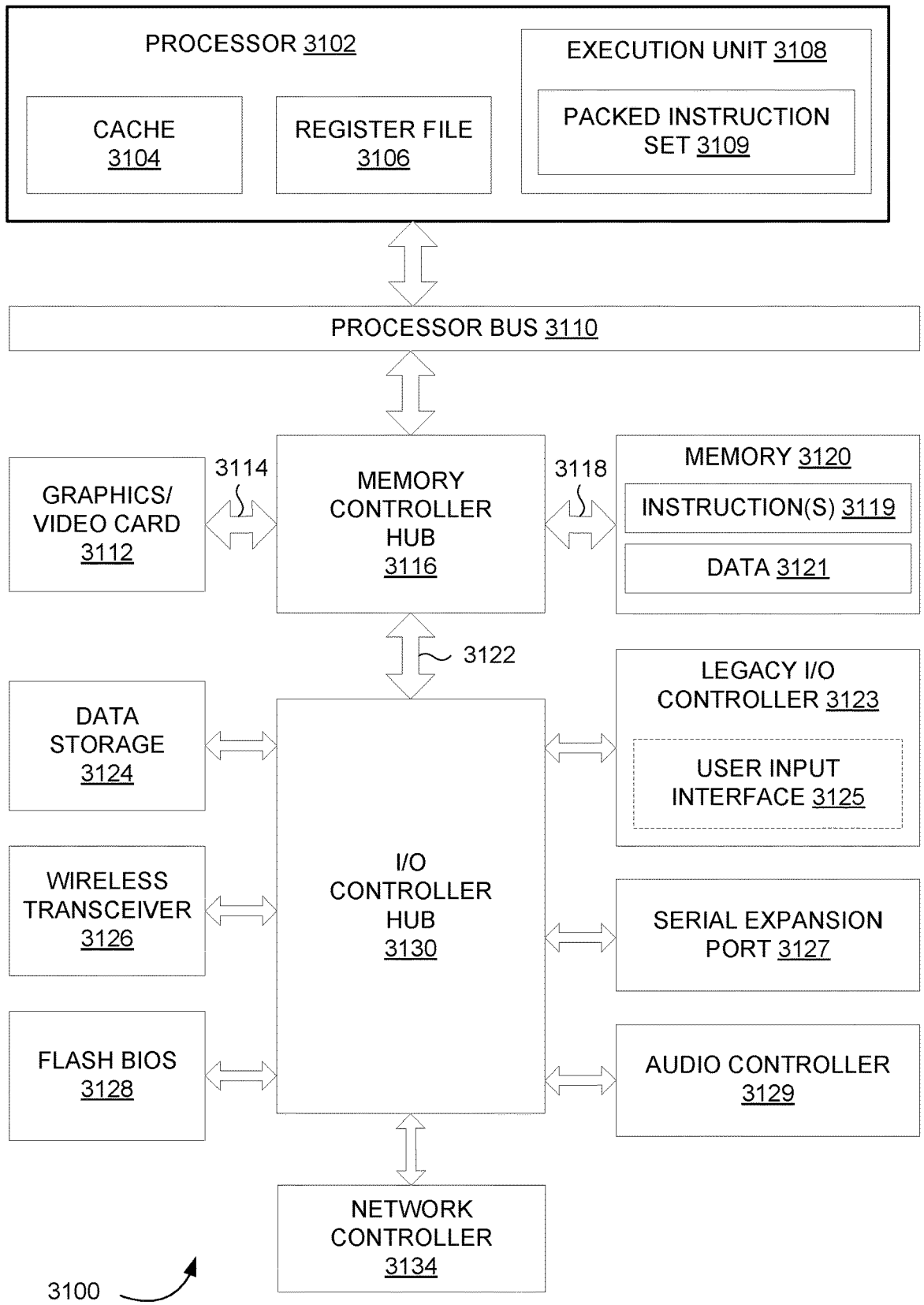
FIG. 31 illustrates a computer system, in accordance with at least one embodiment.

FIG. 31 illustrates a computer system 3100, in accordance with at least one embodiment. In at least one embodiment, computer system 3100 may be a system with interconnected devices and components, an SOC, or some combination. In at least on embodiment, computer system 3100 is formed with a processor 3102 that may include execution units to execute an instruction. In at least one embodiment, computer system 3100 may include, without limitation, a component, such as processor 3102 to employ execution units including logic to perform algorithms for processing data. In at least one embodiment, computer system 3100 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 3100 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 3100 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 3100 may include, without limitation, processor 3102 that may include, without limitation, one or more execution units 3108 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 3100 is a single processor desktop or server system. In at least one embodiment, computer system 3100 may be a multiprocessor system. In at least one embodiment, processor 3102 may include, without limitation, a CISC microprocessor, a RISC microprocessor, a VLIW microprocessor, a processor implementing a combination of instruction sets, or any other processor device, such as a digital signal processor, for example. In at least one embodiment, processor 3102 may be coupled to a processor bus 3110 that may transmit data signals between processor 3102 and other components in computer system 3100.

In at least one embodiment, processor 3102 may include, without limitation, a Level 1 ("L1") internal cache memory ("cache") 3104. In at least one embodiment, processor 3102 may have a single internal cache or multiple levels of internal cache. In at least one embodiment, cache memory may reside external to processor 3102. In at least one embodiment, processor 3102 may also include a combination of both internal and external caches. In at least one embodiment, a register file 3106 may store different types of data in various registers including, without limitation, integer registers, floating point registers, status registers, and instruction pointer register.

In at least one embodiment, execution unit 3108, including, without limitation, logic to perform integer and floating point operations, also resides in processor 3102. Processor 3102 may also include a microcode ("ucode") read only memory ("ROM") that stores microcode for certain macro instructions. In at least one embodiment, execution unit 3108 may include logic to handle a packed instruction set 3109. In at least one embodiment, by including packed instruction set 3109 in an instruction set of a general-purpose processor 3102, along with associated circuitry to execute instructions, operations used by many multimedia applications may be performed using packed data in a general-purpose processor 3102. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 3108 may also be used in microcontrollers, embedded processors, graphics devices, DSPs, and other types of logic circuits. In at least one embodiment, computer system 3100 may include, without limitation, a memory 3120. In at least one embodiment, memory 3120 may be implemented as a DRAM device, an SRAM device, flash memory device, or other memory device. Memory 3120 may store instruction(s) 3119 and/or data 3121 represented by data signals that may be executed by processor 3102.

In at least one embodiment, a system logic chip may be coupled to processor bus 3110 and memory 3120. In at least one embodiment, a system logic chip may include, without limitation, a memory controller hub ("MCH") 3116, and processor 3102 may communicate with MCH 3116 via processor bus 3110. In at least one embodiment, MCH 3116 may provide a high bandwidth memory path 3118 to memory 3120 for instruction and data storage and for storage of graphics commands, data and textures. In at least one embodiment, MCH 3116 may direct data signals between processor 3102, memory 3120, and other components in computer system 3100 and to bridge data signals between processor bus 3110, memory 3120, and a system I/O 3122. In at least one embodiment, system logic chip may provide a graphics port for coupling to a graphics controller. In at least one embodiment, MCH 3116 may be coupled to memory 3120 through high bandwidth memory path 3118 and graphics/video card 3112 may be coupled to MCH 3116 through an Accelerated Graphics Port ("AGP") interconnect 3114.

In at least one embodiment, computer system 3100 may use system I/O 3122 that is a proprietary hub interface bus to couple MCH 3116 to I/O controller hub ("ICH") 3130. In at least one embodiment, ICH 3130 may provide direct connections to some I/O devices via a local I/O bus. In at least one embodiment, local I/O bus may include, without limitation, a high-speed I/O bus for connecting peripherals to memory 3120, a chipset, and processor 3102. Examples may include, without limitation, an audio controller 3129, a firmware hub ("flash BIOS") 3128, a wireless transceiver 3126, a data storage 3124, a legacy I/O controller 3123 containing a user input interface 3125 and a keyboard interface, a serial expansion port 3127, such as a USB, and a network controller 3134. Data storage 3124 may comprise a hard disk drive, a floppy disk drive, a CD-ROM device, a flash memory device, or other mass storage device.

In at least one embodiment, FIG. 31 illustrates a system, which includes interconnected hardware devices or "chips." In at least one embodiment, FIG. 31 may illustrate an exemplary SoC. In at least one embodiment, devices illustrated in FIG. 31 may be interconnected with proprietary interconnects, standardized interconnects (e.g., PCIe), or some combination thereof. In at least one embodiment, one or more components of system 3100 are interconnected using compute express link ("CXL") interconnects.

Figure 32:
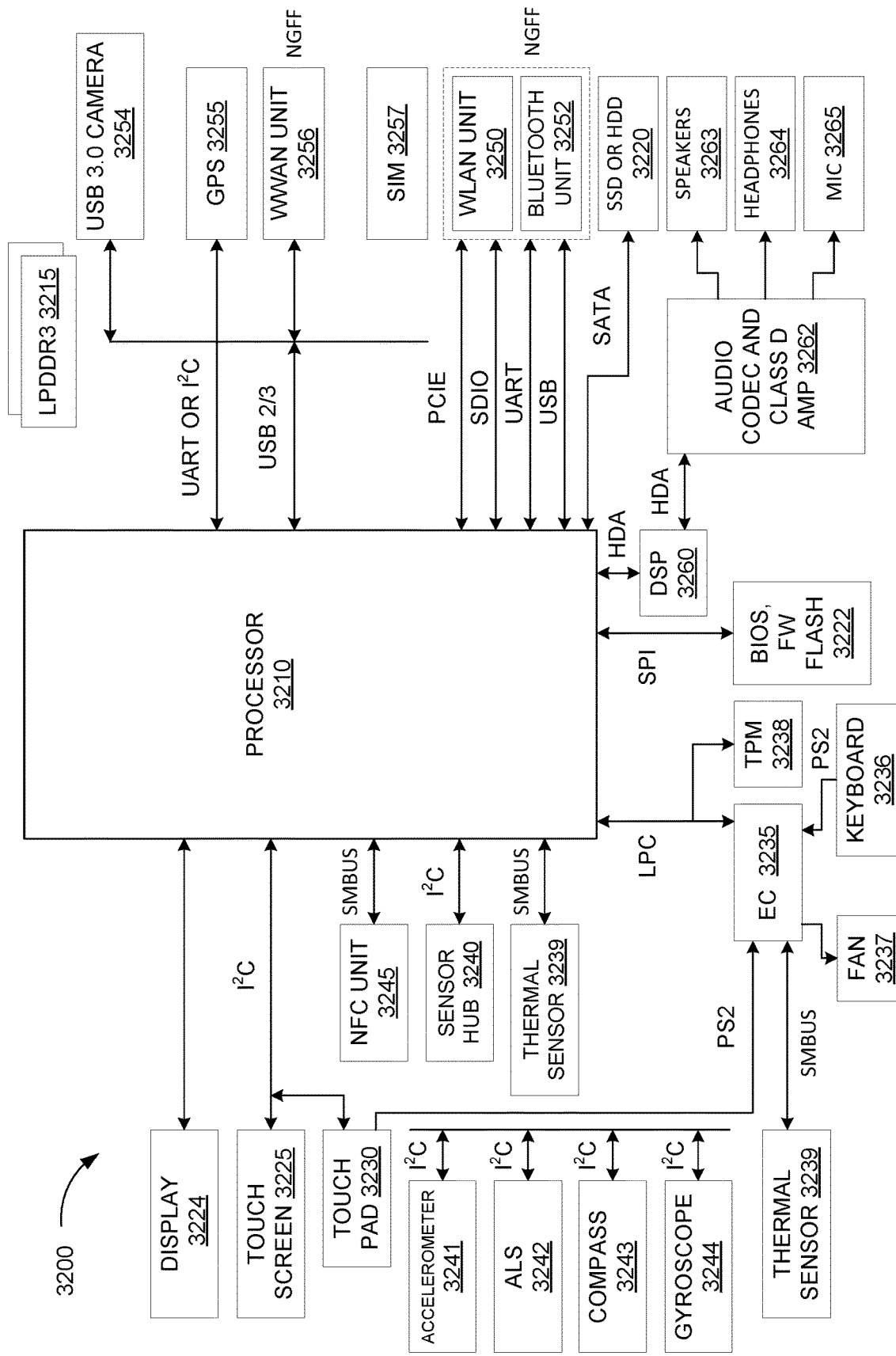
FIG. 32 illustrates a system, in accordance with at least one embodiment.

FIG. 32 illustrates a system 3200, in accordance with at least one embodiment. In at least one embodiment, system 3200 is an electronic device that utilizes a processor 3210. In at least one embodiment, system 3200 may be, for example and without limitation, a notebook, a tower server, a rack server, a blade server, a laptop, a desktop, a tablet, a mobile device, a phone, an embedded computer, or any other suitable electronic device.

In at least one embodiment, system 3200 may include, without limitation, processor 3210 communicatively coupled to any suitable number or kind of components, peripherals, modules, or devices. In at least one embodiment, processor 3210 is coupled using a bus or interface, such as an I$^2$C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 32 illustrates a system which includes interconnected hardware devices or "chips." In at least one embodiment, FIG. 32 may illustrate an exemplary SoC. In at least one embodiment, devices illustrated in FIG. 32 may be interconnected with proprietary interconnects, standardized interconnects (e.g., PCIe) or some combination thereof. In at least one embodiment, one or more components of FIG. 32 are interconnected using CXL interconnects.

In at least one embodiment, FIG. 32 may include a display 3224, a touch screen 3225, a touch pad 3230, a Near Field Communications unit ("NFC") 3245, a sensor hub 3240, a thermal sensor 3246, an Express Chipset ("EC") 3235, a Trusted Platform Module ("TPM") 3238, BIOS/firmware/flash memory ("BIOS, FW Flash") 3222, a DSP 3260, a Solid State Disk ("SSD") or Hard Disk Drive ("HDD") 3220, a wireless local area network unit ("WLAN") 3250, a Bluetooth unit 3252, a Wireless Wide Area Network unit ("WWAN") 3256, a Global Positioning System ("GPS") 3255, a camera ("USB 3.0 camera") 3254 such as a USB 3.0 camera, or a Low Power Double Data Rate ("LPDDR") memory unit ("LPDDR3") 3215 implemented in, for example, LPDDR3 standard. These components may each be implemented in any suitable manner.

In at least one embodiment, other components may be communicatively coupled to processor 3210 through components discussed above. In at least one embodiment, an accelerometer 3241, an Ambient Light Sensor ("ALS") 3242, a compass 3243, and a gyroscope 3244 may be communicatively coupled to sensor hub 3240. In at least one embodiment, a thermal sensor 3239, a fan 3237, a keyboard 3246, and a touch pad 3230 may be communicatively coupled to EC 3235. In at least one embodiment, a speaker 3263, a headphones 3264, and a microphone ("mic") 3265 may be communicatively coupled to an audio unit ("audio codec and class d amp") 3264, which may in turn be communicatively coupled to DSP 3260. In at least one embodiment, audio unit 3264 may include, for example and without limitation, an audio coder/decoder ("codec") and a class D amplifier. In at least one embodiment, a SIM card ("SIM") 3257 may be communicatively coupled to WWAN unit 3256. In at least one embodiment, components such as WLAN unit 3250 and Bluetooth unit 3252, as well as WWAN unit 3256 may be implemented in a Next Generation Form Factor ("NGFF").

Figure 33:
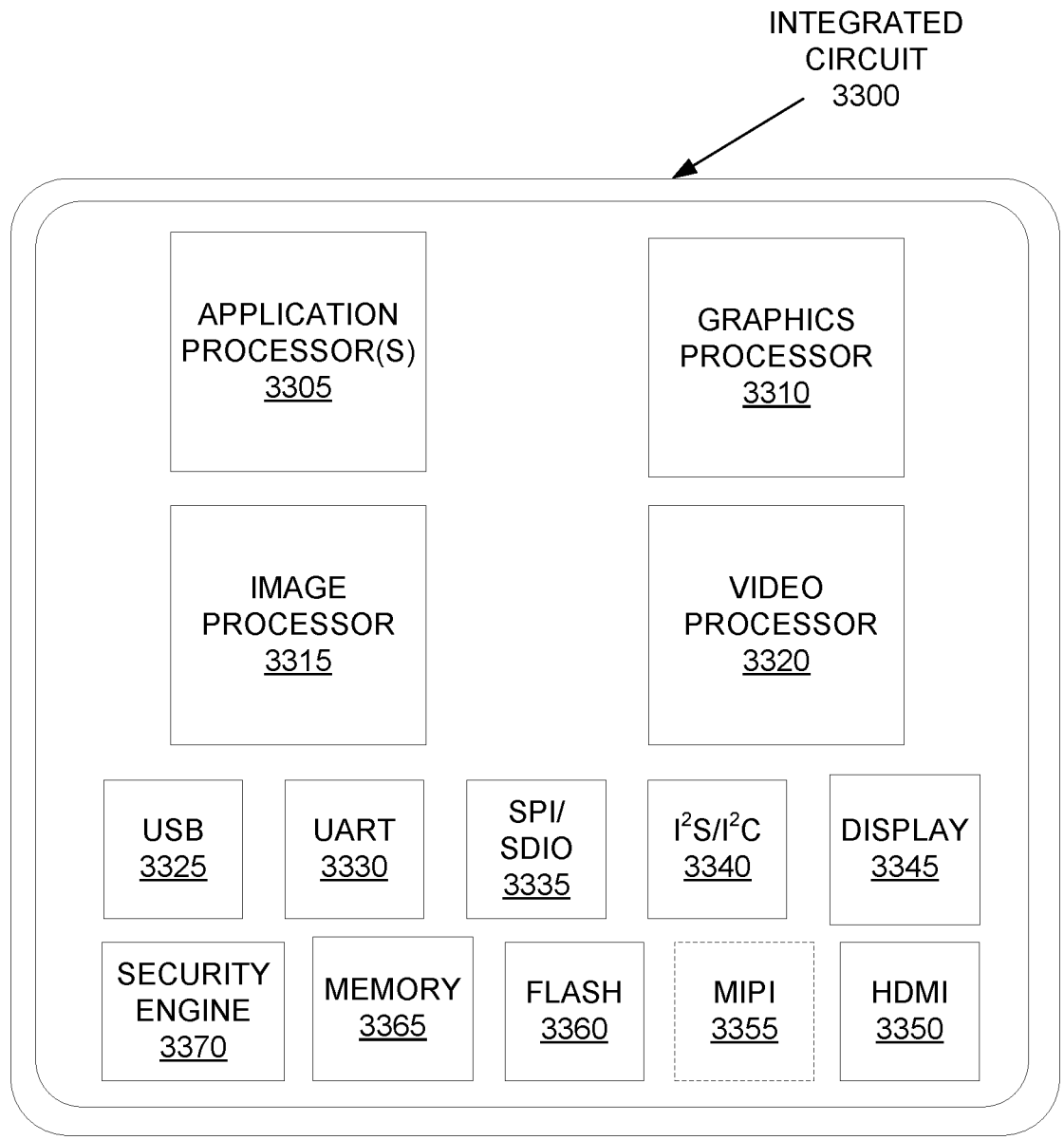
FIG. 33 illustrates an exemplary integrated circuit, in accordance with at least one embodiment.

FIG. 33 illustrates an exemplary integrated circuit 3300, in accordance with at least one embodiment. In at least one embodiment, exemplary integrated circuit 3300 is an SoC that may be fabricated using one or more IP cores. In at least one embodiment, integrated circuit 3300 includes one or more application processor(s) 3305 (e.g., CPUs), at least one graphics processor 3310, and may additionally include an image processor 3315 and/or a video processor 3320, any of which may be a modular IP core. In at least one embodiment, integrated circuit 3300 includes peripheral or bus logic including a USB controller 3325, a UART controller 3330, an SPI/SDIO controller 3335, and an I$^2$S/I$^2$C controller 3340. In at least one embodiment, integrated circuit 3300 can include a display device 3345 coupled to one or more of a high-definition multimedia interface ("HDMI") controller 3350 and a mobile industry processor interface ("MIPI") display interface 3355. In at least one embodiment, storage may be provided by a flash memory subsystem 3360 including flash memory and a flash memory controller. In at least one embodiment, a memory interface may be provided via a memory controller 3365 for access to SDRAM or SRAM memory devices. In at least one embodiment, some integrated circuits additionally include an embedded security engine 3370.

Figure 34:
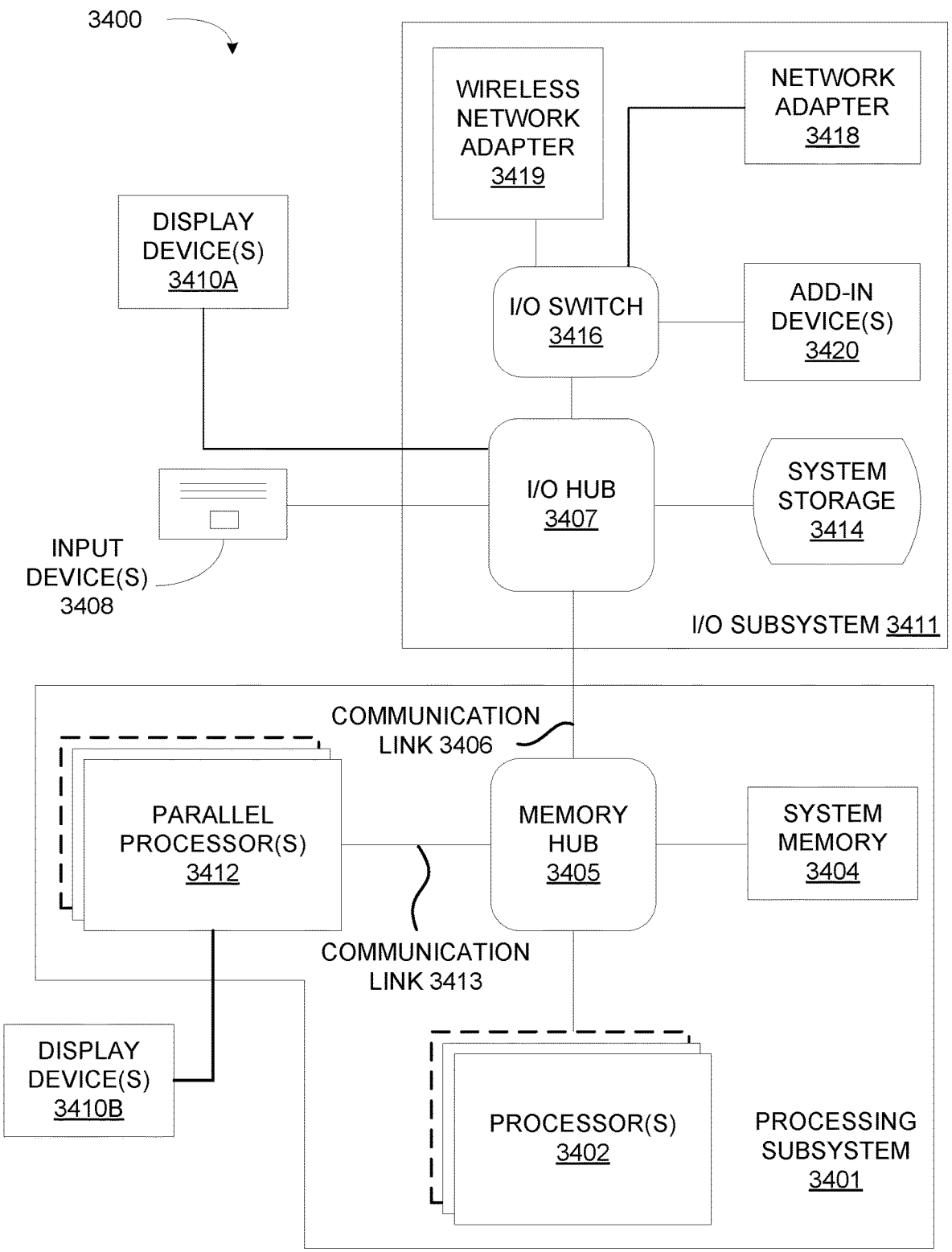
FIG. 34 illustrates a computing system, according to at least one embodiment.

FIG. 34 illustrates a computing system 3400, according to at least one embodiment; In at least one embodiment, computing system 3400 includes a processing subsystem 3401 having one or more processor(s) 3402 and a system memory 3404 communicating via an interconnection path that may include a memory hub 3405. In at least one embodiment, memory hub 3405 may be a separate component within a chipset component or may be integrated within one or more processor(s) 3402. In at least one embodiment, memory hub 3405 couples with an I/O subsystem 3411 via a communication link 3406. In at least one embodiment, I/O subsystem 3411 includes an I/O hub 3407 that can enable computing system 3400 to receive input from one or more input device(s) 3408. In at least one embodiment, I/O hub 3407 can enable a display controller, which may be included in one or more processor(s) 3402, to provide outputs to one or more display device(s) 3410A. In at least one embodiment, one or more display device(s) 3410A coupled with I/O hub 3407 can include a local, internal, or embedded display device.

In at least one embodiment, processing subsystem 3401 includes one or more parallel processor(s) 3412 coupled to memory hub 3405 via a bus or other communication link 3413. In at least one embodiment, communication link 3413 may be one of any number of standards based communication link technologies or protocols, such as, but not limited to PCIe, or may be a vendor specific communications interface or communications fabric. In at least one embodiment, one or more parallel processor(s) 3412 form a computationally focused parallel or vector processing system that can include a large number of processing cores and/or processing clusters, such as a many integrated core processor. In at least one embodiment, one or more parallel processor(s) 3412 form a graphics processing subsystem that can output pixels to one of one or more display device(s) 3410A coupled via I/O Hub 3407. In at least one embodiment, one or more parallel processor(s) 3412 can also include a display controller and display interface (not shown) to enable a direct connection to one or more display device(s) 3410B.

In at least one embodiment, a system storage unit 3414 can connect to I/O hub 3407 to provide a storage mechanism for computing system 3400. In at least one embodiment, an I/O switch 3416 can be used to provide an interface mechanism to enable connections between I/O hub 3407 and other components, such as a network adapter 3418 and/or wireless network adapter 3419 that may be integrated into a platform, and various other devices that can be added via one or more add-in device(s) 3420. In at least one embodiment, network adapter 3418 can be an Ethernet adapter or another wired network adapter. In at least one embodiment, wireless network adapter 3419 can include one or more of a Wi-Fi, Bluetooth, NFC, or other network device that includes one or more wireless radios.

In at least one embodiment, computing system 3400 can include other components not explicitly shown, including USB or other port connections, optical storage drives, video capture devices, and/or variations thereof, that may also be connected to I/O hub 3407. In at least one embodiment, communication paths interconnecting various components in FIG. 34 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 3412 incorporate circuitry optimized for graphics and video processing, including, for example, video output circuitry, and constitutes a graphics processing unit ("GPU"). In at least one embodiment, one or more parallel processor(s) 3412 incorporate circuitry optimized for general purpose processing. In at least embodiment, components of computing system 3400 may be integrated with one or more other system elements on a single integrated circuit. For example, in at least one embodiment, one or more parallel processor(s) 3412, memory hub 3405, processor(s) 3402, and I/O hub 3407 can be integrated into a SoC integrated circuit. In at least one embodiment, components of computing system 3400 can be integrated into a single package to form a system in package ("SIP") configuration. In at least one embodiment, at least a portion of components of computing system 3400 can be integrated into a multi-chip module ("MCM"), which can be interconnected with other multi-chip modules into a modular computing system. In at least one embodiment, I/O subsystem 3411 and display devices 3410B are omitted from computing system 3400.

Processing Systems

The following figures set forth, without limitation, exemplary processing systems that can be used to implement at least one embodiment.

Figure 35:
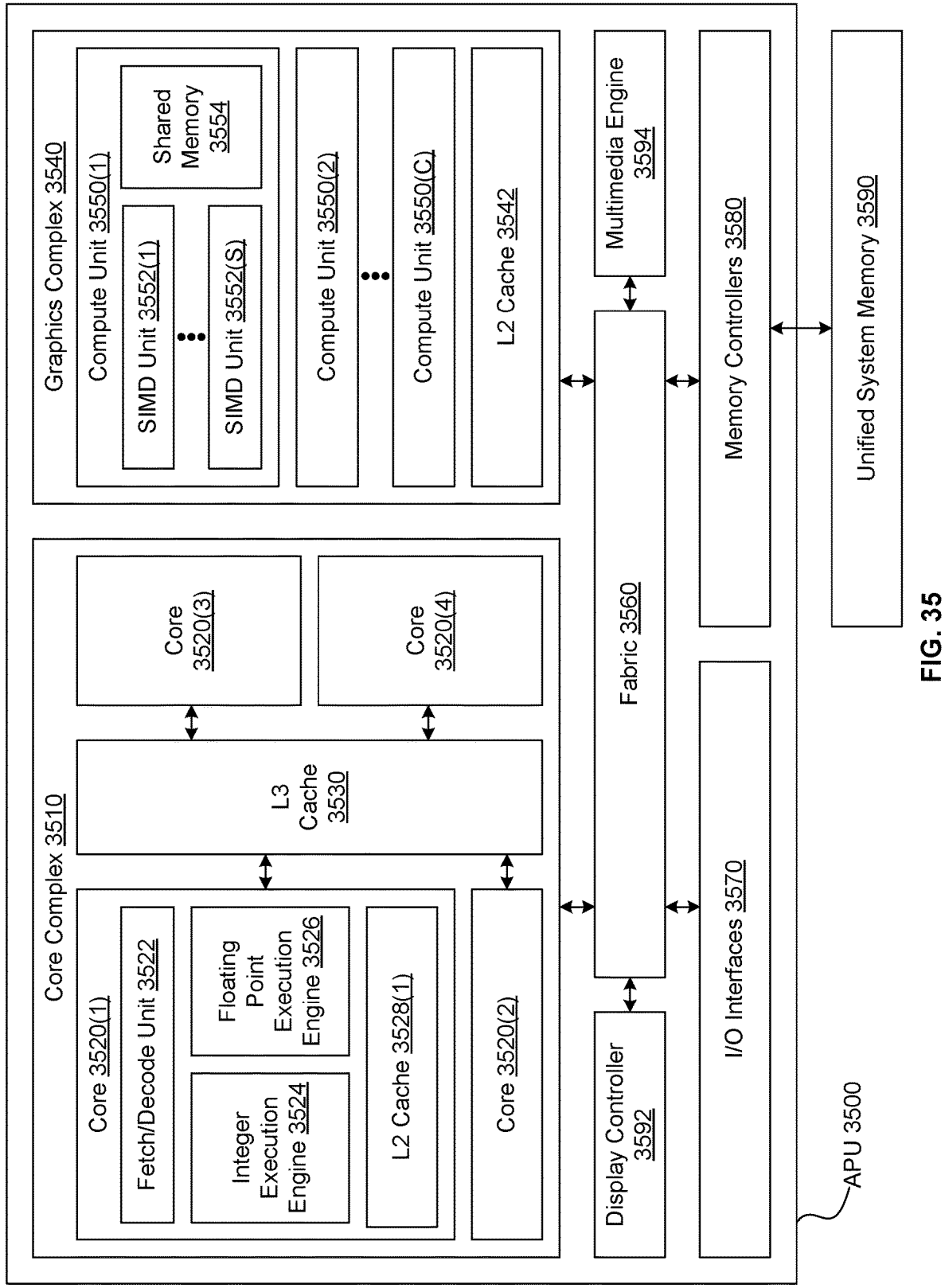
FIG. 35 illustrates an APU, in accordance with at least one embodiment.

FIG. 35 illustrates an accelerated processing unit ("APU") 3500, in accordance with at least one embodiment. In at least one embodiment, APU 3500 is developed by AMD Corporation of Santa Clara, CA In at least one embodiment, APU 3500 can be configured to execute an application program, such as a CUDA program. In at least one embodiment, APU 3500 includes, without limitation, a core complex 3510, a graphics complex 3540, fabric 3560, I/O interfaces 3570, memory controllers 3580, a display controller 3592, and a multimedia engine 3594. In at least one embodiment, APU 3500 may include, without limitation, any number of core complexes 3510, any number of graphics complexes 3550, any number of display controllers 3592, and any number of multimedia engines 3594 in any combination. For explanatory purposes, multiple instances of like objects are denoted herein with reference numbers identifying an object and parenthetical numbers identifying an instance where needed.

In at least one embodiment, core complex 3510 is a CPU, graphics complex 3540 is a GPU, and APU 3500 is a processing unit that integrates, without limitation, 3510 and 3540 onto a single chip. In at least one embodiment, some tasks may be assigned to core complex 3510 and other tasks may be assigned to graphics complex 3540. In at least one embodiment, core complex 3510 is configured to execute main control software associated with APU 3500, such as an operating system. In at least one embodiment, core complex 3510 is a master processor of APU 3500, controlling and coordinating operations of other processors. In at least one embodiment, core complex 3510 issues commands that control an operation of graphics complex 3540. In at least one embodiment, core complex 3510 can be configured to execute host executable code derived from CUDA source code, and graphics complex 3540 can be configured to execute device executable code derived from CUDA source code.

In at least one embodiment, core complex 3510 includes, without limitation, cores 3520(1)-3520(4) and an L3 cache 3530. In at least one embodiment, core complex 3510 may include, without limitation, any number of cores 3520 and any number and type of caches in any combination. In at least one embodiment, cores 3520 are configured to execute instructions of a particular instruction set architecture ("ISA"). In at least one embodiment, each core 3520 is a CPU core.

In at least one embodiment, each core 3520 includes, without limitation, a fetch/decode unit 3522, an integer execution engine 3524, a floating point execution engine 3526, and an L2 cache 3528. In at least one embodiment, fetch/decode unit 3522 fetches instructions, decodes such instructions, generates micro-operations, and dispatches separate micro-instructions to integer execution engine 3524 and floating point execution engine 3526. In at least one embodiment, fetch/decode unit 3522 can concurrently dispatch one micro-instruction to integer execution engine 3524 and another micro-instruction to floating point execution engine 3526. In at least one embodiment, integer execution engine 3524 executes, without limitation, integer and memory operations. In at least one embodiment, floating point engine 3526 executes, without limitation, floating point and vector operations. In at least one embodiment, fetch-decode unit 3522 dispatches micro-instructions to a single execution engine that replaces both integer execution engine 3524 and floating point execution engine 3526.

In at least one embodiment, each core 3520(*i*), where i is an integer representing a particular instance of core 3520, may access L2 cache 3528(*i*) included in core 3520(*i*). In at least one embodiment, each core 3520 included in core complex 3510(*j*), where j is an integer representing a particular instance of core complex 3510, is connected to other cores 3520 included in core complex 3510(*j*) via L3 cache 3530(*j*) included in core complex 3510(*j*). In at least one embodiment, cores 3520 included in core complex 3510(*j*), where j is an integer representing a particular instance of core complex 3510, can access all of L3 cache 3530(*j*) included in core complex 3510(*j*). In at least one embodiment, L3 cache 3530 may include, without limitation, any number of slices.

In at least one embodiment, graphics complex 3540 can be configured to perform compute operations in a highly-parallel fashion. In at least one embodiment, graphics complex 3540 is configured to execute graphics pipeline operations such as draw commands, pixel operations, geometric computations, and other operations associated with rendering an image to a display. In at least one embodiment, graphics complex 3540 is configured to execute operations unrelated to graphics. In at least one embodiment, graphics complex 3540 is configured to execute both operations related to graphics and operations unrelated to graphics.

In at least one embodiment, graphics complex 3540 includes, without limitation, any number of compute units 3550 and an L2 cache 3542. In at least one embodiment, compute units 3550 share L2 cache 3542. In at least one embodiment, L2 cache 3542 is partitioned. In at least one embodiment, graphics complex 3540 includes, without limitation, any number of compute units 3550 and any number (including zero) and type of caches. In at least one embodiment, graphics complex 3540 includes, without limitation, any amount of dedicated graphics hardware.

In at least one embodiment, each compute unit 3550 includes, without limitation, any number of SIMD units 3552 and a shared memory 3554. In at least one embodiment, each SIMD unit 3552 implements a SIMD architecture and is configured to perform operations in parallel. In at least one embodiment, each compute unit 3550 may execute any number of thread blocks, but each thread block executes on a single compute unit 3550. In at least one embodiment, a thread block includes, without limitation, any number of threads of execution. In at least one embodiment, a workgroup is a thread block. In at least one embodiment, each SIMD unit 3552 executes a different warp. In at least one embodiment, a warp is a group of threads (e.g., 16 threads), where each thread in a warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3554.

In at least one embodiment, fabric 3560 is a system interconnect that facilitates data and control transmissions across core complex 3510, graphics complex 3540, I/O interfaces 3570, memory controllers 3580, display controller 3592, and multimedia engine 3594. In at least one embodiment, APU 3500 may include, without limitation, any amount and type of system interconnect in addition to or instead of fabric 3560 that facilitates data and control transmissions across any number and type of directly or indirectly linked components that may be internal or external to APU 3500. In at least one embodiment, I/O interfaces 3570 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 3570 In at least one embodiment, peripheral devices that are coupled to I/O interfaces 3570 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 3594 includes, without limitation, any amount and type of circuitry that is related to multimedia, such as a video decoder, a video encoder, an image signal processor, etc. In at least one embodiment, memory controllers 3580 facilitate data transfers between APU 3500 and a unified system memory 3590. In at least one embodiment, core complex 3510 and graphics complex 3540 share unified system memory 3590.

In at least one embodiment, APU 3500 implements a memory subsystem that includes, without limitation, any amount and type of memory controllers 3580 and memory devices (e.g., shared memory 3554) that may be dedicated to one component or shared among multiple components. In at least one embodiment, APU 3500 implements a cache subsystem that includes, without limitation, one or more cache memories (e.g., L2 caches 3628, L3 cache 3530, and L2 cache 3542) that may each be private to or shared between any number of components (e.g., cores 3520, core complex 3510, SIMD units 3552, compute units 3550, and graphics complex 3540).

Figure 36:
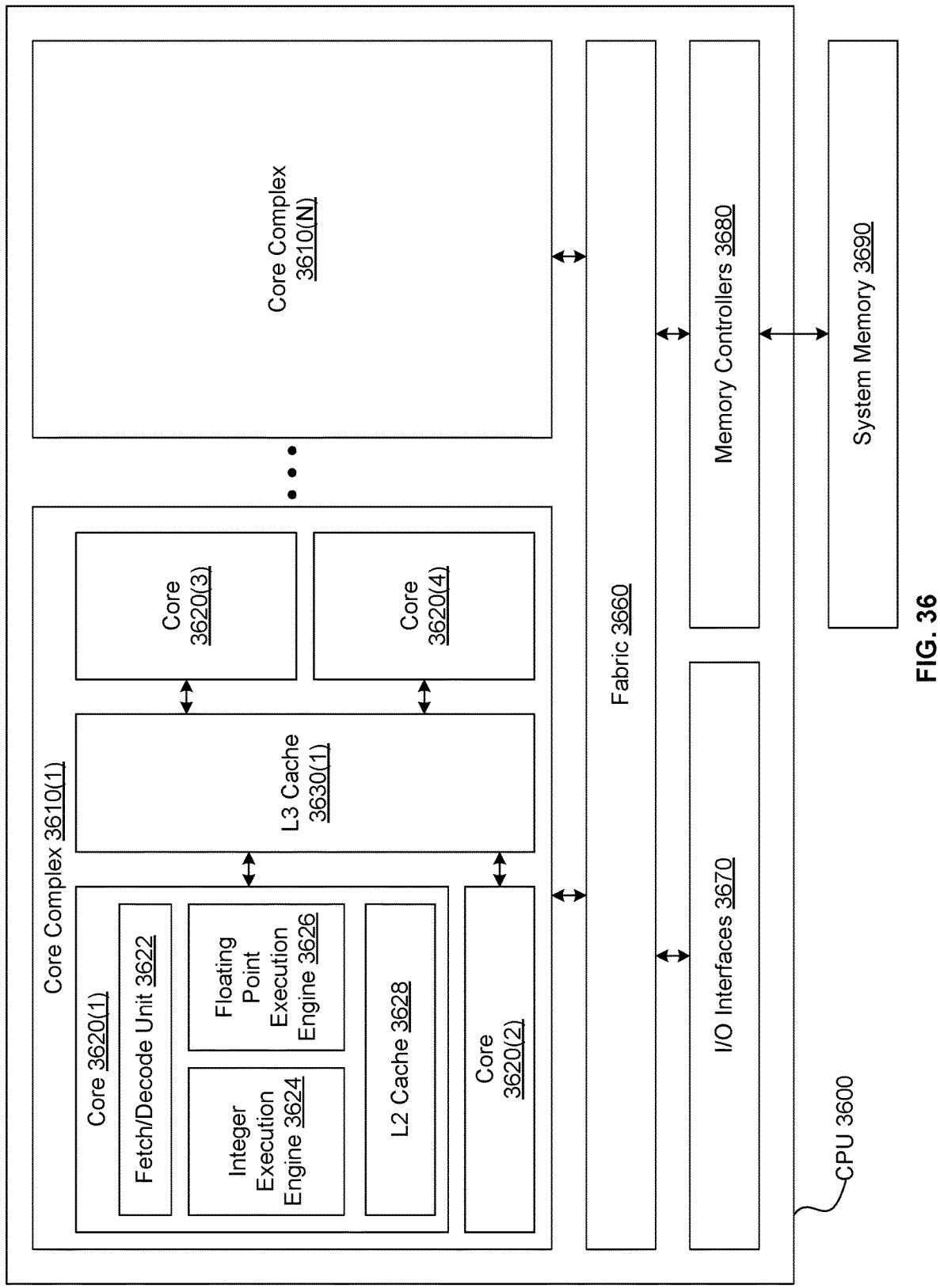
FIG. 36 illustrates a CPU, in accordance with at least one embodiment.

FIG. 36 illustrates a CPU 3600, in accordance with at least one embodiment. In at least one embodiment, CPU 3600 is developed by AMD Corporation of Santa Clara, CA In at least one embodiment, CPU 3600 can be configured to execute an application program. In at least one embodiment, CPU 3600 is configured to execute main control software, such as an operating system. In at least one embodiment, CPU 3600 issues commands that control an operation of an external GPU (not shown). In at least one embodiment, CPU 3600 can be configured to execute host executable code derived from CUDA source code, and an external GPU can be configured to execute device executable code derived from such CUDA source code. In at least one embodiment, CPU 3600 includes, without limitation, any number of core complexes 3610, fabric 3660, I/O interfaces 3670, and memory controllers 3680.

In at least one embodiment, core complex 3610 includes, without limitation, cores 3620(1)-3620(4) and an L3 cache 3630. In at least one embodiment, core complex 3610 may include, without limitation, any number of cores 3620 and any number and type of caches in any combination. In at least one embodiment, cores 3620 are configured to execute instructions of a particular ISA. In at least one embodiment, each core 3620 is a CPU core.

In at least one embodiment, each core 3620 includes, without limitation, a fetch/decode unit 3622, an integer execution engine 3624, a floating point execution engine 3626, and an L2 cache 3628. In at least one embodiment, fetch/decode unit 3622 fetches instructions, decodes such instructions, generates micro-operations, and dispatches separate micro-instructions to integer execution engine 3624 and floating point execution engine 3626. In at least one embodiment, fetch/decode unit 3622 can concurrently dispatch one micro-instruction to integer execution engine 3624 and another micro-instruction to floating point execution engine 3626. In at least one embodiment, integer execution engine 3624 executes, without limitation, integer and memory operations. In at least one embodiment, floating point engine 3626 executes, without limitation, floating point and vector operations. In at least one embodiment, fetch-decode unit 3622 dispatches micro-instructions to a single execution engine that replaces both integer execution engine 3624 and floating point execution engine 3626.

In at least one embodiment, each core 3620(*i*), where i is an integer representing a particular instance of core 3620, may access L2 cache 3628(*i*) included in core 3620(*i*). In at least one embodiment, each core 3620 included in core complex 3610(*j*), where j is an integer representing a particular instance of core complex 3610, is connected to other cores 3620 in core complex 3610(*j*) via L3 cache 3630(*j*) included in core complex 3610(*j*). In at least one embodiment, cores 3620 included in core complex 3610(*j*), where j is an integer representing a particular instance of core complex 3610, can access all of L3 cache 3630(*j*) included in core complex 3610(*j*). In at least one embodiment, L3 cache 3630 may include, without limitation, any number of slices.

In at least one embodiment, fabric 3660 is a system interconnect that facilitates data and control transmissions across core complexes 3610(1)-3610(N) (where N is an integer greater than zero), I/O interfaces 3670, and memory controllers 3680. In at least one embodiment, CPU 3600 may include, without limitation, any amount and type of system interconnect in addition to or instead of fabric 3660 that facilitates data and control transmissions across any number and type of directly or indirectly linked components that may be internal or external to CPU 3600. In at least one embodiment, I/O interfaces 3670 are representative of any number and type of I/O interfaces (e.g., PCI, PCI-X, PCIe, GBE, USB, etc.). In at least one embodiment, various types of peripheral devices are coupled to I/O interfaces 3670 In at least one embodiment, peripheral devices that are coupled to I/O interfaces 3670 may include, without limitation, displays, keyboards, mice, printers, scanners, joysticks or other types of game controllers, media recording devices, external storage devices, network interface cards, and so forth.

In at least one embodiment, memory controllers 3680 facilitate data transfers between CPU 3600 and a system memory 3690. In at least one embodiment, core complex 3610 and graphics complex 3640 share system memory 3690. In at least one embodiment, CPU 3600 implements a memory subsystem that includes, without limitation, any amount and type of memory controllers 3680 and memory devices that may be dedicated to one component or shared among multiple components. In at least one embodiment, CPU 3600 implements a cache subsystem that includes, without limitation, one or more cache memories (e.g., L2 caches 3628 and L3 caches 3630) that may each be private to or shared between any number of components (e.g., cores 3620 and core complexes 3610).

Figure 37:
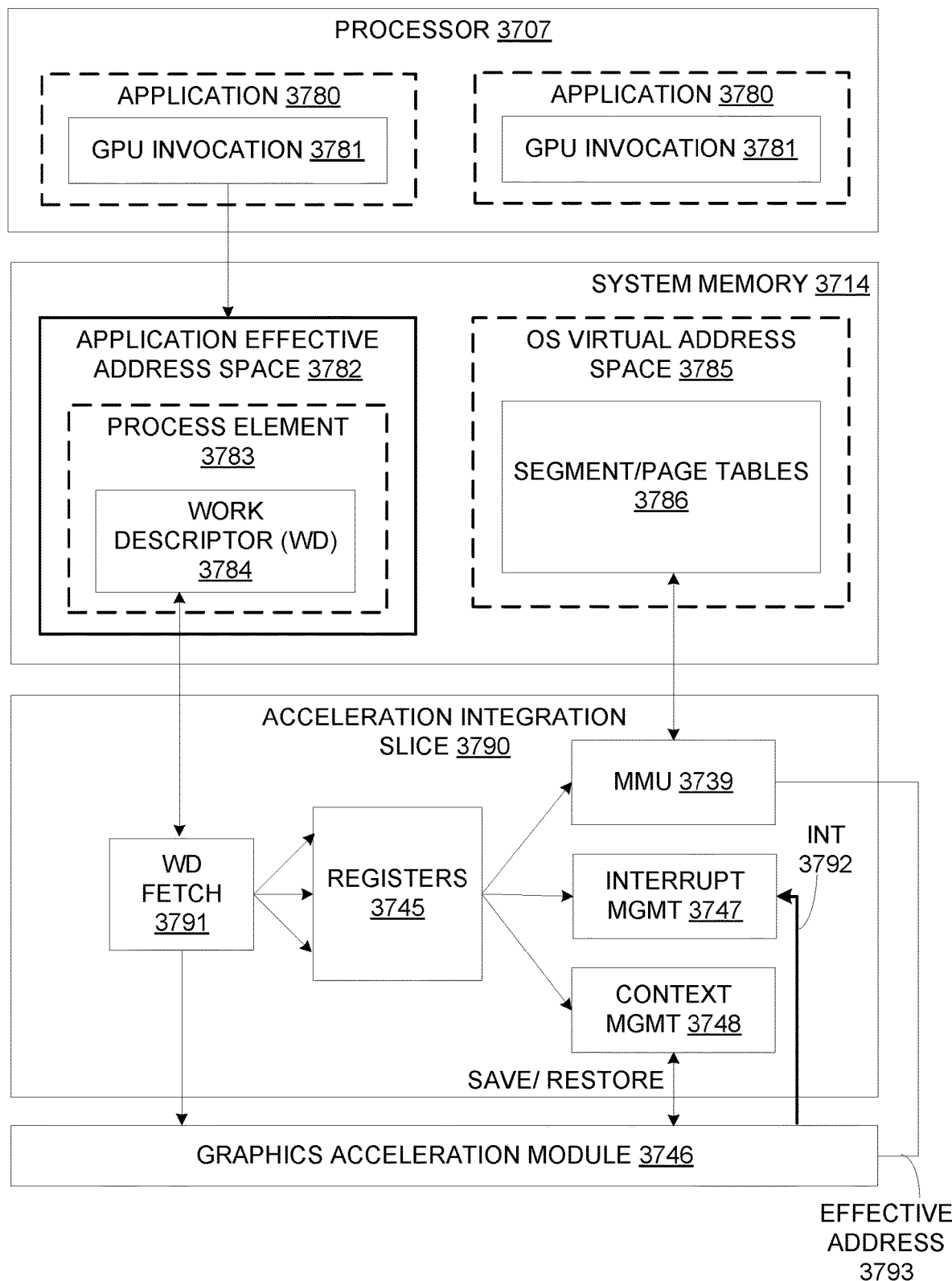
FIG. 37 illustrates an exemplary accelerator integration slice, in accordance with at least one embodiment.

FIG. 37 illustrates an exemplary accelerator integration slice 3790, in accordance with at least one embodiment. As used herein, a "slice" comprises a specified portion of processing resources of an accelerator integration circuit. In at least one embodiment, an accelerator integration circuit provides cache management, memory access, context management, and interrupt management services on behalf of multiple graphics processing engines included in a graphics acceleration module. Graphics processing engines may each comprise a separate GPU. Alternatively, graphics processing engines may comprise different types of graphics processing engines within a GPU such as graphics execution units, media processing engines (e.g., video encoders/decoders), samplers, and blit engines. In at least one embodiment, a graphics acceleration module may be a GPU with multiple graphics processing engines. In at least one embodiment, graphics processing engines may be individual GPUs integrated on a common package, line card, or chip.

An application effective address space 3782 within system memory 3714 stores process elements 3783. In one embodiment, process elements 3783 are stored in response to GPU invocations 3781 from applications 3780 executed on processor 3707. A process element 3783 contains process state for corresponding application 3780. A work descriptor ("WD") 3784 contained in process element 3783 can be a single job requested by an application or may contain a pointer to a queue of jobs. In at least one embodiment, WD 3784 is a pointer to a job request queue in application effective address space 3782.

Graphics acceleration module 3746 and/or individual graphics processing engines can be shared by all or a subset of processes in a system. In at least one embodiment, an infrastructure for setting up process state and sending WD 3784 to graphics acceleration module 3746 to start a job in a virtualized environment may be included.

In at least one embodiment, a dedicated-process programming model is implementation-specific. In this model, a single process owns graphics acceleration module 3746 or an individual graphics processing engine. Because graphics acceleration module 3746 is owned by a single process, a hypervisor initializes an accelerator integration circuit for an owning partition and an operating system initializes accelerator integration circuit for an owning process when graphics acceleration module 3746 is assigned.

In operation, a WD fetch unit 3791 in accelerator integration slice 3790 fetches next WD 3784 which includes an indication of work to be done by one or more graphics processing engines of graphics acceleration module 3746. Data from WD 3784 may be stored in registers 3745 and used by a memory management unit ("MMU") 3739, interrupt management circuit 3747 and/or context management circuit 3748 as illustrated. For example, one embodiment of MMU 3739 includes segment/page walk circuitry for accessing segment/page tables 3786 within OS virtual address space 3785. Interrupt management circuit 3747 may process interrupt events ("INT") 3792 received from graphics acceleration module 3746. When performing graphics operations, an effective address 3793 generated by a graphics processing engine is translated to a real address by MMU 3739.

In one embodiment, a same set of registers 3745 are duplicated for each graphics processing engine and/or graphics acceleration module 3746 and may be initialized by a hypervisor or operating system. Each of these duplicated registers may be included in accelerator integration slice 3790. Exemplary registers that may be initialized by a hypervisor are shown in Table 1.

TABLE 1

Hypervisor Initialized Registers

| | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

| | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 3784 is specific to a particular graphics acceleration module 3746 and/or a particular graphics processing engine. It contains all information required by a graphics processing engine to do work or it can be a pointer to a memory location where an application has set up a command queue of work to be completed.

Figure 38A:
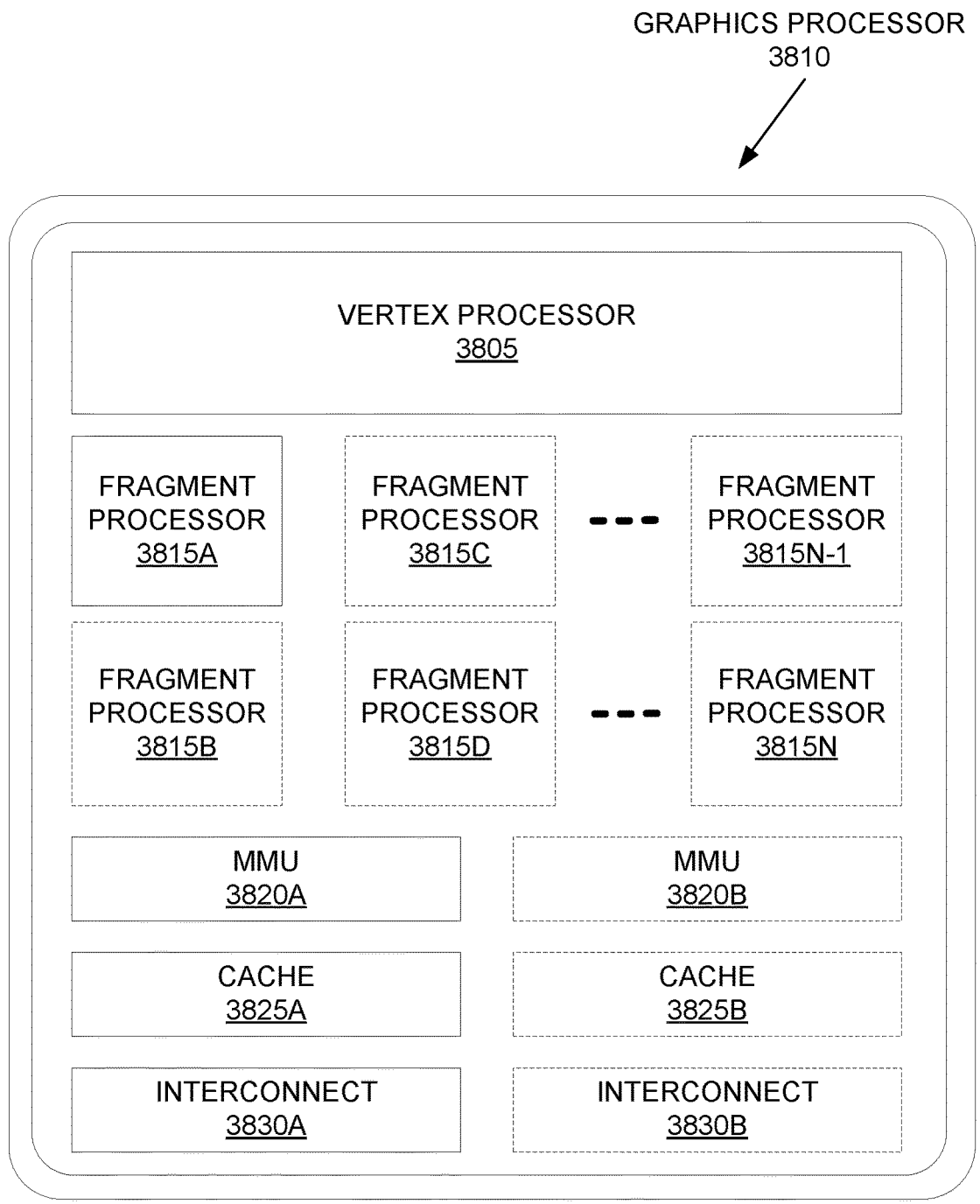
FIGS. 38A and 38B illustrate exemplary graphics processors, in accordance with at least one embodiment.
Figure 38B:
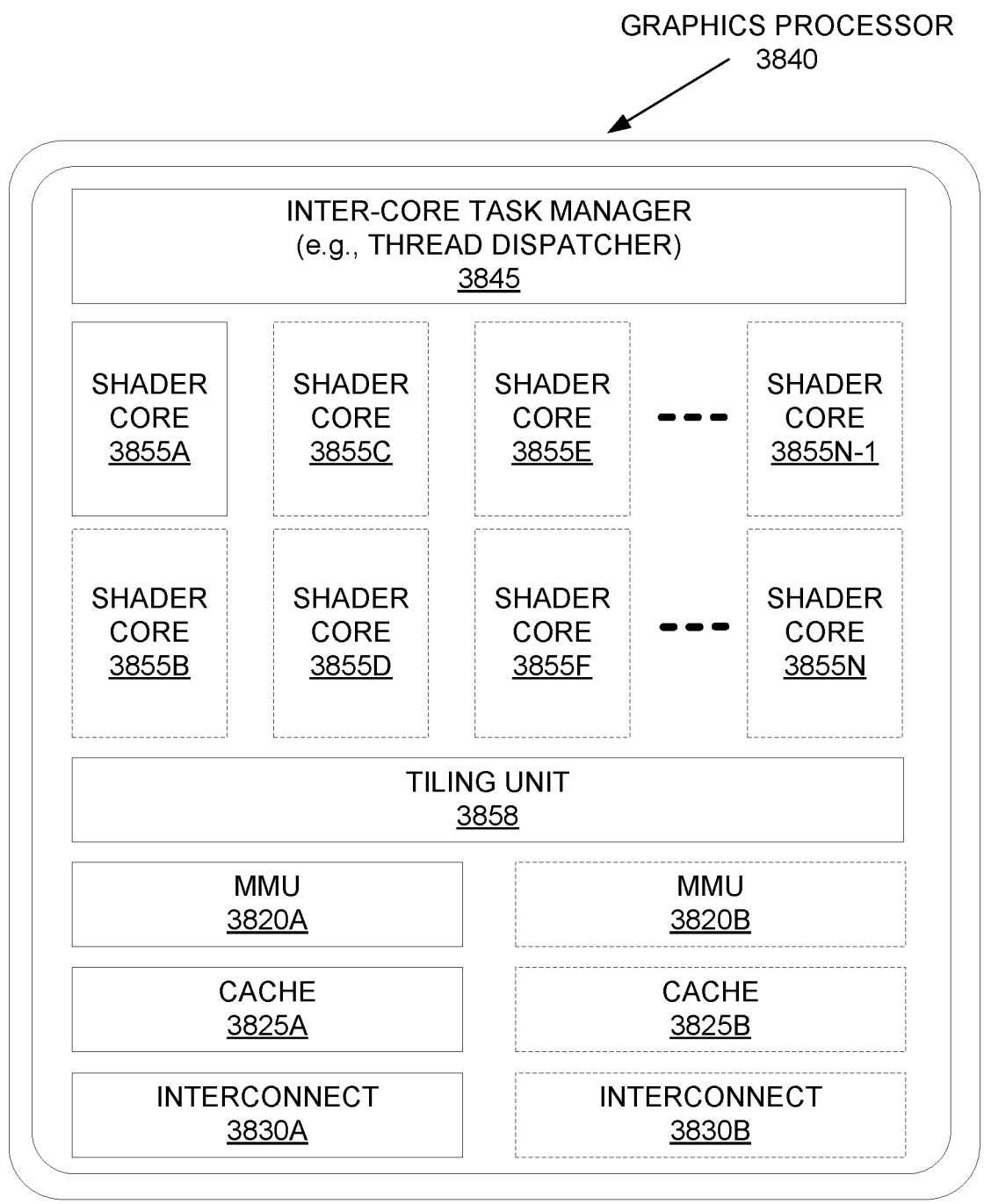

FIGS. 38A and 38B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 38A illustrates an exemplary graphics processor 3810 of an SoC integrated circuit that may be fabricated using one or more IP cores, in accordance with at least one embodiment. FIG. 38B illustrates an additional exemplary graphics processor 3840 of an SoC integrated circuit that may be fabricated using one or more IP cores, in accordance with at least one embodiment. In at least one embodiment, graphics processor 3810 of FIG. 38A is a low power graphics processor core. In at least one embodiment, graphics processor 3840 of FIG. 38B is a higher performance graphics processor core. In at least one embodiment, each of graphics processors 3810, 3840 can be variants of graphics processor 1410 of FIG. 14.

In at least one embodiment, graphics processor 3810 includes a vertex processor 3805 and one or more fragment processor(s) 3815A-3815N (e.g., 3815A, 3815B, 3815C, 3815D, through 3815N-1, and 3815N). In at least one embodiment, graphics processor 3810 can execute different shader programs via separate logic, such that vertex processor 3805 is optimized to execute operations for vertex shader programs, while one or more fragment processor(s) 3815A-3815N execute fragment (e.g., pixel) shading operations for fragment or pixel shader programs. In at least one embodiment, vertex processor 3805 performs a vertex processing stage of a 3D graphics pipeline and generates primitives and vertex data. In at least one embodiment, fragment processor(s) 3815A-3815N use primitive and vertex data generated by vertex processor 3805 to produce a framebuffer that is displayed on a display device. In at least one embodiment, fragment processor(s) 3815A-3815N are optimized to execute fragment shader programs as provided for in an OpenGL API, which may be used to perform similar operations as a pixel shader program as provided for in a Direct 3D API.

In at least one embodiment, graphics processor 3810 additionally includes one or more MMU(s) 3820A-3820B, cache(s) 3825A-3825B, and circuit interconnect(s) 3830A-3830B. In at least one embodiment, one or more MMU(s) 3820A-3820B provide for virtual to physical address mapping for graphics processor 3810, including for vertex processor 3805 and/or fragment processor(s) 3815A-3815N, which may reference vertex or image/texture data stored in memory, in addition to vertex or image/texture data stored in one or more cache(s) 3825A-3825B. In at least one embodiment, one or more MMU(s) 3820A-3820B may be synchronized with other MMUs within a system, including one or more MMUs associated with one or more application processor(s) 1405, image processors 1415, and/or video processors 1420 of FIG. 14, such that each processor 1405-1420 can participate in a shared or unified virtual memory system. In at least one embodiment, one or more circuit interconnect(s) 3830A-3830B enable graphics processor 3810 to interface with other IP cores within an SoC, either via an internal bus of an SoC or via a direct connection.

In at least one embodiment, graphics processor 3840 includes one or more MMU(s) 3820A-3820B, caches 3825A-3825B, and circuit interconnects 3830A-3830B of graphics processor 3810 of FIG. 38A. In at least one embodiment, graphics processor 3840 includes one or more shader core(s) 3855A-3855N (e.g., 3855A, 3855B, 3855C, 3855D, 3855E, 3855F, through 3855N-1, and 3855N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 3840 includes an inter-core task manager 3845, which acts as a thread dispatcher to dispatch execution threads to one or more shader cores 3855A-3855N and a tiling unit 3858 to accelerate tiling operations for tile-based rendering, in which rendering operations for a scene are subdivided in image space, for example to exploit local spatial coherence within a scene or to optimize use of internal caches.

Figure 39A:
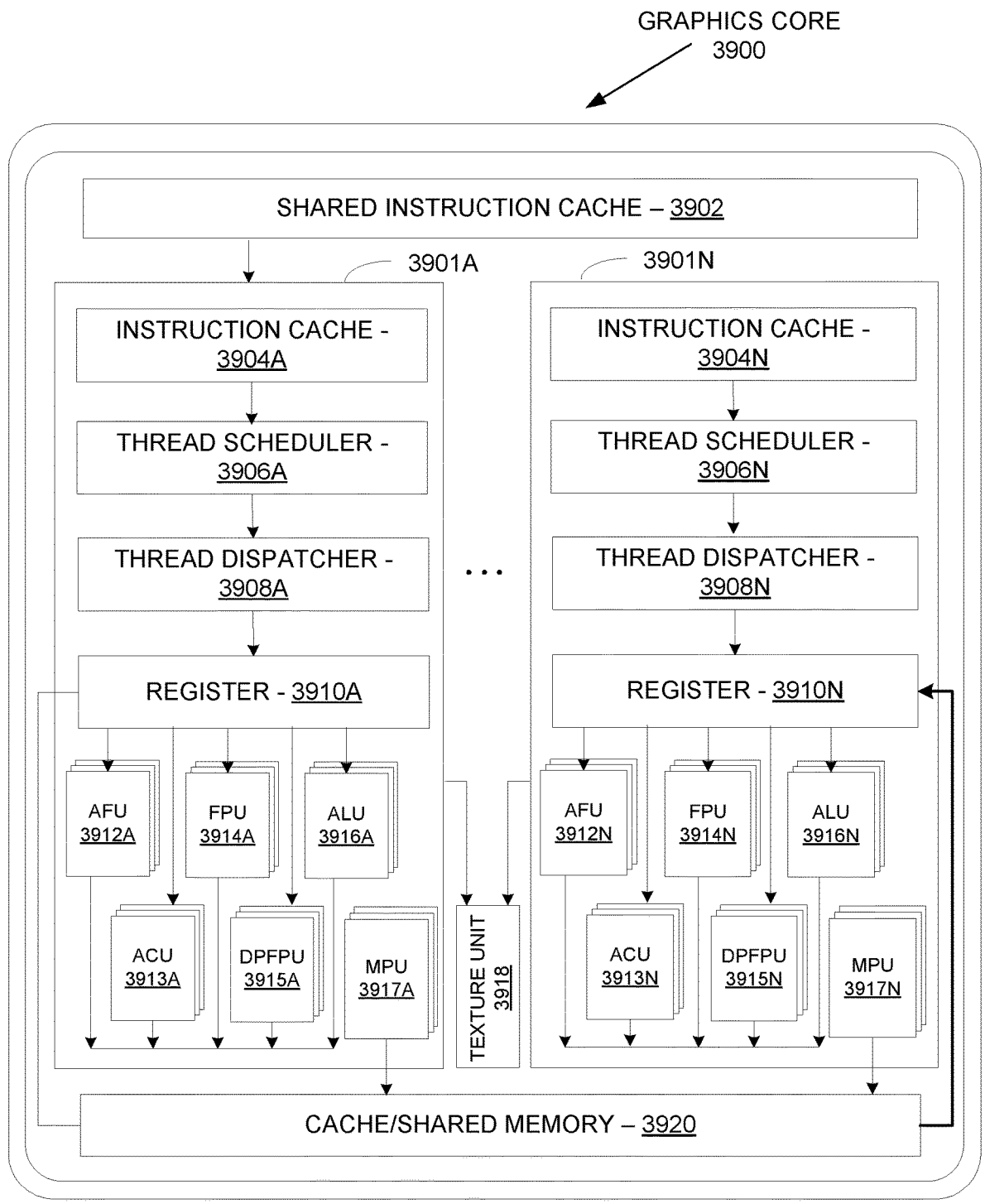
FIG. 39A illustrates a graphics core, in accordance with at least one embodiment.

FIG. 39A illustrates a graphics core 3900, in accordance with at least one embodiment. In at least one embodiment, graphics core 3900 may be included within graphics processor 3310 of FIG. 33. In at least one embodiment, graphics core 3900 may be a unified shader core 3855A-3855N as in FIG. 38B. In at least one embodiment, graphics core 3900 includes a shared instruction cache 3902, a texture unit 3918, and a cache/shared memory 3920 that are common to execution resources within graphics core 3900. In at least one embodiment, graphics core 3900 can include multiple slices 3901A-3901N or partition for each core, and a graphics processor can include multiple instances of graphics core 3900. Slices 3901A-3901N can include support logic including a local instruction cache 3904A-3904N, a thread scheduler 3906A-3906N, a thread dispatcher 3908A-3908N, and a set of registers 3910A-3910N. In at least one embodiment, slices 3901A-3901N can include a set of additional function units ("AFUs") 3912A-3912N, floating-point units ("FPUs") 3914A-3914N, integer arithmetic logic units ("ALUs") 3916-3916N, address computational units ("ACUs") 3913A-3913N, double-precision floating-point units ("DPFPUs") 3915A-3915N, and matrix processing units ("MPUs") 3917A-3917N.

In at least one embodiment, FPUs 3914A-3914N can perform single-precision (32-bit) and half-precision (16-bit) floating point operations, while DPFPUs 3915A-3915N perform double precision (64-bit) floating point operations. In at least one embodiment, ALUs 3916A-3916N can perform variable precision integer operations at 8-bit, 16-bit, and 32-bit precision, and can be configured for mixed precision operations. In at least one embodiment, MPUs 3917A-3917N can also be configured for mixed precision matrix operations, including half-precision floating point and 8-bit integer operations. In at least one embodiment, MPUs 3917-3917N can perform a variety of matrix operations to accelerate CUDA programs, including enabling support for accelerated general matrix to matrix multiplication ("GEMM"). In at least one embodiment, AFUs 3912A-3912N can perform additional logic operations not supported by floating-point or integer units, including trigonometric operations (e.g., Sine, Cosine, etc.).

Figure 39B:
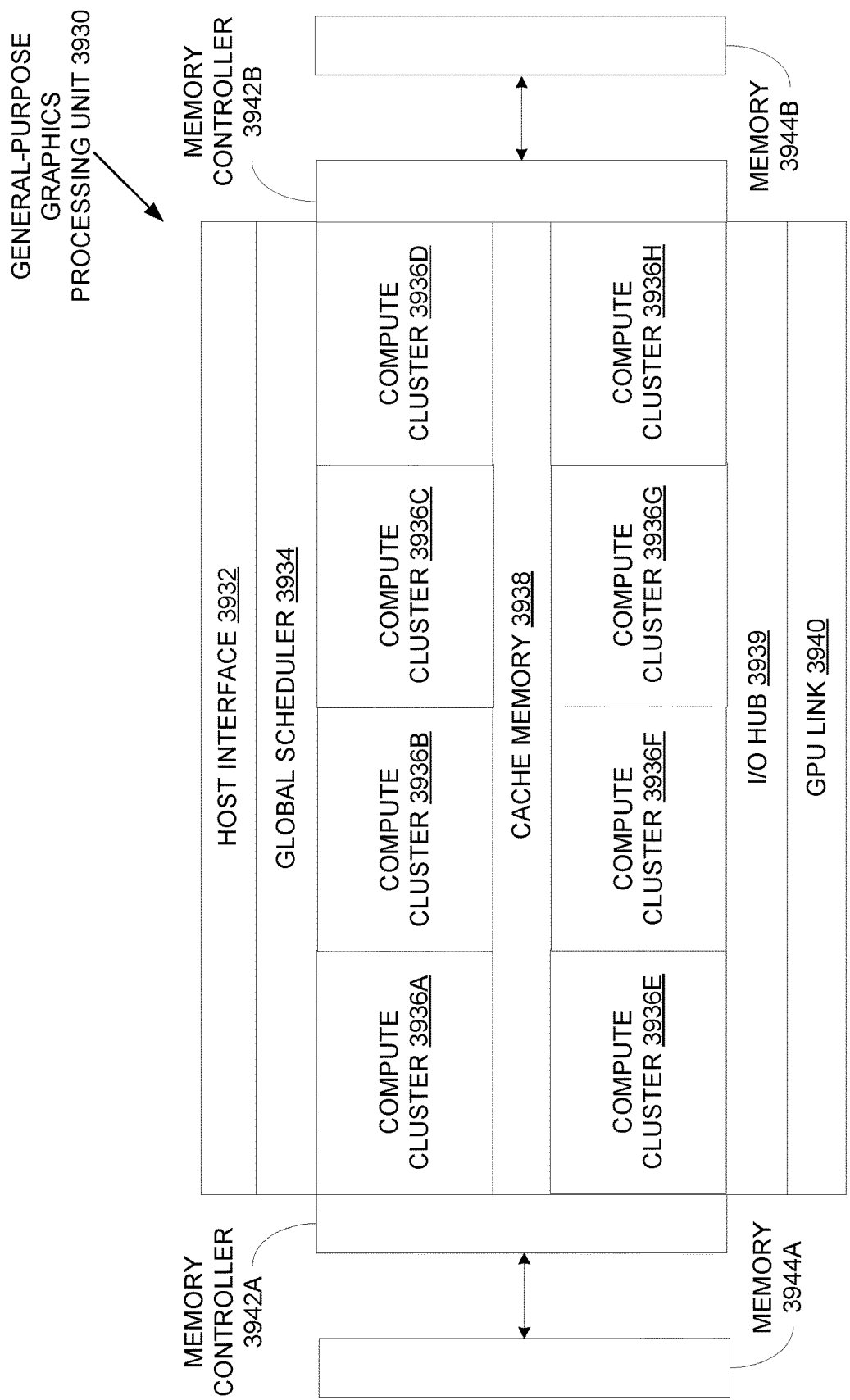
FIG. 39B illustrates a GPGPU, in accordance with at least one embodiment.

FIG. 39B illustrates a general-purpose graphics processing unit ("GPGPU") 3930, in accordance with at least one embodiment. In at least one embodiment, GPGPU 3930 is highly-parallel and suitable for deployment on a multi-chip module. In at least one embodiment, GPGPU 3930 can be configured to enable highly-parallel compute operations to be performed by an array of GPUs. In at least one embodiment, GPGPU 3930 can be linked directly to other instances of GPGPU 3930 to create a multi-GPU cluster to improve execution time for CUDA programs. In at least one embodiment, GPGPU 3930 includes a host interface 3932 to enable a connection with a host processor. In at least one embodiment, host interface 3932 is a PCIe interface. In at least one embodiment, host interface 3932 can be a vendor specific communications interface or communications fabric. In at least one embodiment, GPGPU 3930 receives commands from a host processor and uses a global scheduler 3934 to distribute execution threads associated with those commands to a set of compute clusters 3936A-3936H. In at least one embodiment, compute clusters 3936A-3936H share a cache memory 3938. In at least one embodiment, cache memory 3938 can serve as a higher-level cache for cache memories within compute clusters 3936A-3936H.

In at least one embodiment, GPGPU 3930 includes memory 3944A-3944B coupled with compute clusters 3936A-3936H via a set of memory controllers 3942A-3942B. In at least one embodiment, memory 3944A-3944B can include various types of memory devices including DRAM or graphics random access memory, such as synchronous graphics random access memory ("SGRAM"), including graphics double data rate ("GDDR") memory.

In at least one embodiment, compute clusters 3936A-3936H each include a set of graphics cores, such as graphics core 3900 of FIG. 39A, which can include multiple types of integer and floating point logic units that can perform computational operations at a range of precisions including suited for computations associated with CUDA programs. For example, in at least one embodiment, at least a subset of floating point units in each of compute clusters 3936A-3936H can be configured to perform 16-bit or 32-bit floating point operations, while a different subset of floating point units can be configured to perform 64-bit floating point operations.

In at least one embodiment, multiple instances of GPGPU 3930 can be configured to operate as a compute cluster. In at least one embodiment, compute clusters 3936A-3936H may implement any technically feasible communication techniques for synchronization and data exchange. In at least one embodiment, multiple instances of GPGPU 3930 communicate over host interface 3932. In at least one embodiment, GPGPU 3930 includes an I/O hub 3939 that couples GPGPU 3930 with a GPU link 3940 that enables a direct connection to other instances of GPGPU 3930. In at least one embodiment, GPU link 3940 is coupled to a dedicated GPU-to-GPU bridge that enables communication and synchronization between multiple instances of GPGPU 3930. In at least one embodiment GPU link 3940 couples with a high speed interconnect to transmit and receive data to other GPGPUs 3930 or parallel processors. In at least one embodiment, multiple instances of GPGPU 3930 are located in separate data processing systems and communicate via a network device that is accessible via host interface 3932. In at least one embodiment GPU link 3940 can be configured to enable a connection to a host processor in addition to or as an alternative to host interface 3932. In at least one embodiment, GPGPU 3930 can be configured to execute a CUDA program.

Figure 40A:
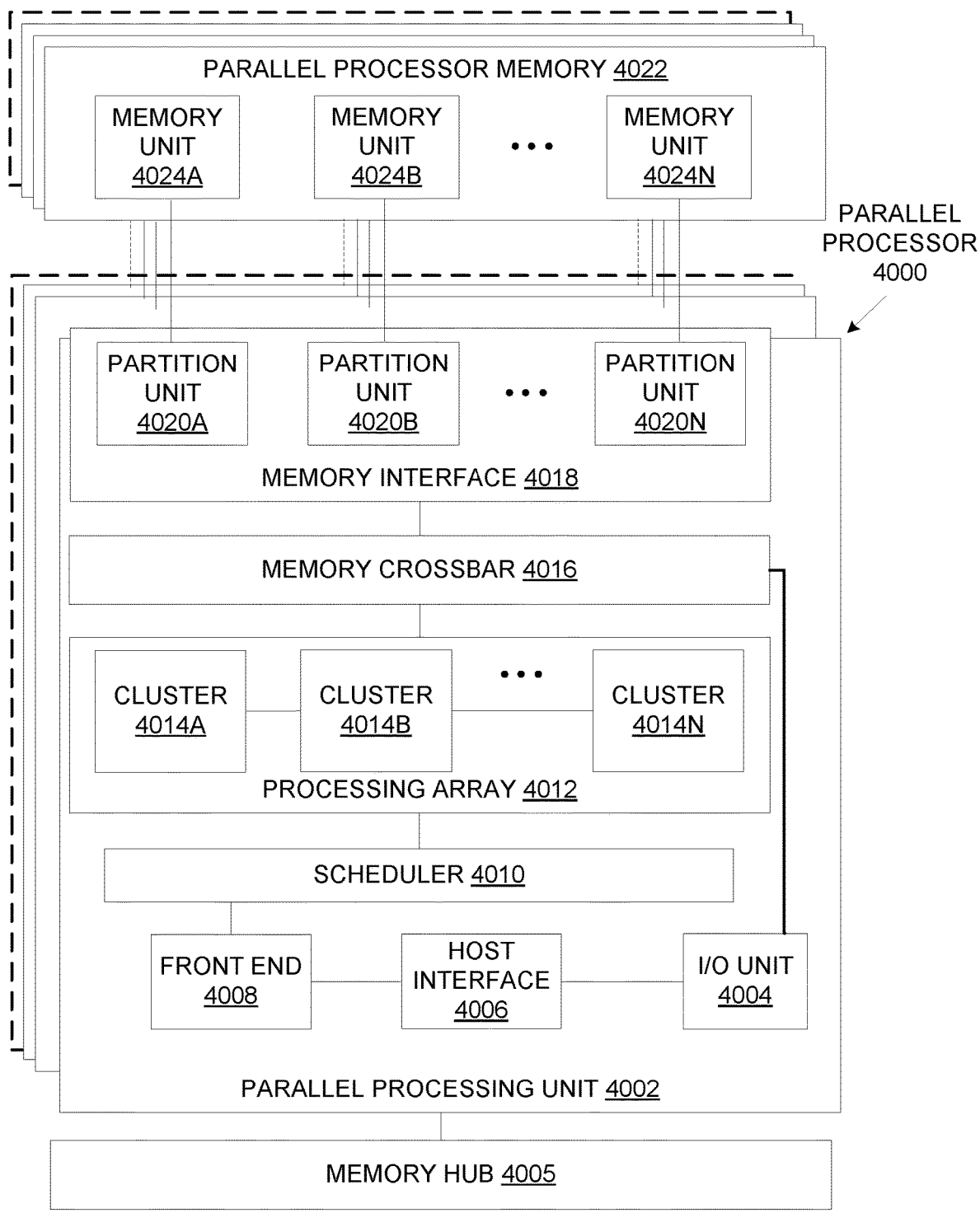
FIG. 40A illustrates a parallel processor, in accordance with at least one embodiment.

FIG. 40A illustrates a parallel processor 4000, in accordance with at least one embodiment. In at least one embodiment, various components of parallel processor 4000 may be implemented using one or more integrated circuit devices, such as programmable processors, application specific integrated circuits ("ASICs"), or FPGAs.

In at least one embodiment, parallel processor 4000 includes a parallel processing unit 4002. In at least one embodiment, parallel processing unit 4002 includes an I/O unit 4004 that enables communication with other devices, including other instances of parallel processing unit 4002. In at least one embodiment, I/O unit 4004 may be directly connected to other devices. In at least one embodiment, I/O unit 4004 connects with other devices via use of a hub or switch interface, such as memory hub 1505. In at least one embodiment, connections between memory hub 1505 and I/O unit 4004 form a communication link. In at least one embodiment, I/O unit 4004 connects with a host interface 4006 and a memory crossbar 4016, where host interface 4006 receives commands directed to performing processing operations and memory crossbar 4016 receives commands directed to performing memory operations.

In at least one embodiment, when host interface 4006 receives a command buffer via I/O unit 4004, host interface 4006 can direct work operations to perform those commands to a front end 4008. In at least one embodiment, front end 4008 couples with a scheduler 4010, which is configured to distribute commands or other work items to a processing array 4012. In at least one embodiment, scheduler 4010 ensures that processing array 4012 is properly configured and in a valid state before tasks are distributed to processing array 4012. In at least one embodiment, scheduler 4010 is implemented via firmware logic executing on a microcontroller. In at least one embodiment, microcontroller implemented scheduler 4010 is configurable to perform complex scheduling and work distribution operations at coarse and fine granularity, enabling rapid preemption and context switching of threads executing on processing array 4012. In at least one embodiment, host software can prove workloads for scheduling on processing array 4012 via one of multiple graphics processing doorbells. In at least one embodiment, workloads can then be automatically distributed across processing array 4012 by scheduler 4010 logic within a microcontroller including scheduler 4010.

In at least one embodiment, processing array 4012 can include up to "N" clusters (e.g., cluster 4014A, cluster 4014B, through cluster 4014N). In at least one embodiment, each cluster 4014A-4014N of processing array 4012 can execute a large number of concurrent threads. In at least one embodiment, scheduler 4010 can allocate work to clusters 4014A-4014N of processing array 4012 using various scheduling and/or work distribution algorithms, which may vary depending on a workload arising for each type of program or computation. In at least one embodiment, scheduling can be handled dynamically by scheduler 4010, or can be assisted in part by compiler logic during compilation of program logic configured for execution by processing array 4012. In at least one embodiment, different clusters 4014A-4014N of processing array 4012 can be allocated for processing different types of programs or for performing different types of computations.

In at least one embodiment, processing array 4012 can be configured to perform various types of parallel processing operations. In at least one embodiment, processing array 4012 is configured to perform general-purpose parallel compute operations. For example, in at least one embodiment, processing array 4012 can include logic to execute processing tasks including filtering of video and/or audio data, performing modeling operations, including physics operations, and performing data transformations.

In at least one embodiment, processing array 4012 is configured to perform parallel graphics processing operations. In at least one embodiment, processing array 4012 can include additional logic to support execution of such graphics processing operations, including, but not limited to texture sampling logic to perform texture operations, as well as tessellation logic and other vertex processing logic. In at least one embodiment, processing array 4012 can be configured to execute graphics processing related shader programs such as, but not limited to vertex shaders, tessellation shaders, geometry shaders, and pixel shaders. In at least one embodiment, parallel processing unit 4002 can transfer data from system memory via I/O unit 4004 for processing. In at least one embodiment, during processing, transferred data can be stored to on-chip memory (e.g., a parallel processor memory 4022) during processing, then written back to system memory.

In at least one embodiment, when parallel processing unit 4002 is used to perform graphics processing, scheduler 4010 can be configured to divide a processing workload into approximately equal sized tasks, to better enable distribution of graphics processing operations to multiple clusters 4014A-4014N of processing array 4012. In at least one embodiment, portions of processing array 4012 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 4014A-4014N may be stored in buffers to allow intermediate data to be transmitted between clusters 4014A-4014N for further processing.

In at least one embodiment, processing array 4012 can receive processing tasks to be executed via scheduler 4010, which receives commands defining processing tasks from front end 4008. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 4010 may be configured to fetch indices corresponding to tasks or may receive indices from front end 4008. In at least one embodiment, front end 4008 can be configured to ensure processing array 4012 is configured to a valid state before a workload specified by incoming command buffers (e.g., batch-buffers, push buffers, etc.) is initiated.

In at least one embodiment, each of one or more instances of parallel processing unit 4002 can couple with parallel processor memory 4022. In at least one embodiment, parallel processor memory 4022 can be accessed via memory crossbar 4016, which can receive memory requests from processing array 4012 as well as I/O unit 4004. In at least one embodiment, memory crossbar 4016 can access parallel processor memory 4022 via a memory interface 4018. In at least one embodiment, memory interface 4018 can include multiple partition units (e.g., a partition unit 4020A, partition unit 4020B, through partition unit 4020N) that can each couple to a portion (e.g., memory unit) of parallel processor memory 4022. In at least one embodiment, a number of partition units 4020A-4020N is configured to be equal to a number of memory units, such that a first partition unit 4020A has a corresponding first memory unit 4024A, a second partition unit 4020B has a corresponding memory unit 4024B, and an Nth partition unit 4020N has a corresponding Nth memory unit 4024N. In at least one embodiment, a number of partition units 4020A-4020N may not be equal to a number of memory devices.

In at least one embodiment, memory units 4024A-4024N can include various types of memory devices, including DRAM or graphics random access memory, such as SGRAM, including GDDR memory. In at least one embodiment, memory units 4024A-4024N may also include 3D stacked memory, including but not limited to high bandwidth memory ("HBM"). In at least one embodiment, render targets, such as frame buffers or texture maps may be stored across memory units 4024A-4024N, allowing partition units 4020A-4020N to write portions of each render target in parallel to efficiently use available bandwidth of parallel processor memory 4022. In at least one embodiment, a local instance of parallel processor memory 4022 may be excluded in favor of a unified memory design that utilizes system memory in conjunction with local cache memory.

In at least one embodiment, any one of clusters 4014A-4014N of processing array 4012 can process data that will be written to any of memory units 4024A-4024N within parallel processor memory 4022. In at least one embodiment, memory crossbar 4016 can be configured to transfer an output of each cluster 4014A-4014N to any partition unit 4020A-4020N or to another cluster 4014A-4014N, which can perform additional processing operations on an output. In at least one embodiment, each cluster 4014A-4014N can communicate with memory interface 4018 through memory crossbar 4016 to read from or write to various external memory devices. In at least one embodiment, memory crossbar 4016 has a connection to memory interface 4018 to communicate with I/O unit 4004, as well as a connection to a local instance of parallel processor memory 4022, enabling processing units within different clusters 4014A-4014N to communicate with system memory or other memory that is not local to parallel processing unit 4002. In at least one embodiment, memory crossbar 4016 can use virtual channels to separate traffic streams between clusters 4014A-4014N and partition units 4020A-4020N.

In at least one embodiment, multiple instances of parallel processing unit 4002 can be provided on a single add-in card, or multiple add-in cards can be interconnected. In at least one embodiment, different instances of parallel processing unit 4002 can be configured to inter-operate even if different instances have different numbers of processing cores, different amounts of local parallel processor memory, and/or other configuration differences. For example, in at least one embodiment, some instances of parallel processing unit 4002 can include higher precision floating point units relative to other instances. In at least one embodiment, systems incorporating one or more instances of parallel processing unit 4002 or parallel processor 4000 can be implemented in a variety of configurations and form factors, including but not limited to desktop, laptop, or handheld personal computers, servers, workstations, game consoles, and/or embedded systems.

Figure 40B:
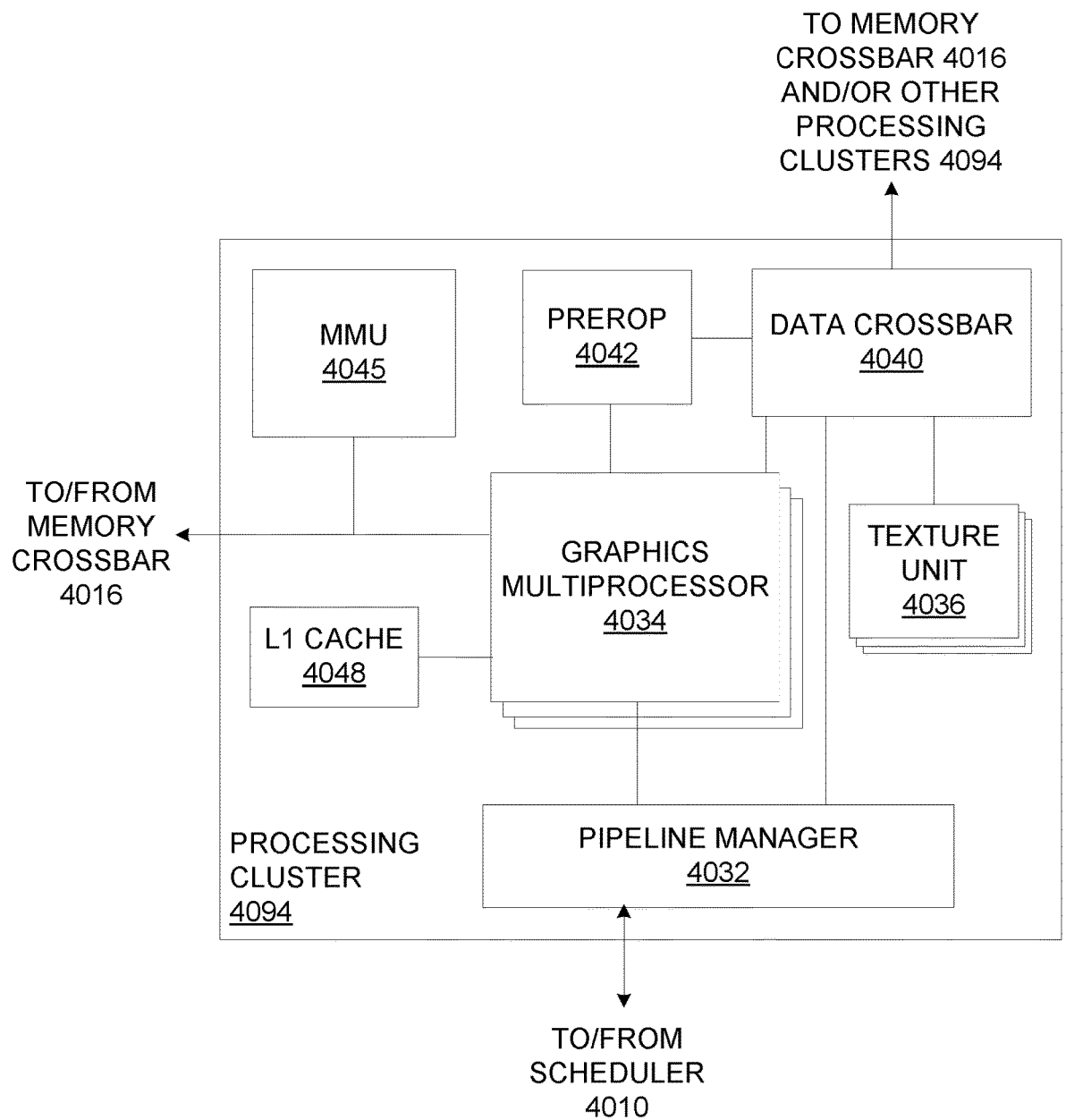
FIG. 40B illustrates a processing cluster, in accordance with at least one embodiment.

FIG. 40B illustrates a processing cluster 4094, in accordance with at least one embodiment. In at least one embodiment, processing cluster 4094 is included within a parallel processing unit. In at least one embodiment, processing cluster 4094 is one of processing clusters 4014A-4014N of FIG. 40. In at least one embodiment, processing cluster 4094 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 4094.

In at least one embodiment, operation of processing cluster 4094 can be controlled via a pipeline manager 4032 that distributes processing tasks to SIMT parallel processors. In at least one embodiment, pipeline manager 4032 receives instructions from scheduler 4010 of FIG. 40 and manages execution of those instructions via a graphics multiprocessor 4034 and/or a texture unit 4036. In at least one embodiment, graphics multiprocessor 4034 is an exemplary instance of a SIMT parallel processor. However, in at least one embodiment, various types of SIMT parallel processors of differing architectures may be included within processing cluster 4094. In at least one embodiment, one or more instances of graphics multiprocessor 4034 can be included within processing cluster 4094. In at least one embodiment, graphics multiprocessor 4034 can process data and a data crossbar 4040 can be used to distribute processed data to one of multiple possible destinations, including other shader units. In at least one embodiment, pipeline manager 4032 can facilitate distribution of processed data by specifying destinations for processed data to be distributed via data crossbar 4040.

In at least one embodiment, each graphics multiprocessor 4034 within processing cluster 4094 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 4094 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 4034. In at least one embodiment, a thread group may include fewer threads than a number of processing engines within graphics multiprocessor 4034. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 4034. In at least one embodiment, when a thread group includes more threads than a number of processing engines within graphics multiprocessor 4034, processing can be performed over consecutive clock cycles. In at least one embodiment, multiple thread groups can be executed concurrently on graphics multiprocessor 4034.

In at least one embodiment, graphics multiprocessor 4034 includes an internal cache memory to perform load and store operations. In at least one embodiment, graphics multiprocessor 4034 can forego an internal cache and use a cache memory (e.g., L1 cache 4048) within processing cluster 4094. In at least one embodiment, each graphics multiprocessor 4034 also has access to Level 2 ("L2") caches within partition units (e.g., partition units 4020A-4020N of FIG. 40A) that are shared among all processing clusters 4094 and may be used to transfer data between threads. In at least one embodiment, graphics multiprocessor 4034 may also access off-chip global memory, which can include one or more of local parallel processor memory and/or system memory. In at least one embodiment, any memory external to parallel processing unit 4002 may be used as global memory. In at least one embodiment, processing cluster 4094 includes multiple instances of graphics multiprocessor 4034 that can share common instructions and data, which may be stored in L1 cache 4048.

In at least one embodiment, each processing cluster 4094 may include an MMU 4045 that is configured to map virtual addresses into physical addresses. In at least one embodiment, one or more instances of MMU 4045 may reside within memory interface 4018 of FIG. 40. In at least one embodiment, MMU 4045 includes a set of page table entries ("PTEs") used to map a virtual address to a physical address of a tile and optionally a cache line index. In at least one embodiment, MMU 4045 may include address translation lookaside buffers ("TLBs") or caches that may reside within graphics multiprocessor 4034 or L1 cache 4048 or processing cluster 4094. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 4094 may be configured such that each graphics multiprocessor 4034 is coupled to a texture unit 4036 for performing texture mapping operations, e.g., determining texture sample positions, reading texture data, and filtering texture data. In at least one embodiment, texture data is read from an internal texture L1 cache (not shown) or from an L1 cache within graphics multiprocessor 4034 and is fetched from an L2 cache, local parallel processor memory, or system memory, as needed. In at least one embodiment, each graphics multiprocessor 4034 outputs a processed task to data crossbar 4040 to provide a processed task to another processing cluster 4094 for further processing or to store a processed task in an L2 cache, a local parallel processor memory, or a system memory via memory crossbar 4016. In at least one embodiment, a pre-raster operations unit ("preROP") 4042 is configured to receive data from graphics multiprocessor 4034, direct data to ROP units, which may be located with partition units as described herein (e.g., partition units 4020A-4020N of FIG. 40). In at least one embodiment, PreROP 4042 can perform optimizations for color blending, organize pixel color data, and perform address translations.

Figure 40C:
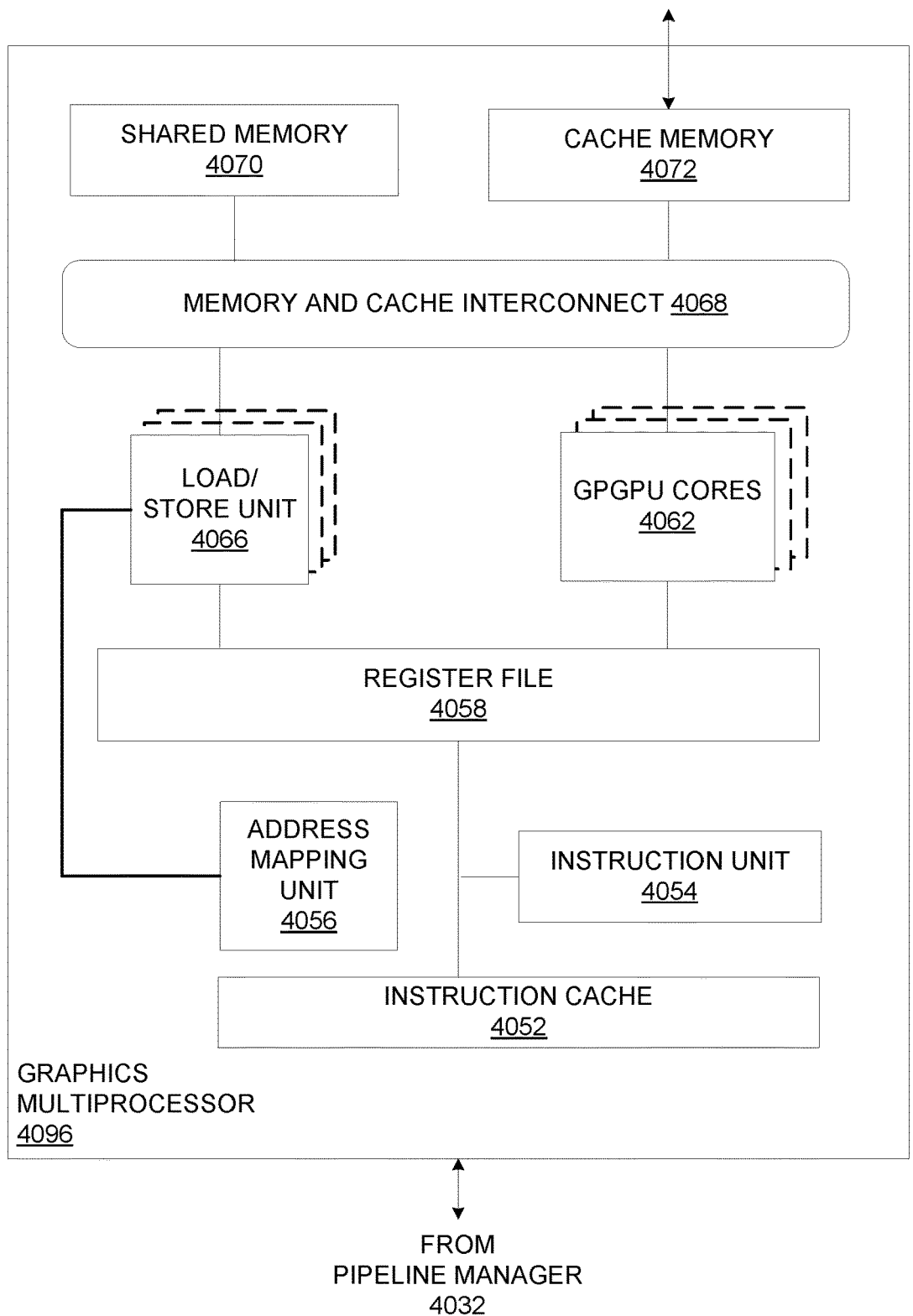
FIG. 40C illustrates a graphics multiprocessor, in accordance with at least one embodiment.

FIG. 40C illustrates a graphics multiprocessor 4096, in accordance with at least one embodiment. In at least one embodiment, graphics multiprocessor 4096 is graphics multiprocessor 4034 of FIG. 40B. In at least one embodiment, graphics multiprocessor 4096 couples with pipeline manager 4032 of processing cluster 4094. In at least one embodiment, graphics multiprocessor 4096 has an execution pipeline including but not limited to an instruction cache 4052, an instruction unit 4054, an address mapping unit 4056, a register file 4058, one or more GPGPU cores 4062, and one or more LSUs 4066. GPGPU cores 4062 and LSUs 4066 are coupled with cache memory 4072 and shared memory 4070 via a memory and cache interconnect 4068.

In at least one embodiment, instruction cache 4052 receives a stream of instructions to execute from pipeline manager 4032. In at least one embodiment, instructions are cached in instruction cache 4052 and dispatched for execution by instruction unit 4054. In at least one embodiment, instruction unit 4054 can dispatch instructions as thread groups (e.g., warps), with each thread of a thread group assigned to a different execution unit within GPGPU core 4062. In at least one embodiment, an instruction can access any of a local, shared, or global address space by specifying an address within a unified address space. In at least one embodiment, address mapping unit 4056 can be used to translate addresses in a unified address space into a distinct memory address that can be accessed by LSUs 4066.

In at least one embodiment, register file 4058 provides a set of registers for functional units of graphics multiprocessor 4096. In at least one embodiment, register file 4058 provides temporary storage for operands connected to data paths of functional units (e.g., GPGPU cores 4062, LSUs 4066) of graphics multiprocessor 4096. In at least one embodiment, register file 4058 is divided between each of functional units such that each functional unit is allocated a dedicated portion of register file 4058. In at least one embodiment, register file 4058 is divided between different thread groups being executed by graphics multiprocessor 4096.

In at least one embodiment, GPGPU cores 4062 can each include FPUs and/or integer ALUs that are used to execute instructions of graphics multiprocessor 4096. GPGPU cores 4062 can be similar in architecture or can differ in architecture. In at least one embodiment, a first portion of GPGPU cores 4062 include a single precision FPU and an integer ALU while a second portion of GPGPU cores 4062 include a double precision FPU. In at least one embodiment, FPUs can implement IEEE 754-2008 standard for floating point arithmetic or enable variable precision floating point arithmetic. In at least one embodiment, graphics multiprocessor 4096 can additionally include one or more fixed function or special function units to perform specific functions such as copy rectangle or pixel blending operations. In at least one embodiment one or more of GPGPU cores 4062 can also include fixed or special function logic.

In at least one embodiment, GPGPU cores 4062 include SIMD logic capable of performing a single instruction on multiple sets of data. In at least one embodiment GPGPU cores 4062 can physically execute SIMD4, SIMD8, and SIMD16 instructions and logically execute SIMD1, SIMD2, and SIMD32 instructions. In at least one embodiment, SIMD instructions for GPGPU cores 4062 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 4068 is an interconnect network that connects each functional unit of graphics multiprocessor 4096 to register file 4058 and to shared memory 4070. In at least one embodiment, memory and cache interconnect 4068 is a crossbar interconnect that allows LSU 4066 to implement load and store operations between shared memory 4070 and register file 4058. In at least one embodiment, register file 4058 can operate at a same frequency as GPGPU cores 4062, thus data transfer between GPGPU cores 4062 and register file 4058 is very low latency. In at least one embodiment, shared memory 4070 can be used to enable communication between threads that execute on functional units within graphics multiprocessor 4096. In at least one embodiment, cache memory 4072 can be used as a data cache for example, to cache texture data communicated between functional units and texture unit 4036. In at least one embodiment, shared memory 4070 can also be used as a program managed cached. In at least one embodiment, threads executing on GPGPU cores 4062 can programmatically store data within shared memory in addition to automatically cached data that is stored within cache memory 4072.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on a same package or chip as cores and communicatively coupled to cores over a processor bus/interconnect that is internal to a package or a chip. In at least one embodiment, regardless of a manner in which a GPU is connected, processor cores may allocate work to a GPU in a form of sequences of commands/instructions contained in a WD. In at least one embodiment, a GPU then uses dedicated circuitry/logic for efficiently processing these commands/instructions.

General Computing

The following figures set forth, without limitation, exemplary software constructs within general computing that can be used to implement at least one embodiment.

Figure 41:
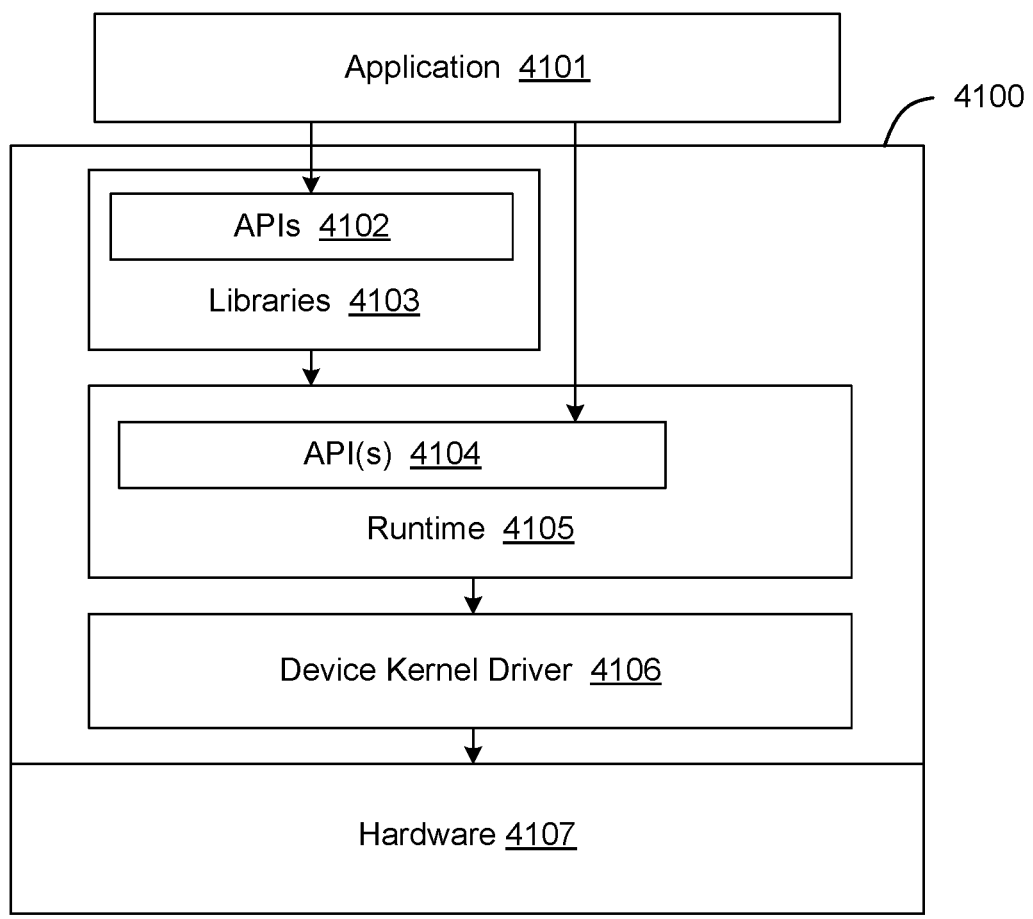
FIG. 41 illustrates a software stack of a programming platform, in accordance with at least one embodiment.

FIG. 41 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 4100 of a programming platform provides an execution environment for an application 4101. In at least one embodiment, application 4101 may include any computer software capable of being launched on software stack 4100. In at least one embodiment, application 4101 may include, but is not limited to, an artificial intelligence ("AI")/machine learning ("ML") application, a high performance computing ("HPC") application, a virtual desktop infrastructure ("VDI"), or a data center workload.

In at least one embodiment, application 4101 and software stack 4100 run on hardware 4107. Hardware 4107 may include one or more GPUs, CPUs, FPGAs, AI engines, and/or other types of compute devices that support a programming platform, in at least one embodiment. In at least one embodiment, such as with CUDA, software stack 4100 may be vendor specific and compatible with only devices from particular vendor(s). In at least one embodiment, such as in with OpenCL, software stack 4100 may be used with devices from different vendors. In at least one embodiment, hardware 4107 includes a host connected to one more devices that can be accessed to perform computational tasks via application programming interface ("API") calls. A device within hardware 4107 may include, but is not limited to, a GPU, FPGA, AI engine, or other compute device (but may also include a CPU) and its memory, as opposed to a host within hardware 4107 that may include, but is not limited to, a CPU (but may also include a compute device) and its memory, in at least one embodiment.

In at least one embodiment, software stack 4100 of a programming platform includes, without limitation, a number of libraries 4103, a runtime 4105, and a device kernel driver 4106. Each of libraries 4103 may include data and programming code that can be used by computer programs and leveraged during software development, in at least one embodiment. In at least one embodiment, libraries 4103 may include, but are not limited to, pre-written code and subroutines, classes, values, type specifications, configuration data, documentation, help data, and/or message templates. In at least one embodiment, libraries 4103 include functions that are optimized for execution on one or more types of devices. In at least one embodiment, libraries 4103 may include, but are not limited to, functions for performing mathematical, deep learning, and/or other types of operations on devices. In at least one embodiment, libraries 4203 are associated with corresponding APIs 4202, which may include one or more APIs, that expose functions implemented in libraries 4203.

In at least one embodiment, application 4101 is written as source code that is compiled into executable code, as discussed in greater detail below in conjunction with FIG. 46. Executable code of application 4101 may run, at least in part, on an execution environment provided by software stack 4100, in at least one embodiment. In at least one embodiment, during execution of application 4101, code may be reached that needs to run on a device, as opposed to a host. In such a case, runtime 4105 may be called to load and launch requisite code on a device, in at least one embodiment. In at least one embodiment, runtime 4105 may include any technically feasible runtime system that is able to support execution of application S01.

In at least one embodiment, runtime 4105 is implemented as one or more runtime libraries associated with corresponding APIs, which are shown as API(s) 4104. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 4104 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 4106 is configured to facilitate communication with an underlying device. In at least one embodiment, device kernel driver 4106 may provide low-level functionalities upon which APIs, such as API(s) 4104, and/or other software relies. In at least one embodiment, device kernel driver 4106 may be configured to compile intermediate representation ("IR") code into binary code at runtime. For CUDA, device kernel driver 4106 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 4106 to compile IR code at runtime.

Figure 42:
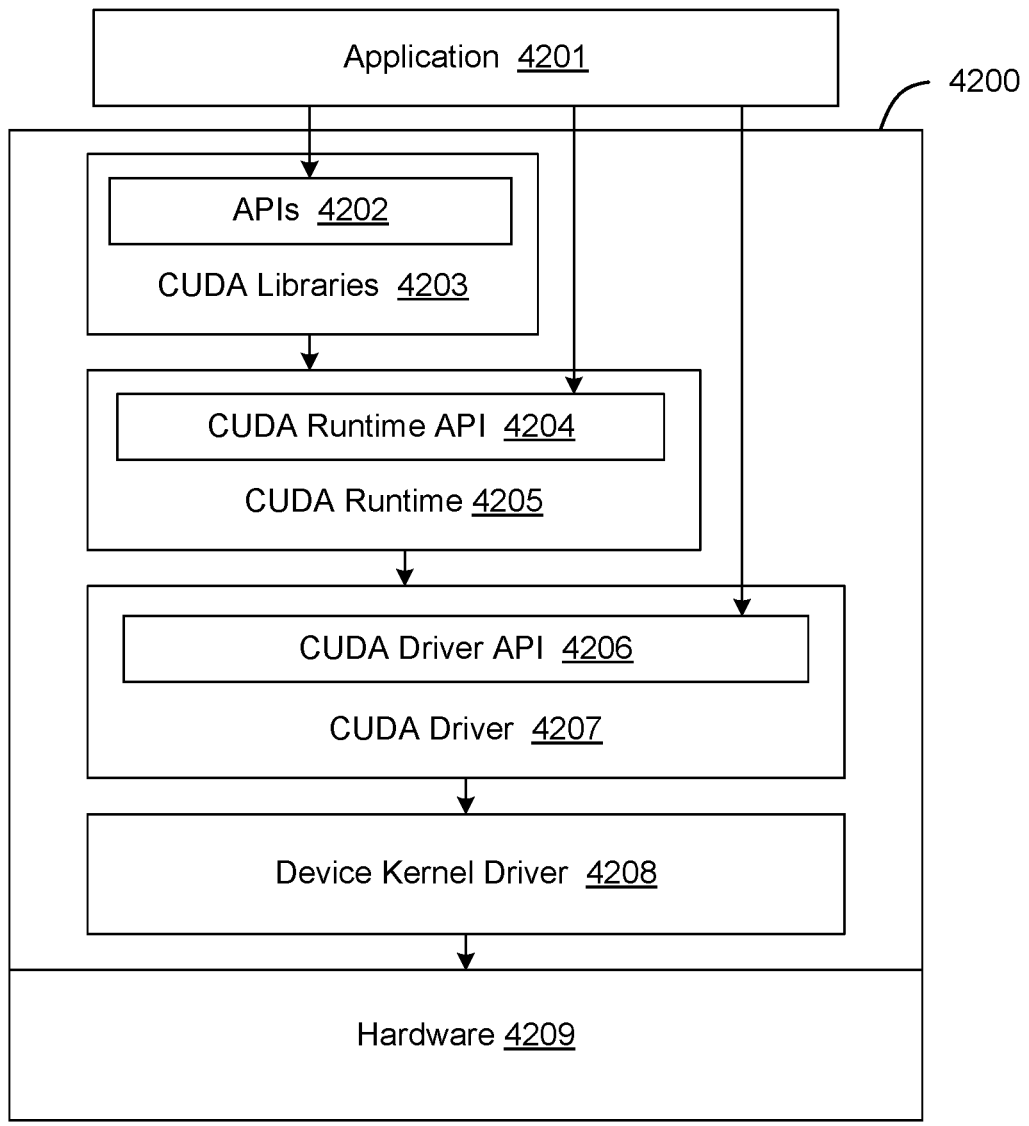
FIG. 42 illustrates a CUDA implementation of a software stack of FIG. 41, in accordance with at least one embodiment.

FIG. 42 illustrates a CUDA implementation of software stack 4100 of FIG. 41, in accordance with at least one embodiment. In at least one embodiment, a CUDA software stack 4200, on which an application 4201 may be launched, includes CUDA libraries 4203, a CUDA runtime 4205, a CUDA driver 4207, and a device kernel driver 4208. In at least one embodiment, CUDA software stack 4200 executes on hardware 4209, which may include a GPU that supports CUDA and is developed by NVIDIA Corporation of Santa Clara, CA.

In at least one embodiment, application 4201, CUDA runtime 4205, and device kernel driver 4208 may perform similar functionalities as application 4101, runtime 4105, and device kernel driver 4106, respectively, which are described above in conjunction with FIG. 41. In at least one embodiment, CUDA driver 4207 includes a library (libcuda.so) that implements a CUDA driver API 4206. Similar to a CUDA runtime API 4204 implemented by a CUDA runtime library (cudart), CUDA driver API 4206 may, without limitation, expose functions for memory management, execution control, device management, error handling, synchronization, and/or graphics interoperability, among other things, in at least one embodiment. In at least one embodiment, CUDA driver API 4206 differs from CUDA runtime API 4204 in that CUDA runtime API 4204 simplifies device code management by providing implicit initialization, context (analogous to a process) management, and module (analogous to dynamically loaded libraries) management. In contrast to high-level CUDA runtime API 4204, CUDA driver API 4206 is a low-level API providing more fine-grained control of a device, particularly with respect to contexts and module loading, in at least one embodiment. In at least one embodiment, CUDA driver API 4206 may expose functions for context management that are not exposed by CUDA runtime API 4204. In at least one embodiment, CUDA driver API 4206 is also language-independent and supports, e.g., OpenCL in addition to CUDA runtime API 4204. Further, in at least one embodiment, development libraries, including CUDA runtime 4205, may be considered as separate from driver components, including user-mode CUDA driver 4207 and kernel-mode device driver 4208 (also sometimes referred to as a "display" driver).

In at least one embodiment, CUDA libraries 4203 may include, but are not limited to, mathematical libraries, deep learning libraries, parallel algorithm libraries, and/or signal/image/video processing libraries, which parallel computing applications such as application 4201 may utilize. In at least one embodiment, CUDA libraries 4203 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 4203 may include deep learning libraries such as a cuDNN library of primitives for deep neural networks and a TensorRT platform for high-performance deep learning inference, among others.

Figure 43:
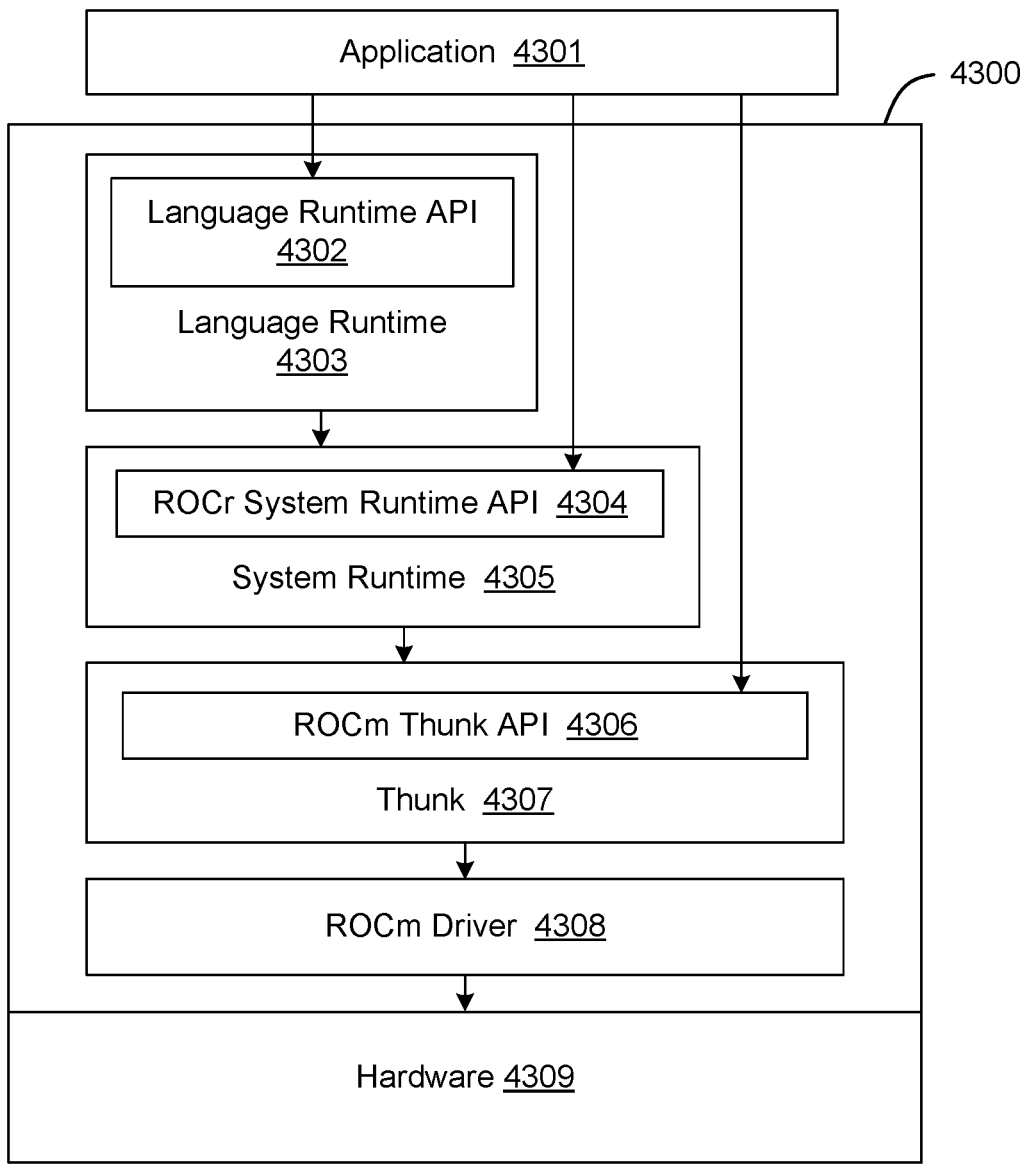
FIG. 43 illustrates a ROCm implementation of a software stack of FIG. 41, in accordance with at least one embodiment.

FIG. 43 illustrates a ROCm implementation of software stack 4100 of FIG. 41, in accordance with at least one embodiment. In at least one embodiment, a ROCm software stack 4300, on which an application 4301 may be launched, includes a language runtime 4303, a system runtime 4305, a thunk 4307, a ROCm kernel driver 4308, and a device kernel driver 4309. In at least one embodiment, ROCm software stack 4300 executes on hardware 4310, which may include a GPU that supports ROCm and is developed by AMD Corporation of Santa Clara, CA.

In at least one embodiment, application 4301 may perform similar functionalities as application 4101 discussed above in conjunction with FIG. 41. In addition, language runtime 4303 and system runtime 4305 may perform similar functionalities as runtime 4105 discussed above in conjunction with FIG. 41, in at least one embodiment. In at least one embodiment, language runtime 4303 and system runtime 4305 differ in that system runtime 4305 is a language-independent runtime that implements a ROCr system runtime API 4304 and makes use of a Heterogeneous System Architecture ("HAS") Runtime API. HAS runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 4305, language runtime 4303 is an implementation of a language-specific runtime API 4302 layered on top of ROCr system runtime API 4304, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 4204 discussed above in conjunction with FIG. 42, such as functions for memory management, execution control, device management, error handling, and synchronization, among other things.

In at least one embodiment, thunk (ROCt) 4307 is an interface that can be used to interact with underlying ROCm driver 4308. In at least one embodiment, ROCm driver 4308 is a ROCk driver, which is a combination of an AMDGPU driver and a HAS kernel driver (amdkfd). In at least one embodiment, AMDGPU driver is a device kernel driver for GPUs developed by AMD that performs similar functionalities as device kernel driver 4106 discussed above in conjunction with FIG. 41. In at least one embodiment, HAS kernel driver is a driver permitting different types of processors to share system resources more effectively via hardware features.

In at least one embodiment, various libraries (not shown) may be included in ROCm software stack 4300 above language runtime 4303 and provide functionality similarity to CUDA libraries 4203, discussed above in conjunction with FIG. 42. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 44:
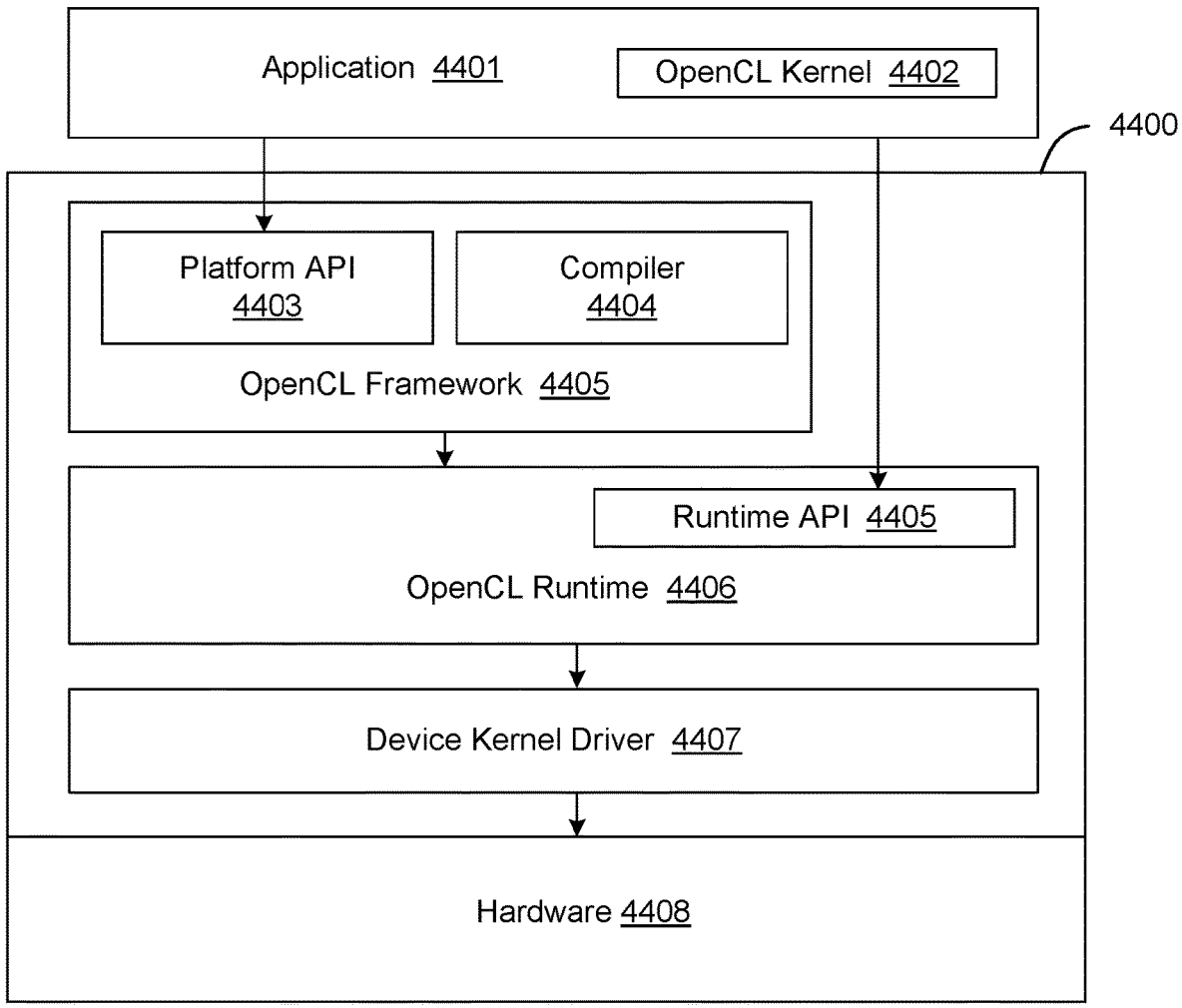
FIG. 44 illustrates an OpenCL implementation of a software stack of FIG. 41, in accordance with at least one embodiment.

FIG. 44 illustrates an OpenCL implementation of software stack 4100 of FIG. 41, in accordance with at least one embodiment. In at least one embodiment, an OpenCL software stack 4400, on which an application 4401 may be launched, includes an OpenCL framework 4405, an OpenCL runtime 4406, and a driver 4407. In at least one embodiment, OpenCL software stack 4400 executes on hardware 4209 that is not vendor-specific. As OpenCL is supported by devices developed by different vendors, specific OpenCL drivers may be required to interoperate with hardware from such vendors, in at least one embodiment.

In at least one embodiment, application 4401, OpenCL runtime 4406, device kernel driver 4407, and hardware 4408 may perform similar functionalities as application 4101, runtime 4105, device kernel driver 4106, and hardware 4107, respectively, that are discussed above in conjunction with FIG. 41. In at least one embodiment, application 4401 further includes an OpenCL kernel 4402 with code that is to be executed on a device.

In at least one embodiment, OpenCL defines a "platform" that allows a host to control devices connected to a host. In at least one embodiment, an OpenCL framework provides a platform layer API and a runtime API, shown as platform API 4403 and runtime API 4405. In at least one embodiment, runtime API 4405 uses contexts to manage execution of kernels on devices. In at least one embodiment, each identified device may be associated with a respective context, which runtime API 4405 may use to manage command queues, program objects, and kernel objects, share memory objects, among other things, for that device. In at least one embodiment, platform API 4403 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 4404 is also included in OpenCL frame-work 4405. Source code may be compiled offline prior to executing an application or online during execution of an application, in at least one embodiment. In contrast to CUDA and ROCm, OpenCL applications in at least one embodiment may be compiled online by compiler 4404, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

Figure 45:
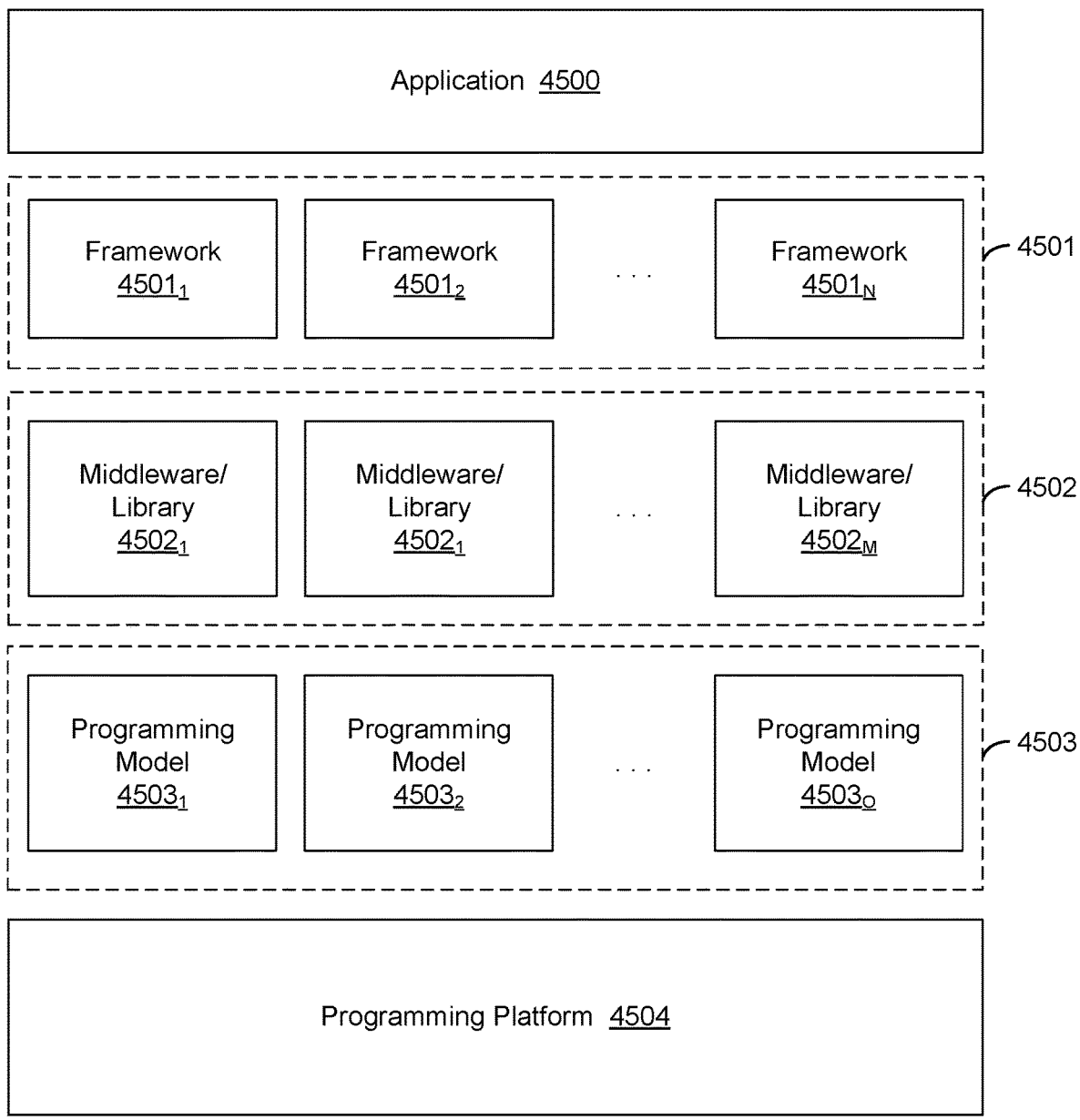
FIG. 45 illustrates software that is supported by a programming platform, in accordance with at least one embodiment.

FIG. 45 illustrates software that is supported by a programming platform, in accordance with at least one embodiment. In at least one embodiment, a programming platform 4504 is configured to support various programming models 4503, middlewares and/or libraries 4502, and frameworks 4501 that an application 4500 may rely upon. In at least one embodiment, application 4500 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDIA Developer Data Loading Library ("DALI") CUDA libraries to provide accelerated computing on underlying hardware.

In at least one embodiment, programming platform 4504 may be one of a CUDA, ROCm, or OpenCL platform described above in conjunction with FIG. 42, FIG. 43, and FIG. 44, respectively. In at least one embodiment, programming platform 4504 supports multiple programming models 4503, which are abstractions of an underlying computing system permitting expressions of algorithms and data structures. Programming models 4503 may expose features of underlying hardware in order to improve performance, in at least one embodiment. In at least one embodiment, programming models 4503 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 4502 provide implementations of abstractions of programming models 4504. In at least one embodiment, such libraries include data and programming code that may be used by computer programs and leveraged during software development. In at least one embodiment, such middlewares include software that provides services to applications beyond those available from programming platform 4504. In at least one embodiment, libraries and/or middlewares 4502 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 4502 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 4501 depend on libraries and/or middlewares 4502. In at least one embodiment, each of application frameworks 4501 is a software framework used to implement a standard structure of application software. An AI/ML application may be implemented using a framework such as Caffe, Caffe2, TensorFlow, Keras, PyTorch, or MxNet deep learning frameworks, in at least one embodiment.

Figure 46:
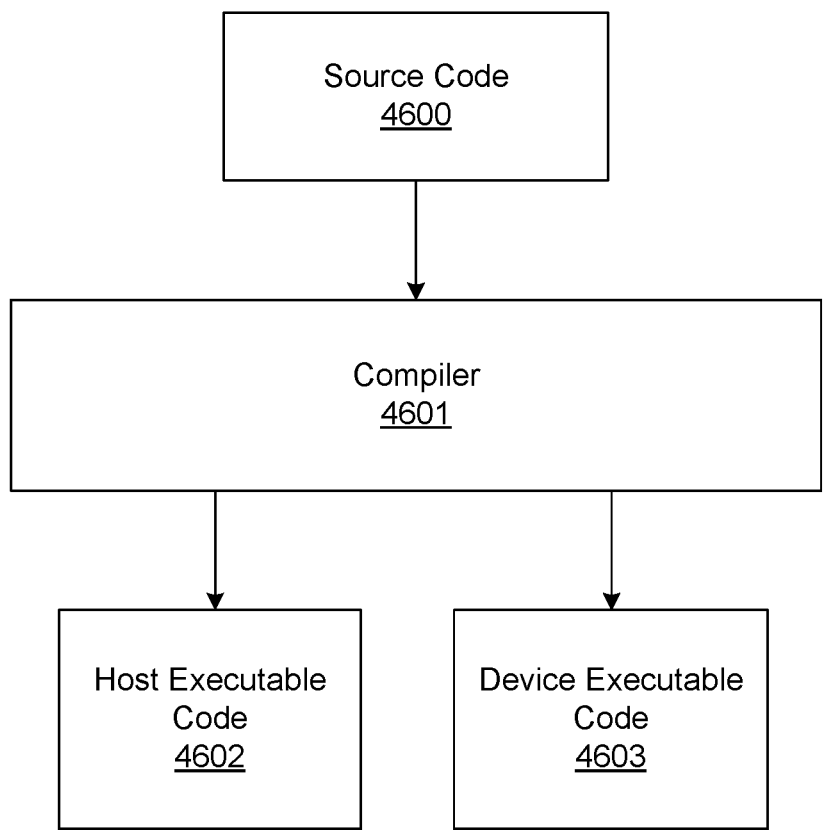
FIG. 46 illustrates compiling code to execute on programming platforms of FIGS. 41-44, in accordance with at least one embodiment.

FIG. 46 illustrates compiling code to execute on one of programming platforms of FIGS. 41-44, in accordance with at least one embodiment. In at least one embodiment, a compiler 4601 receives source code 4600 that includes both host code as well as device code. In at least one embodiment, compiler 4601 is configured to convert source code 4600 into host executable code 4602 for execution on a host and device executable code 4603 for execution on a device. In at least one embodiment, source code 4600 may either be compiled offline prior to execution of an application, or online during execution of an application.

In at least one embodiment, source code 4600 may include code in any programming language supported by compiler 4601, such as C++, C, Fortran, etc. In at least one embodiment, source code 4600 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 4600 may include multiple source code files, rather than a single-source file, into which host code and device code are separated.

In at least one embodiment, compiler 4601 is configured to compile source code 4600 into host executable code 4602 for execution on a host and device executable code 4603 for execution on a device. In at least one embodiment, compiler 4601 performs operations including parsing source code 4600 into an abstract system tree (AST), performing optimizations, and generating executable code. In at least one embodiment in which source code 4600 includes a single-source file, compiler 4601 may separate device code from host code in such a single-source file, compile device code and host code into device executable code 4603 and host executable code 4602, respectively, and link device executable code 4603 and host executable code 4602 together in a single file, as discussed in greater detail below with respect to FIG. 35.

In at least one embodiment, host executable code 4602 and device executable code 4603 may be in any suitable format, such as binary code and/or IR code. In a case of CUDA, host executable code 4602 may include native object code and device executable code 4603 may include code in PTX intermediate representation, in at least one embodiment. In a case of ROCm, both host executable code 4602 and device executable code 4603 may include target binary code, in at least one embodiment.

At least one embodiment of the disclosure can be described in view of the following clauses:

1. A system, comprising:
   at least one processor; and
   at least one memory storing instructions that, in response to execution by the at least one processor, cause the system to at least:
      obtain, from a network device, data indicative of operation of the network device;
      use a machine learning model to obtain an inference of a network traffic pattern, the inference obtained based, at least in part, on the data indicative of operation of the network device; and
      respond to the inference.

2. The system of clause 1, wherein an integrated circuit performs a networking function and obtains the data indicative of operation of the network device, the data associated with performance of the networking function.

3. The system of clauses 1 or 2, wherein a data processing unit ("DPU") comprises the at least one processor and an integrated network interface.

4. The system of any of clauses 1-3, the at least one memory storing further instructions that, in response to execution by the at least one processor, cause the system to at least:
   respond to the inference by at least adjusting operation of the network device, the adjustment determined based, at least in part, on the inference of the network traffic pattern.

5. The system of any of clauses 1-4, the at least one memory storing further instructions that, in response to execution by the at least one processor, cause the system to at least:
   respond to the inference by at least sending data indicative of a proposed change to operation of the network device.

6. The system of any of clauses 1-5, wherein the machine learning model is trained to infer the network traffic pattern based at least in part on training data indicating an association of a sample in the training data with the network traffic pattern.

7. The system of any of clauses 1-6, the at least one memory storing further instructions that, in response to execution by the at least one processor, cause the system to at least:
   determine that one or more units of network data received by the system are associated with the network traffic pattern; and
   train the machine learning model to infer the network traffic pattern based, at least in part, on the one or more units of network data.

8. The system of any of clauses 1-7, the at least one memory storing further instructions that, in response to execution by the at least one processor, cause the system to at least:
   determine that the inference of the network traffic pattern is associated with undesired usage of the system; and
   limit processing of data originating from a source associated with the network traffic pattern.

9. The system of any of clauses 1-8, wherein the data indicative of operation of the network device is associated with at least one of open systems interconnect ("OSI") levels one or two.

10. The system of any of clauses 1-9, wherein the network device is at least one of an access point, router, switch, hub, bridge, modem, data processing unit ("DPU"), SmartNIC, or active cable.

11. The system of any of clauses 1-10, wherein the data indicative of operation of the network device comprises at least one of a latency histogram, receive counter, transaction counter, queue length indicator, queue occupancy indicator, or power-level usage indicator.

12. A non-transitory computer-readable storage medium comprising instructions that, in response to execution by at least one processor of a network device, cause the network device to at least:
   obtain, from the network device, data indicative of operation of the network device; and
   train a machine learning model to obtain an inference from a network traffic pattern, the inference obtained based, at least in part, on the data indicative of operation of the network device.

13. The non-transitory computer-readable storage medium of clause 12, wherein the machine learning model is trained based, at least in part, on data obtained by the network device in association with performance of a network function by the network device.

14. The non-transitory computer-readable storage medium of clauses 12 or 13, comprising further instructions that, in response to execution by at least one processor of a computing device, cause the computing device to at least:
   respond to the inference by at least adjusting operation of the network device, the adjustment determined based, at least in part, on the inference.

15. The non-transitory computer-readable storage medium of any of clauses 12-14, comprising further instructions that, in response to execution by at least one processor of a computing device, cause the computing device to at least:
   determine, based at least in part on the inference, an adjustment to operation of the network device;
   obtain authorization to adjust the operation of the network device; and
   update the machine learning model using information obtained from the authorization.

16. The non-transitory computer-readable storage medium of any of clauses 12-15, comprising further instructions that, in response to execution by at least one processor of a computing device, cause the computing device to at least:
   determine that the network traffic pattern is associated with undesired usage of a networking device; and
   prevent processing of data originating from a source associated with the network traffic pattern.

17. The non-transitory computer-readable storage medium of any of clauses 12-16, comprising further instructions that, in response to execution by at least one processor of a computing device, cause the computing device to at least:
   identify a condition of operation of the network device;
   store telemetry data associated with the condition; and
   train the machine learning model based, at least in part, on the stored telemetry data associated with the condition.

18. A method, comprising:
   obtaining, by a network device, data indicative of operation of the network device;
   obtaining, by the network device, an inference using a machine learning model, the inference obtained based, at least in part, on the data indicative of the operation of the network device; and responding to the inference.

19. The method of clause 18, wherein the inference is performed by an integrated circuit comprising at least one processor and a network interface.

20. The method of clauses 18 or 19, further comprising: responding to the inference by adjusting operation of the network device.

21. The method of any of clauses 18-20, further comprising:
obtaining information indicating that operation of the network device is anomalous; and
training the machine learning model to infer a characteristic of network traffic pattern based, at least in part, on the obtained information.

22. The method of any of clauses 18-21, wherein the data indicative of the operation of the network device is read from a memory of a network component of the network device.

23. The method of any of clauses 18-22, wherein the data indicative of the operation of the network device is generated by operation of the network device, the operation on at least one of open systems interconnect ("OSI") levels one or two.

24. The method of any of clauses 18-23, wherein input to the machine learning model comprises at least one of a latency histogram, receive counter, transaction counter, or power-level usage indicator.

25. The method of any of clauses 18-24, wherein responding to the inference comprises limiting network traffic associated with an inferred undesired usage of the network device.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium. In at least one embodiment, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—in at least one embodiment, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, in at least one embodiment, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or inter-process communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:
1. A system, comprising:
at least one processor; and
at least one memory storing instructions that, in response to execution by the at least one processor, cause the system to at least:

perform at least one networking function;
collect data associated with the performing of the at least one networking function as the system performs the at least one networking function;
obtain an inference using a machine learning model, the inference obtained based, at least in part, on the data; and
respond to the inference.

2. The system of claim 1, wherein the processor comprises an integrated circuit.

3. The system of claim 1, wherein a data processing unit ("DPU") comprises the at least one processor and an integrated network interface.

4. The system of claim 1, wherein the inference is of a network traffic pattern, and
responding to the inference comprises adjusting operation of the system based, at least in part, on the inference of the network traffic pattern.

5. The system of claim 1, wherein
responding to the inference comprises sending data indicative of a proposed change to operation of the system.

6. The system of claim 1, wherein the inference is of a network traffic pattern, and
the machine learning model is trained to infer the network traffic pattern based at least in part on training data indicating an association of a sample in the training data with the network traffic pattern.

7. The system of claim 1, wherein the inference is of a network traffic pattern, and the at least one memory stores further instructions that, in response to execution by the at least one processor, cause the system to at least:
determine that one or more units of network data received by the system are associated with the network traffic pattern; and
train the machine learning model to infer the network traffic pattern based, at least in part, on the one or more units of network data.

8. The system of claim 1, wherein the inference is of a network traffic pattern,
the at least one memory stores further instructions that, in response to execution by the at least one processor, cause the system to at least determine that the inference of the network traffic pattern is associated with undesired usage of the system, and
responding to the inference comprises limiting processing of data originating from a source associated with the network traffic pattern.

9. The system of claim 1, wherein the data is associated with at least one of open systems interconnect ("OSI") levels one or two.

10. The system of claim 1, wherein the system is comprised in at least one of an access point, router, switch, hub, bridge, modem, data processing unit ("DPU"), SmartNIC, or active cable.

11. The system of claim 1, wherein the data comprises at least one of a latency histogram, receive counter, transaction counter, queue length indicator, queue occupancy indicator, or power-level usage indicator.

12. A non-transitory computer-readable storage medium comprising instructions that, in response to execution by at least one processor of a network device, cause the network device to at least:
cause the at least one processor to collect data indicative of operation of the network device as the at least one processor performs at least one networking function;
obtain, from the at least one processor, the data indicative of the operation of the network device; and
train a machine learning model to obtain an inference from a network traffic pattern, the inference obtained based, at least in part, on the data indicative of the operation of the network device.

13. The non-transitory computer-readable storage medium of claim 12, wherein the machine learning model is trained based, at least in part, on data obtained by the at least one processor in association with performance of the at least one network function.

14. The non-transitory computer-readable storage medium of claim 12, comprising further instructions that, in response to execution by at least one processor of a computing device, cause the computing device to at least:
respond to the inference by at least adjusting operation of the network device, the adjustment determined based, at least in part, on the inference.

15. The non-transitory computer-readable storage medium of claim 12, comprising further instructions that, in response to execution by at least one processor of a computing device, cause the computing device to at least:
determine, based at least in part on the inference, an adjustment to operation of the network device;
obtain authorization to adjust the operation of the network device; and
update the machine learning model using information obtained from the authorization.

16. The non-transitory computer-readable storage medium of claim 12, comprising further instructions that, in response to execution by at least one processor of a computing device, cause the computing device to at least:
determine that the network traffic pattern is associated with undesired usage of a networking device; and
prevent processing of data originating from a source associated with the network traffic pattern.

17. The non-transitory computer-readable storage medium of claim 12, comprising further instructions that, in response to execution by at least one processor of a computing device, cause the computing device to at least:
identify a condition of operation of the network device;
store telemetry data associated with the condition; and
train the machine learning model based, at least in part, on the stored telemetry data associated with the condition.

18. A method, comprising:
performing, by an integrated circuit of a network device, at least one networking function;
collecting, by the integrated circuit, data associated with the performing of the at least one networking function as the integrated circuit performs the at least one networking function;
obtaining, by the network device, an inference using a machine learning model, the inference obtained based, at least in part, on the data; and
responding to the inference.

19. The method of claim 18, wherein the inference is performed by the integrated circuit, and the integrated circuit comprises at least one processor and a network interface.

20. The method of claim 18, further comprising:
responding to the inference by adjusting operation of the network device.

21. The method of claim 18, further comprising:
obtaining information indicating that operation of the network device is anomalous; and
training the machine learning model to infer a characteristic of a network traffic pattern based, at least in part, on the obtained information.

22. The method of claim 18, wherein the integrated circuit reads the data associated with the performing of the at least one networking function from a memory of a network component of the network device.

23. The method of claim 18, wherein the at least one networking function is performed on at least one of open systems interconnect ("OSI") levels one or two.

24. The method of claim 18, wherein input to the machine learning model comprises at least one of a latency histogram, receive counter, transaction counter, or power-level usage indicator.

25. The method of claim 18, wherein responding to the inference comprises limiting network traffic associated with an inferred undesired usage of the network device.

* * * * *